United States Patent
Ma et al.

(10) Patent No.: US 12,505,524 B2
(45) Date of Patent: Dec. 23, 2025

(54) METHOD FOR TRAINING OR USING A PROCESS MODEL FOR DETERMINING A PATTERN IN A PATTERNING PROCESS

(71) Applicant: ASML NETHERLANDS B.V., Veldhoven (NL)

(72) Inventors: Ziyang Ma, Mountain View, CA (US); Jin Cheng, Santa Clara, CA (US); Ya Luo, Saratoga, CA (US); Leiwu Zheng, San Jose, CA (US); Xin Guo, Sunnyvale, CA (US); Jen-Shiang Wang, Sunnyvale, CA (US); Yongfa Fan, Sunnyvale, CA (US); Feng Chen, San Jose, CA (US); Yi-Yin Chen, Santa Clara, CA (US); Chenji Zhang, San Jose, CA (US); Yen-Wen Lu, Saratoga, CA (US)

(73) Assignee: ASML NETHERLANDS B.V., Veldhoven (NL)

(*) Notice: Subject to any disclaimer, the term of this patent is extended or adjusted under 35 U.S.C. 154(b) by 754 days.

(21) Appl. No.: 17/442,662

(22) PCT Filed: Mar. 5, 2020

(86) PCT No.: PCT/EP2020/055785
§ 371 (c)(1),
(2) Date: Sep. 24, 2021

(87) PCT Pub. No.: WO2020/193095
PCT Pub. Date: Oct. 1, 2020

(65) Prior Publication Data
US 2022/0179321 A1    Jun. 9, 2022

Related U.S. Application Data

(60) Provisional application No. 62/823,029, filed on Mar. 25, 2019, provisional application No. 62/951,097, filed on Dec. 20, 2019.

(51) Int. Cl.
*G06T 7/00* (2017.01)
*G03F 7/00* (2006.01)

(52) U.S. Cl.
CPC ........ *G06T 7/0004* (2013.01); *G03F 7/70525* (2013.01); *G06T 2207/20081* (2013.01);
(Continued)

(58) Field of Classification Search
None
See application file for complete search history.

(56) References Cited

U.S. PATENT DOCUMENTS

| 5,229,872 | A | 7/1993 | Mumola |
| 5,296,891 | A | 3/1994 | Vogt et al. |

(Continued)

FOREIGN PATENT DOCUMENTS

| CN | 107526864 | 12/2017 |
| JP | 2004279950 | 10/2004 |

(Continued)

OTHER PUBLICATIONS

Y. Lin et al., "Data Efficient Lithography Modeling with Transfer Learning and Active Data Selection," Jun. 27, 2018 (Year: 2018).*

(Continued)

*Primary Examiner* — Bernard Krasnic
(74) *Attorney, Agent, or Firm* — Pillsbury Winthrop Shaw Pittman LLP

(57) ABSTRACT

A method for training a patterning process model, the patterning process model configured to predict a pattern that will be formed by a patterning process. The method involves obtaining an image data associated with a desired pattern, a measured pattern of the substrate, a first model including a first set of parameters, and a machine learning model including a second set of parameters; and iteratively determining values of the first set of parameters and the second set of parameters (Continued)

parameters to train the patterning process model. An iteration involves executing, using the image data, the first model and the machine learning model to cooperatively predict a printed pattern of the substrate; and modifying the values of the first set of parameters and the second set of parameters such that a difference between the measured pattern and the predicted pattern is reduced.

21 Claims, 29 Drawing Sheets

(52) U.S. Cl.
CPC ............... *G06T 2207/20084* (2013.01); *G06T 2207/30148* (2013.01)

(56) References Cited

U.S. PATENT DOCUMENTS

| | | | |
|---|---|---|---|
| 5,523,193 | A | 6/1996 | Nelson |
| 5,969,441 | A | 10/1999 | Loopstra et al. |
| 6,046,792 | A | 4/2000 | Van Der Werf et al. |
| 7,003,758 | B2 | 2/2006 | Ye et al. |
| 7,587,704 | B2 | 9/2009 | Ye et al. |
| 7,642,022 | B2 * | 1/2010 | Yoshii ................. G03F 1/36 430/30 |
| 8,200,468 | B2 | 6/2012 | Ye et al. |
| 2008/0216027 | A1 | 9/2008 | White et al. |
| 2010/0315614 | A1 | 12/2010 | Hansen |
| 2011/0224963 | A1 | 9/2011 | Isoyan et al. |
| 2018/0300434 | A1 | 10/2018 | Hu et al. |
| 2019/0086810 | A1 | 3/2019 | Tel et al. |
| 2019/0310554 | A1 * | 10/2019 | Middlebrooks ......... G03F 7/705 |
| 2019/0377847 | A1 * | 12/2019 | Sha ...................... G06F 18/214 |
| 2020/0380362 | A1 * | 12/2020 | Cao .......................... G06N 3/08 |

FOREIGN PATENT DOCUMENTS

| | | |
|---|---|---|
| JP | 2007193037 | 8/2007 |
| JP | 2009042275 | 2/2009 |
| JP | 2009224409 | 10/2009 |
| JP | 2010122438 | 6/2010 |
| JP | 2010232542 | 10/2010 |
| JP | 2010538474 | 12/2010 |
| JP | 2017129896 | 7/2017 |
| JP | 2019083306 | 5/2019 |
| TW | 201828335 | 8/2018 |
| TW | 201832020 | 9/2018 |
| WO | 2010059954 | 5/2010 |
| WO | 2017171891 | 10/2017 |
| WO | 2018125220 | 7/2018 |
| WO | 2018153866 | 8/2018 |
| WO | WO-2018153866 A1 * | 8/2018 ......... G03F 7/70125 |
| WO | 2019162346 | 8/2019 |
| WO | WO-2019162346 A1 * | 8/2019 ............... G03F 1/36 |

OTHER PUBLICATIONS

X. Ma et al., "Fast lithography aerial image calculation method based on machine learning," Aug. 3, 2017 (Year: 2017).*
H. Yang et al., "Layout Hotspot Detection With Feature Tensor Generation and Deep Biased Learning," Jun. 18, 2017 (Year: 2017).*
Japanese Office Action issued in corresponding Japanese Patent Application No. 2021-551938, dated Oct. 5, 2022.
Taiwanese Office Action issued in corresponding Taiwanese Patent Application No. 110139786, dated Jun. 13, 2022.
Office Action issued in Korean Patent Application No. 10-2021-7030792, dated Sep. 20, 2023.
Office Action issued in corresponding Japanese Patent Application No. 2023-054693, dated Mar. 7, 2024.
Office Action issued in corresponding Chinese Patent Application No. 202080024772.2, dated Mar. 13, 2024.
International Search Report and Written Opinion issued in corresponding PCT Patent Application No. PCT/EP2020/055785, dated Jun. 12, 2020.
Taiwanese Office Action issued in corresponding Taiwanese Patent Application No. 109109826, dated Mar. 11, 2021.
Kostas, Adam et al.: "Using machine learning in the physical modeling of lithographic processes", Proc. of SPIE, vol. 10962 (Apr. 4, 2019).
Wang, Shibing, et al.: "Machine learning assisted SRAF placement for full chip", Proc. of SPIE, vol. 10451 (Oct. 16, 2017).
Spence, C.: "Full-Chip Lithography Simulation and Design Analysis—How OPC Is Changing IC Design", Proc. of SPIE, vol. 5751, pp. 1-14 (2005).
Cao, Y. et al.: "Optimized Hardware and Software for Fast, Full Chip Simulation", Proc. of SPIE, vol. 5754 (2005).
Rosenbluth, A.E. et al.: "Optimum Mask and Source Patterns to Print a Given Shape", Journal of Microlithography, Microfabrication, Microsystems 1(1), pp. 13-20 (2002).
Granik, Y.: "Source Optimization for Image Fidelity and Throughput", Journal of Microlithography, Microfabrication, Microsystems 3(4), pp. 509-522 (Oct. 2004).
Socha, R. et. al.: "Simultaneous Source Mask Optimization (SMO)", Proc. of SPIE, vol. 5853 (2005).

* cited by examiner

METHOD FOR TRAINING OR USING A PROCESS MODEL FOR DETERMINING A PATTERN IN A PATTERNING PROCESS

CROSS-REFERENCE TO RELATED APPLICATIONS

This application is the U.S. national phase entry of PCT Patent Application No. PCT/EP2020/055785, which was filed on Mar. 5, 2020, which claims the benefit of priority of U.S. Patent Application No. 62/823,029, which was filed on Mar. 25, 2019, and of U.S. Patent Application No. 62/951,097, which was filed on Dec. 20, 2019, each of which is incorporated herein in its entirety by reference.

TECHNICAL FIELD

The description herein relates to lithographic apparatuses and processes, and more particularly to a tool to train a patterning process model and using the trained model to determine patterns that will be printed on a substrate in a patterning process.

BACKGROUND

A lithographic projection apparatus can be used, for example, in the manufacture of integrated circuits (ICs). In such a case, a patterning device (e.g., a mask) may contain or provide a circuit pattern corresponding to an individual layer of the IC ("design layout"), and this circuit pattern can be transferred onto a target portion (e.g. comprising one or more dies) on a substrate (e.g., silicon wafer) that has been coated with a layer of radiation-sensitive material ("resist"), by methods such as irradiating the target portion through the circuit pattern on the patterning device. In general, a single substrate contains a plurality of adjacent target portions to which the circuit pattern is transferred successively by the lithographic projection apparatus, one target portion at a time. In one type of lithographic projection apparatuses, the circuit pattern on the entire patterning device is transferred onto one target portion in one go; such an apparatus is commonly referred to as a wafer stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the circuit pattern on the patterning device are transferred to one target portion progressively. Since, in general, the lithographic projection apparatus will have a magnification factor M (generally <1), the speed F at which the substrate is moved will be a factor M times that at which the projection beam scans the patterning device. More information with regard to lithographic devices as described herein can be gleaned, for example, from U.S. Pat. No. 6,046,792, incorporated herein by reference.

Prior to transferring the circuit pattern from the patterning device to the substrate, the substrate may undergo various procedures, such as priming, resist coating and a soft bake. After exposure, the substrate may be subjected to other procedures, such as a post-exposure bake (PEB), development, a hard bake and measurement/inspection of the transferred circuit pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

As noted, microlithography is a central step in the manufacturing of ICs, where patterns formed on substrates define functional elements of the ICs, such as microprocessors, memory chips etc. Similar lithographic techniques are also used in the formation of flat panel displays, micro-electro mechanical systems (MEMS) and other devices.

As semiconductor manufacturing processes continue to advance, the dimensions of functional elements have continually been reduced while the amount of functional elements, such as transistors, per device has been steadily increasing over decades, following a trend commonly referred to as "Moore's law". At the current state of technology, layers of devices are manufactured using lithographic projection apparatuses that project a design layout onto a substrate using illumination from a deep-ultraviolet illumination source, creating individual functional elements having dimensions well below 100 nm, i.e. less than half the wavelength of the radiation from the illumination source (e.g., a 193 nm illumination source).

This process in which features with dimensions smaller than the classical resolution limit of a lithographic projection apparatus are printed, is commonly known as low-$k_1$ lithography, according to the resolution formula $CD=k_1 \times \lambda/NA$, where $\lambda$ is the wavelength of radiation employed (currently in most cases 248 nm or 193 nm), NA is the numerical aperture of projection optics in the lithographic projection apparatus, CD is the "critical dimension"—generally the smallest feature size printed—and $k_1$ is an empirical resolution factor. In general, the smaller $k_1$ the more difficult it becomes to reproduce a pattern on the substrate that resembles the shape and dimensions planned by a circuit designer in order to achieve particular electrical functionality and performance. To overcome these difficulties, sophisticated fine-tuning steps are applied to the lithographic projection apparatus and/or design layout. These include, for example, but not limited to, optimization of NA and optical coherence settings, customized illumination schemes, use of phase shifting patterning devices, optical proximity correction (OPC, sometimes also referred to as "optical and process correction") in the design layout, or other methods generally defined as "resolution enhancement techniques" (RET). The term "projection optics" as used herein should be broadly interpreted as encompassing various types of optical systems, including refractive optics, reflective optics, apertures and catadioptric optics, for example. The term "projection optics" may also include components operating according to any of these design types for directing, shaping or controlling the projection beam of radiation, collectively or singularly. The term "projection optics" may include any optical component in the lithographic projection apparatus, no matter where the optical component is located on an optical path of the lithographic projection apparatus. Projection optics may include optical components for shaping, adjusting and/or projecting radiation from the source before the radiation passes the patterning device, and/or optical components for shaping, adjusting and/or projecting the radiation after the radiation passes the patterning device. The projection optics generally exclude the source and the patterning device.

BRIEF SUMMARY

The present disclosure provides a number of improvements in the area of computational lithography. Particularly, training a patterning process model comprising a first model and a machine learning model in a framework such as deep learning convolutional neural network. The trained model can be further used to determine patterns that will be printed on a substrate in a patterning process. Advantage of the present disclosure is include, but not limited to, providing an improved way to measure characteristics of a pattern that will be printed on a substrate, and make accurate predictions of metrology images, thereby saving metrology time and resources.

According to an embodiment, there is provided a method for training a patterning process model, the patterning process model configured to predict a pattern that will be formed on a patterning process. The method involves obtaining (i) an image data associated with a desired pattern, (ii) a measured pattern of the substrate, the measured pattern is associated with the desired pattern, (iii) a first model associated with an aspect of the patterning process, the first model comprising a first set of parameters, and (iv) a machine learning model associated with another aspect of the patterning process, the machine learning model comprising a second set of parameters; and iteratively determining values of the first set of parameters and the second set of parameters to train the patterning process model. An iteration involves executing, using the image data, the first model and the machine learning model to cooperatively predict a printed pattern of the substrate; and modifying the values of the first set of parameters and the second set of parameters such that a difference between the measured pattern and the predicted pattern of the patterning process model is reduced.

In an embodiment, the first model and the machine learning model are configured and trained in a deep convolutional neural network framework.

In an embodiment, the training involves: predicting the printed pattern by forward propagation of outputs of the first model and the machine learning model; determining the difference between the measured pattern and the predicted pattern of the patterning process model; determining a differential of the difference with respect to the first set of parameters and the set of second parameters; and determining values of the first set of parameters and the second set of parameters by backward propagation of the outputs of the first model and the machine learning model based on the differential of the difference.

Furthermore, according to an embodiment, there is provided a method for determining optical proximity corrections for a patterning process, the method comprising: obtaining an image data associated with a desired pattern; executing a trained patterning process model using the image data to predict a pattern that will be printed on the substrate; and determining optical proximity corrections and/or defects using the predicted pattern that will be printed on the substrate subjected to the patterning process.

Furthermore, according to an embodiment, there is provided a method for training a machine learning model configured to determine an etch bias related to an etching process. The method including obtaining (i) resist pattern data associated with a target pattern to be printed on a substrate, (ii) physical effect data characterizing effects of the etching process on the target pattern, and (iii) measured bias between a resist pattern and an etched pattern formed on a printed substrate; and training, based on the resist pattern data, the physical effect data, and the measured bias, the machine learning model to reduce a difference between the measured bias and the predicted etch bias.

Furthermore, according to an embodiment, there is provided a system for determining an etch bias related to an etching process. The system including a semiconductor process apparatus; and a processor. The processor is configured to: determine, via executing a physical effect model, physical effect data characterizing effects of the etching process on the substrate; execute a trained machine learning model using the resist pattern and the physical effect data as input to determine the etch bias; and control the semiconductor apparatus or the etching process based on the etch bias.

Furthermore, according to an embodiment, there is provided a method for calibrating a process model, the process model configured to generate a simulated contour. The method including obtaining (i) measurement data at a plurality of measurement locations on a pattern, and (ii) contour constraints specified based on the measurement data; and calibrating the process model by adjusting values of model parameters of the process model until the simulated contour satisfies the contour constraints.

Furthermore, according to an embodiment, there is provided a method for calibrating a process model configured to predict an image of a target pattern. The method including obtaining, (i) a reference image associated with the target pattern, and (ii) a gradient constraint specified with respect to the reference image; and calibrating the process model such that the process model generates a simulated image that (i) minimizes an intensity difference or a frequency difference between the simulated image and the reference image, and (ii) satisfies the gradient constraint.

Furthermore, according to an embodiment, there is provided a system for calibrating a process model, the process model configured to generate a simulated contour. The system including a metrology tool configured to obtain measurement data at a plurality of measurement locations on a pattern; and a processor. The processor is configured to: calibrate the process model by adjusting values of model parameters of the process model until the simulated contour satisfies the contour constraints, the contour constraints being based on the measurement data.

Furthermore, according to an embodiment, there is provided a system for calibrating a process model configured to predict an image of a target pattern. The system including a metrology tool configured to obtain a reference image associated with the target pattern; and a processor. The processor is configured to calibrate the process model such that the process model generates a simulated image that (i) minimizes an intensity difference or a frequency difference between the simulated image and the reference image, and (ii) satisfies a gradient constraint related to the reference image.

Furthermore, according to an embodiment, there is provided a non-transitory computer-readable media comprising instructions that, when executed by one or more processors, cause operations including: obtaining (i) resist pattern data associated with a target pattern to be printed on a substrate, (ii) physical effect data characterizing effects of an etching process on the target pattern, and (iii) measured bias between a resist pattern and an etched pattern formed on a printed substrate; and training, based on the resist pattern data, the physical effect data, and the measured bias, the machine learning model to reduce a difference between the measured bias and the predicted etch bias.

Furthermore, according to an embodiment, there is provided a non-transitory computer-readable media comprising instructions that, when executed by one or more processors, cause operations including obtaining (i) measurement data at a plurality of measurement locations on a pattern, and (ii) contour constraints specified based on the measurement data; and calibrating a process model by adjusting values of model parameters of the process model until the simulated contour satisfies the contour constraints.

Furthermore, according to an embodiment, there is provided a non-transitory computer-readable media comprising instructions that, when executed by one or more processors, cause operations including obtaining, (i) a reference image associated with a target pattern, and (ii) a gradient constraint specified with respect to the reference image; and calibrating a process model such that the process model generates a simulated image that (i) minimizes an intensity difference or a frequency difference between the simulated image and the reference image, and (ii) satisfies the gradient constraint.

BRIEF DESCRIPTION OF THE DRAWINGS

Embodiments will now be described, by way of example only, with reference to the accompanying drawings in which.

Figure 1:
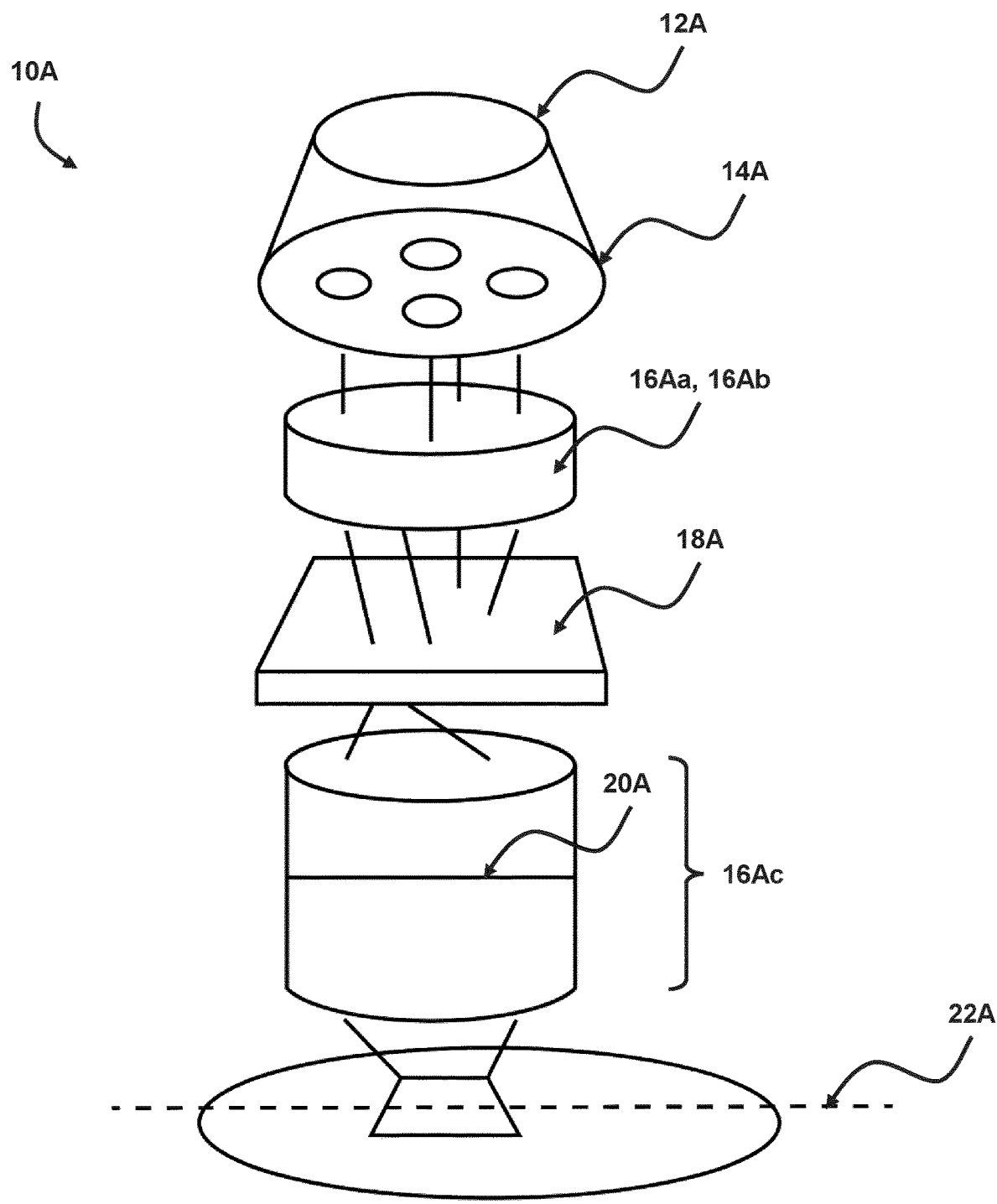
FIG. 1 is a block diagram of various subsystems of a lithography system, according to an embodiment.

Embodiments will now be described in detail with reference to the drawings, which are provided as illustrative examples so as to enable those skilled in the art to practice the embodiments. Notably, the figures and examples below are not meant to limit the scope to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the embodiments will be described, and detailed descriptions of other portions of such known components will be omitted so as not to obscure the description of the embodiments. In the present specification, an embodiment showing a singular component should not be considered limiting; rather, the scope is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the scope encompasses present and future known equivalents to the components referred to herein by way of illustration.

DETAILED DESCRIPTION

Although specific reference may be made in this text to the manufacture of ICs, it should be explicitly understood that the description herein has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as interchangeable with the more general terms "mask", "substrate" and "target portion", respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range 5-20 nm).

The term "optimizing" and "optimization" as used herein mean adjusting a lithographic projection apparatus such that results and/or processes of lithography have more desirable characteristics, such as higher accuracy of projection of design layouts on a substrate, larger process windows, etc.

Further, the lithographic projection apparatus may be of a type having two or more substrate tables (and/or two or more patterning device tables). In such "multiple stage" devices the additional tables may be used in parallel, or preparatory steps may be carried out on one or more tables while one or more other tables are being used for exposures. Twin stage lithographic projection apparatuses are described, for example, in U.S. Pat. No. 5,969,441, incorporated herein by reference.

The patterning device referred to above comprises or can form design layouts. The design layouts can be generated utilizing CAD (computer-aided design) programs, this process often being referred to as EDA (electronic design automation). Most CAD programs follow a set of predetermined design rules in order to create functional design layouts/patterning devices. These rules are set by processing and design limitations. For example, design rules define the space tolerance between circuit devices (such as gates, capacitors, etc.) or interconnect lines, so as to ensure that the circuit devices or lines do not interact with one another in an undesirable way. The design rule limitations are typically referred to as "critical dimensions" (CD). A critical dimension of a circuit can be defined as the smallest width of a line or hole or the smallest space between two lines or two holes. Thus, the CD determines the overall size and density of the designed circuit. Of course, one of the goals in integrated circuit fabrication is to faithfully reproduce the original circuit design on the substrate (via the patterning device).

The term "mask" or "patterning device" as employed in this text may be broadly interpreted as referring to a generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include:

- a programmable mirror array. An example of such a device is a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The required matrix addressing can be performed using suitable electronic means. More information on such mirror arrays can be gleaned, for example, from U.S. Pat. Nos. 5,296,891 and 5,523,193, which are incorporated herein by reference.
- a programmable LCD array. An example of such a construction is given in U.S. Pat. No. 5,229,872, which is incorporated herein by reference.

As a brief introduction, FIG. 1 illustrates an exemplary lithographic projection apparatus 10A. Major components are a radiation source 12A, which may be a deep-ultraviolet excimer laser source or other type of source including an extreme ultra violet (EUV) source (as discussed above, the lithographic projection apparatus itself need not have the radiation source), illumination optics which define the partial coherence (denoted as sigma) and which may include optics 14A, 16Aa and 16Ab that shape radiation from the source 12A; a patterning device 14A; and transmission optics 16Ac that project an image of the patterning device pattern onto a substrate plane 22A. An adjustable filter or aperture 20A at the pupil plane of the projection optics may restrict the range of beam angles that impinge on the substrate plane 22A, where the largest possible angle defines the numerical aperture of the projection optics NA=sin($\Theta_{max}$).

In an optimization process of a system, a figure of merit of the system can be represented as a cost function. The optimization process boils down to a process of finding a set of parameters (design variables) of the system that minimizes the cost function. The cost function can have any suitable form depending on the goal of the optimization. For example, the cost function can be weighted root mean square (RMS) of deviations of certain characteristics (evaluation points) of the system with respect to the intended values (e.g., ideal values) of these characteristics; the cost function can also be the maximum of these deviations (i.e., worst deviation). The term "evaluation points" herein should be interpreted broadly to include any characteristics of the system. The design variables of the system can be confined to finite ranges and/or be interdependent due to practicalities of implementations of the system. In case of a lithographic projection apparatus, the constraints are often associated with physical properties and characteristics of the hardware such as tunable ranges, and/or patterning device manufacturability design rules, and the evaluation points can include physical points on a resist image on a substrate, as well as non-physical characteristics such as dose and focus.

In a lithographic projection apparatus, a source provides illumination (i.e. light); projection optics direct and shapes the illumination via a patterning device and onto a substrate. The term "projection optics" is broadly defined here to include any optical component that may alter the wavefront of the radiation beam. For example, projection optics may include at least some of the components 14A, 16Aa, 16Ab and 16Ac. An aerial image (AI) is the radiation intensity distribution at substrate level. A resist layer on the substrate is exposed and the aerial image is transferred to the resist layer as a latent "resist image" (RI) therein. The resist image (RI) can be defined as a spatial distribution of solubility of the resist in the resist layer. A resist model can be used to calculate the resist image from the aerial image, an example of which can be found in commonly assigned U.S. patent application Ser. No. 12/315,849, disclosure of which is hereby incorporated by reference in its entirety. The resist model is related only to properties of the resist layer (e.g., effects of chemical processes which occur during exposure, PEB and development). Optical properties of the lithographic projection apparatus (e.g., properties of the source, the patterning device and the projection optics) dictate the aerial image. Since the patterning device used in the lithographic projection apparatus can be changed, it is desirable to separate the optical properties of the patterning device from the optical properties of the rest of the lithographic projection apparatus including at least the source and the projection optics.

Figure 2:
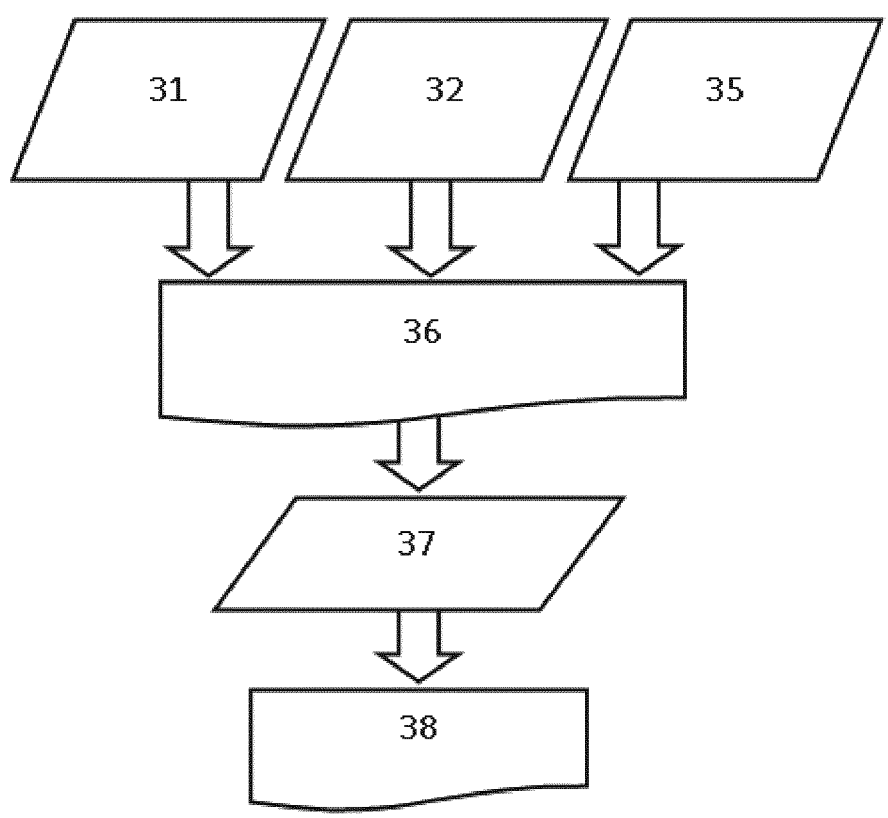
FIG. 2 is a block diagram of simulation models corresponding to the subsystems in FIG. 1, according to an embodiment.

An exemplary flow chart for simulating lithography in a lithographic projection apparatus is illustrated in FIG. 2. A source model 31 represents optical characteristics (including radiation intensity distribution and/or phase distribution) of the source. A projection optics model 32 represents optical characteristics (including changes to the radiation intensity distribution and/or the phase distribution caused by the projection optics) of the projection optics. A design layout model 35 represents optical characteristics (including changes to the radiation intensity distribution and/or the phase distribution caused by a given design layout 33) of a design layout, which is the representation of an arrangement of features on or formed by a patterning device. An aerial image 36 can be simulated from the design layout model 35, the projection optics model 32 and the design layout model 35. A resist image 38 can be simulated from the aerial image 36 using a resist model 37. Simulation of lithography can, for example, predict contours and CDs in the resist image.

More specifically, it is noted that the source model 31 can represent the optical characteristics of the source that include, but not limited to, NA-sigma (σ) settings as well as any particular illumination source shape (e.g. off-axis radiation sources such as annular, quadrupole, and dipole, etc.). The projection optics model 32 can represent the optical characteristics of the of the projection optics that include aberration, distortion, refractive indexes, physical sizes, physical dimensions, etc. The design layout model 35 can also represent physical properties of a physical patterning device, as described, for example, in U.S. Pat. No. 7,587,704, which is incorporated by reference in its entirety. The objective of the simulation is to accurately predict, for example, edge placements, aerial image intensity slopes and CDs, which can then be compared against an intended design. The intended design is generally defined as a pre-OPC design layout which can be provided in a standardized digital file format such as GDSII or OASIS or other file format.

From this design layout, one or more portions may be identified, which are referred to as "clips". In an embodiment, a set of clips is extracted, which represents the complicated patterns in the design layout (typically about 50 to 1000 clips, although any number of clips may be used). As will be appreciated by those skilled in the art, these patterns or clips represent small portions (i.e. circuits, cells or patterns) of the design and especially the clips represent small portions for which particular attention and/or verification is needed. In other words, clips may be the portions of the design layout or may be similar or have a similar behavior of portions of the design layout where critical features are identified either by experience (including clips provided by a customer), by trial and error, or by running a full-chip simulation. Clips usually contain one or more test patterns or gauge patterns.

An initial larger set of clips may be provided a priori by a customer based on known critical feature areas in a design layout which require particular image optimization. Alternatively, in another embodiment, the initial larger set of clips may be extracted from the entire design layout by using some kind of automated (such as, machine vision) or manual algorithm that identifies the critical feature areas.

Stochastic variations of the patterning process (e.g., resist process) potentially limits lithography (e.g., EUV lithography), for example, in terms of shrink potential of features and exposure-dose specification, which in turn affects wafer throughput of the patterning process. In an embodiment, stochastic variations of a resist layer may manifest in stochastic failures such as closed holes or trenches, or broken lines. Such resist related stochastic variations impact and limit successful high volume manufacturing (HVM) more than compared to, for example, stochastic CD variation, which is a traditional metric of interest to measure and adjust performance of the patterning process.

In patterning processes (e.g., photolithography, electron beam lithography, etc.), an energy sensitive material (e.g., photoresist) deposited on a substrate undergoes a pattern transfer step (e.g., light exposure). Following the pattern transfer step, various post steps such as resist baking, and subtractive processes such as resist development, etches, etc. are applied. These post-exposure steps or processes exert various effects, causing the patterned layer or etched substrate to form structures having dimensions different from targeted dimensions.

In computational lithography, patterning process models (e.g., discussed in FIG. 2) related to different aspects of the patterning process such as a mask model, an optical model, resist model, post-exposure models, etc. may be employed to predict a pattern that will be printed on the substrate. The patterning process models when properly calibrated (e.g., using measurement data associated with a printed wafer) can produce accurate prediction of patterns dimensions output from the patterning processes. For example, a patterning process model of post-exposure processes is calibrated based on empirical measurements. The calibration process involves exposing test substrates by varying different process parameters (e.g., dose, focus, etc.), measuring resulting critical dimensions printed patterns after post-exposure processes, and calibrating the patterning process model to the measured results. In practice, fast and accurate models serve to improve device performance (e.g., yield), enhance process windows, patterning recipes, and/or increase complexity of design pattern.

Patterning process is a complex process and not all aspects may be modeled based on physics/chemistry involved in the patterning process. For example, some effects of the post-exposure processes are well understood and can be modelled with mathematical expressions of physical terms (e.g., parameters associated with a resist process) that describe the physics/chemistry of the process. For example, an acid-base diffusion after the exposure can be modelled by a Gaussian filter on the aerial image. In an embodiment, some of the physical terms (e.g., associated with dose, focus, intensity, pupil, etc.) are associated with and tunable via tunable parameters (e.g., tunable knobs) of the lithographic apparatus, thereby enabling real-time control of the patterning process via the tunable knobs. In an embodiment, some physical terms may not be directly tunable via tuning knobs, but may be explain the physics/chemistry of a process (e.g., aerial image formation, resist image formation, etc.). For example, resist model comprises a Gaussian filter on the aerial image, for modelling an acid-base diffusion in the resist after the exposure. This sigma term is generally not tunable via tunable knobs. Even so, the values of such physical term (e.g., sigma) may be determined based on empirical equations or physics-based equations that model effects of a process (e.g., resist).

However, several aspects or effects of other post-exposure effects are not-well understood, thus difficult to model using physics/chemistry based equations. In such cases, in the present disclosure, machine learning models such as a deep convolutional neural networks (CNNs) are trained for modeling less-understood aspects of the patterning process (e.g., post-exposure). The process models of the present disclosure alleviates demand of understanding, e.g., post-exposure process in order for model development, and lifts dependence on an engineer's personal experience for model tuning. In an embodiment of the present disclosure, the trained CNN yields model accuracy comparable or superior to that produced with traditional techniques.

Figure 3:
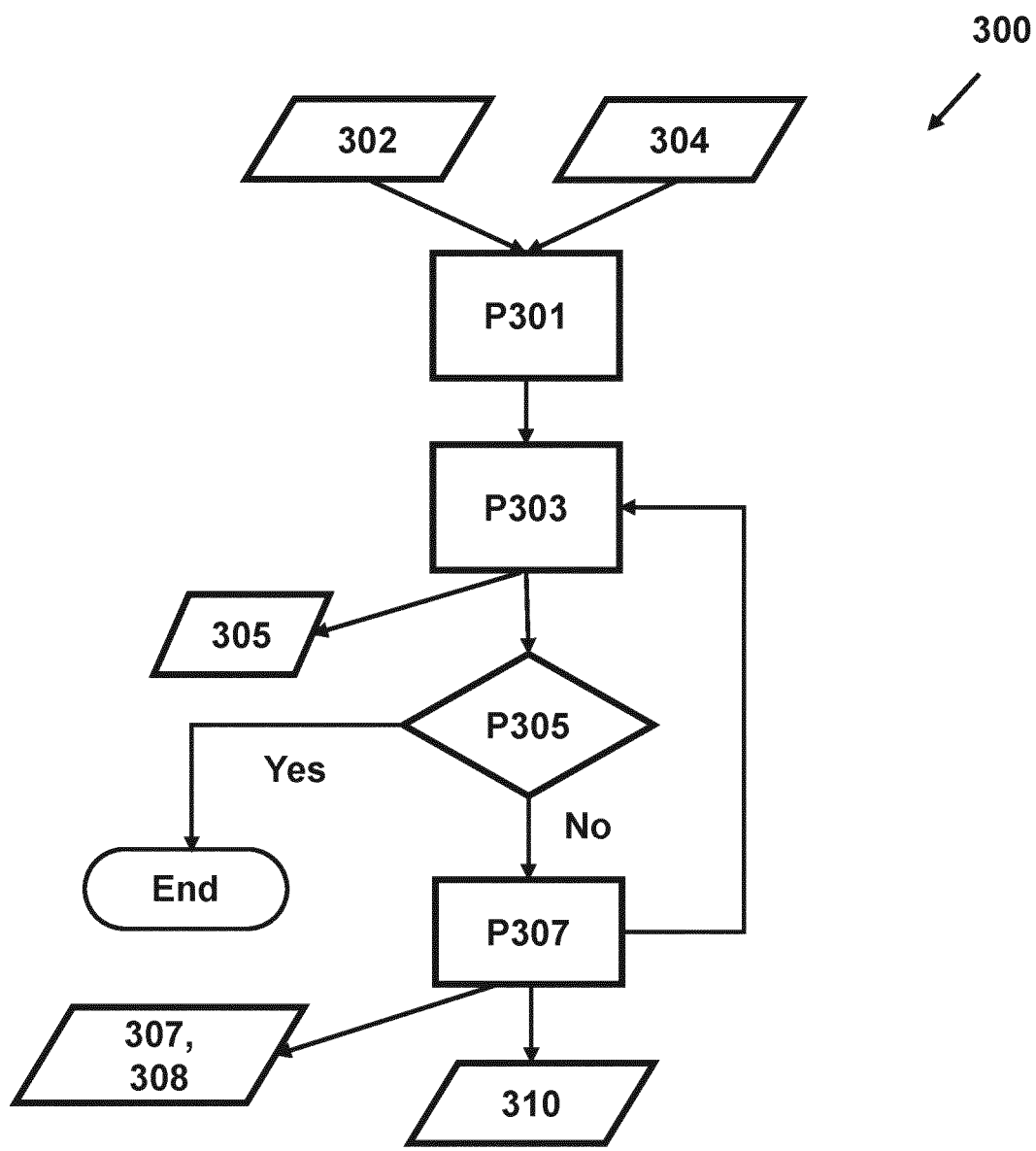
FIG. 3 is a flow chart of a method for training a patterning process model, the patterning process model configured to predict a pattern that will be formed in a patterning process, according to an embodiment.

FIG. 3 is a flow chart of a method for training a patterning process model, the patterning process model configured to predict a pattern that will be formed in a patterning process. As mentioned earlier, some aspects of the patterning processes are well-understood and can be modelled using mathematical expressing employing physical terms configured to accurately describe physical effects of the patterning process. In addition, there are some aspects that may not be accurately modelled using physical terms. The present method employs two different models: a first model configured to describe known aspects via physical terms (e.g., optics related parameters, resist related parameters of the patterning process) and a second model (i.e., a machine learning model) configured to describe not-well understood (i.e., in terms of physics/chemistry) aspects.

There are several advantages of employing mixed models (i.e., the first and the second model) to cooperatively predict a pattern of the patterning processes. For example, physical terms are relatively simpler to calculate, and models employing such physical terms are less susceptible to overfitting. By incorporating physical terms in conjunction with e.g., CNN model reduces the complexity of CNN by several folds, reduces the risk of overfitting, and improves runtime of the patterning process simulations. On the other hand, existing models employ CNNs to model both known and unknown effects which may result in unnecessarily complex CNN model that are prone to overfitting and slow in runtime.

The method 300, in process P301, involves obtaining (i) an image data 302 associated with a desired pattern, (ii) a measured pattern 304 of the substrate, the measured pattern 304 is associated with the desired pattern, (iii) a first model associated with an aspect (e.g., whose effects can be accurately modelled by physics/chemistry based equations) of the patterning process, the first model comprising a first set of parameters 307, and (iv) a machine learning model associated with another aspect (e.g., whose effects may not be accurately modelled by physics/chemistry based equations) of the patterning process, the machine learning model comprising a second set of parameters 308.

In an embodiment, the image data 302 generally refers to any input to the patterning process model configured to predict effects of an aspect of the patterning process or a final pattern that will be printed on the substrate. In an embodiment, image data 302 is an aerial image, a mask image, a resist image, or other outputs related to one or more aspects of the patterning process. In an embodiment, the obtaining of the aerial image, mask image, resist image, etc. comprises simulating a patterning process, as discussed in FIG. 2.

In an embodiment, the patterning process model comprises the first model coupled to a second model (e.g., a machine learning model). The first model may be connected to the machine learning model in a series or in a parallel combination (e.g., as discussed with FIGS. 4A-4C). In an example configuration (e.g., FIG. 4A), the series combination of the models involves providing output of the first model as an input to the machine learning model. In another example configuration, the series combination of the models involves providing output of the machine learning model as an input to the first model. In yet another example (e.g., 4B), the parallel combination of the models involves providing the same input to the first model and the machine learning model, combining output of the first model and the machine learning model, and determining the predicted printed pattern based on the combined outputs of the respective models. In yet another example (e.g., 4C), the patterning process model may be configured to include both series and parallel arrangement of the first model, a machine learning model, and/or another physics-based or machine learning model.

In an embodiment, the first model is an empirical model comprising physical terms that accurately describes effects of a first aspect of the patterning process. In an embodiment, the first model correspond to the first aspect related to an acid-based diffusion after exposure of the substrate. In an embodiment, an example first model is a resist model. The first set of parameters of the resist model correspond to at least one of the following physical terms: an initial acid distribution; an acid diffusion; an image contrast; a long range pattern loading effect; a long range pattern loading effect; an acid concentration after neutralization; a base concentration after neutralization; a diffusion due to high acid concentration; a diffusion due to high base concentration; a resist shrinkage; a resist development; or two-dimensional convex curvature effects. An example empirical model employing physical terms is as follows:

$$R = cA \times A + cMav \times MAV + cAp \times Ap * GAp + cBp \times Bp * GBp + cAm \times A * GAm + \ldots$$

In the above equation, R is a resist image predicted based on the physical terms and associated coefficients (an example of first set of parameters) therewith. In the above equation, cA is an coefficient of an initial acid distribution A, which can be represented by an aerial image, cMav is a coefficient of a long range pattern loading effect MAV, which can be determined as an average of a mask image, similarly, other physical terms are associated with one or more coefficients. These coefficients are determined during the training process, discussed below.

In an embodiment, the machine learning model is a neural network that model a second aspect of the patterning process having relatively less physics based understanding. In an embodiment, the second set of parameters includes weights and bias of one or more layers of the neural network. During the training process (e.g., involving processes P303, P307), the weights and biases are adjusted in cooperation with the first set of parameters such that a difference between the predicted pattern and the measured pattern is reduced. In an embodiment, the patterning process model correspond to the second aspect of a post-exposure process of the patterning process.

In an embodiment, the method further involves iteratively determining values of the first set of parameters 307 and the second set of parameters 308 to train the patterning process model. In an embodiment, an iteration involves executing process P303, P305, and P307.

The method 300, in process P303, involves executing, using the image data 302, the first model and the machine learning model to cooperatively predict a pattern of the substrate. Process P305, involves determining a difference between the measured pattern 304 and the predicted pattern 305 of the patterning process model and further determine whether the difference is reduced or minimized Process P307, involves modifying the values of the first set of parameters 307 and the second set of parameters 308 such that a difference between the measured pattern 304 and the predicted pattern 305 of the patterning process model is reduced.

In an embodiment, the modified values are determined based on an optimization technique such as a gradient decent method that guides how to modify the values of the first set of parameters and the second set of parameters such that a gradient of the difference with respect to the respective parameters is reduced. After several iterations, a global or a local optimum values of the parameters are obtained such that the difference in prediction and measurements is minimized Thus, the patterning process model is calibrated (or trained) and can be further employed for improving the patterning process via OPC, defect detection, hot spot ranking, or other known applications of the patterning process model.

Figure 4A:
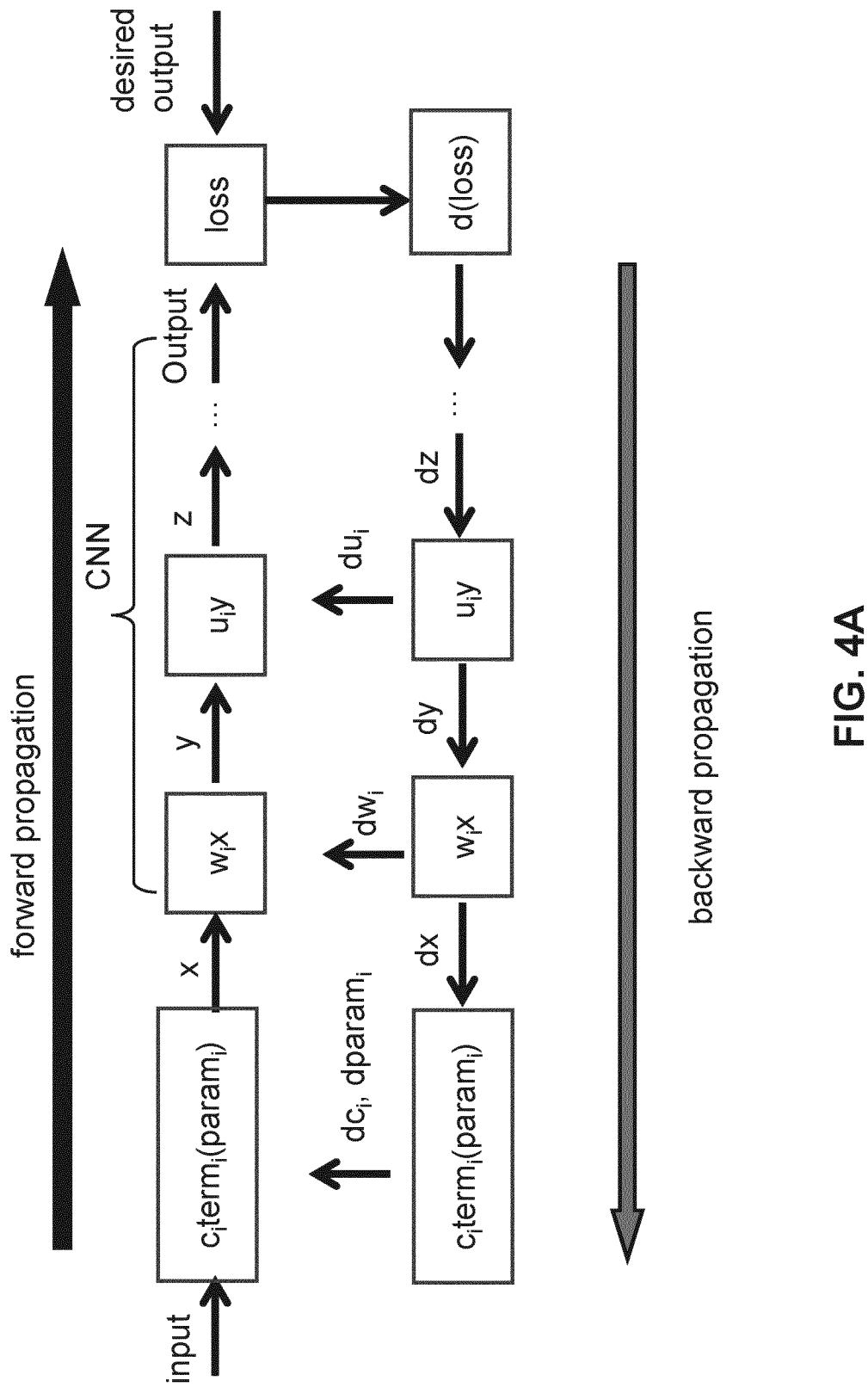
FIGS. 4A, 4B, and 4C illustrate example configurations of the patterning process model comprising a first model and a second model (e.g., a machine learning model), according to an embodiment.
Figure 4B:
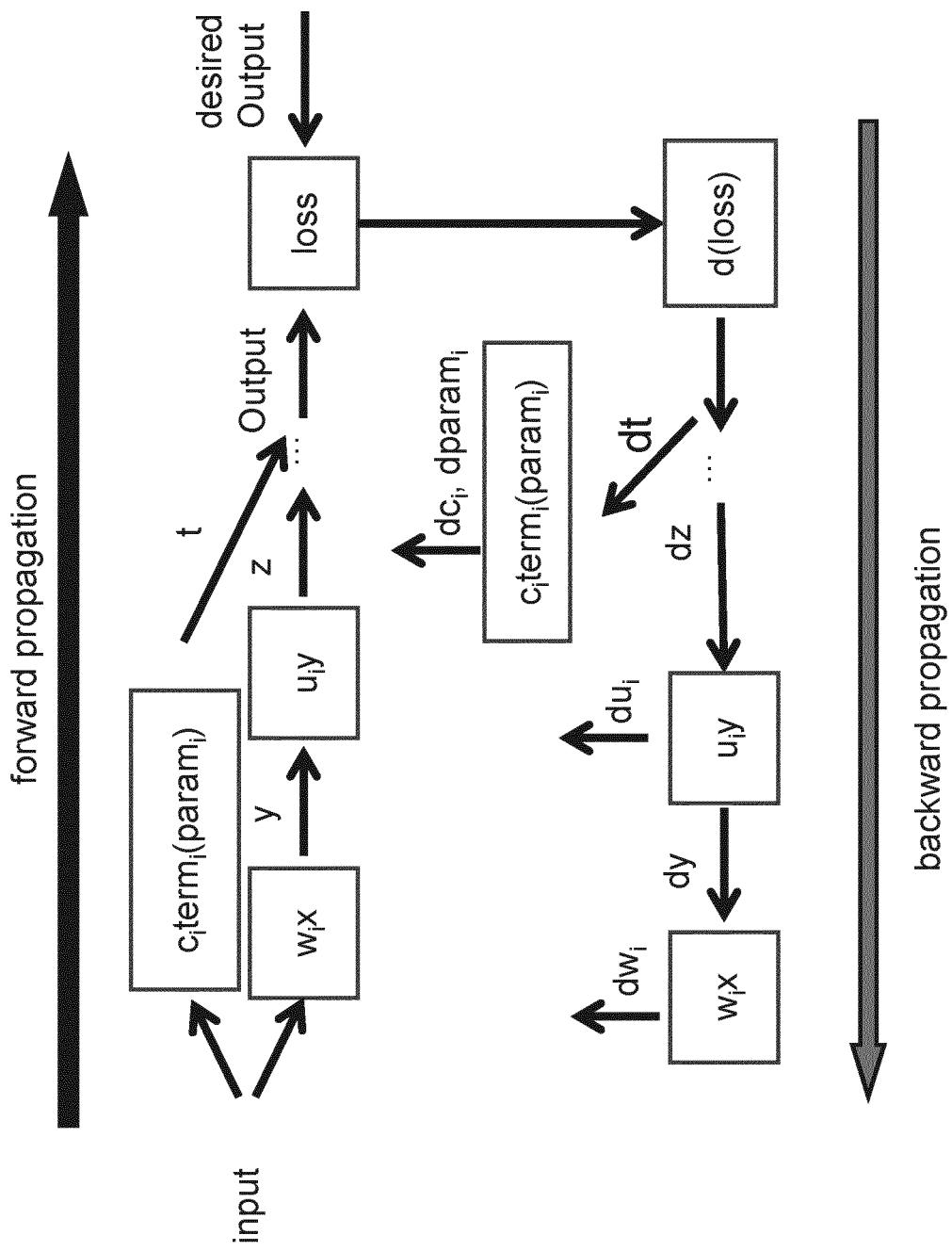
Figure 4C:
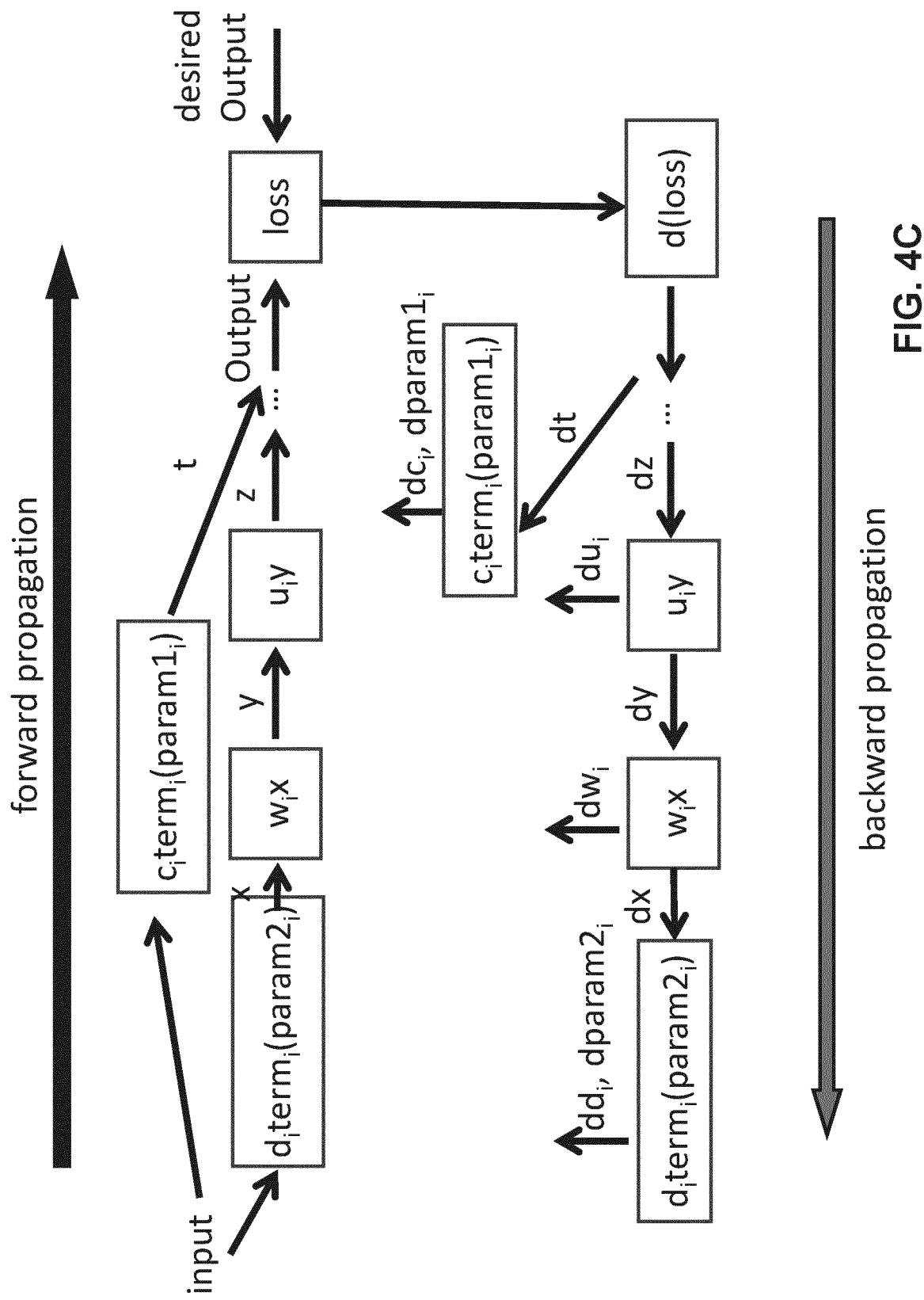

FIGS. 4A, 4B, and 4C illustrate example configurations of the patterning process model comprising the first model and the second model. The first model and the second model (CNN) are trained together, during which the first set of parameters of the first model and the second set of parameters of the CNN are determined.

FIG. 4A illustrates a series combination of the first model and the second model, where the first model is represented as a function of physical parameters and the second model represented as a CNN. The training process is iterative, where an iteration (or each iteration) involves determining values of the first set of parameters such as $c_i$ (which are coefficients related to the physical terms) and the values of the second set of parameters such as weights such as $w_i$ and $u_i$ of the CNN. The coefficients $c_i$ directly operate (e.g., via multiplication, power, addition, or other mathematical operation) with values of the physical terms $term_i$ (e.g., variables such as dose, focus, acid concentrations, etc. related to the patterning process) to determine a first output of the first model. In an embodiment, the physical terms $term_i$ may be also be a function (e.g., Gaussian filter) associated with parameters $param_i$ (e.g., a, b of the Gaussian filter). While, weights of CNN are not directly operate with a particular physical term, the CNN can receive, as input, the first output from the first model and predict a second output associated with another aspect (e.g., not-well understood) of the patterning process.

In embodiment, initial values of the first set of parameters and the second set of parameters may be assigned to start the simulation process. In embodiment, the input to the first model is, for example, an aerial image of a desired pattern to be printed on the substrate. Based on the input (e.g., aerial image), the first model predicts a first output (e.g., a resist pattern) of an aspect (e.g., exposure of resist with aerial image) of the patterning process. The first output is further input to the CNN which further predicts a pattern that will be printed on the substrate. The predicted pattern is compared with a desired output. The desired output may be a measured pattern measured via, for example, SEM tool, corresponding to the desired pattern. The comparison involves computing a difference between the predicted and the measured pattern. Based on the difference, a back propagation may be performed wherein the values of the weights such as $w_i$ and $u_i$ of the CNN may be computed such that the difference is reduced. Furthermore, the values of $c_i$ and/or $param_i$ may be computed. For example a gradient based method may be employed where a differential of the difference with respect to the weights is computed to generate a gradient map. The gradient map acts as a guide to modify the values of the weights and/or $c_i$ and/or $param_i$ such that the difference between the prediction and the desired output is reduced (in an embodiment, minimized). After the patterning process model is trained, the model is capable of determining a pattern that will account for both the well-understood physical effects, as well not-well understood physical effects of the patterning process (e.g., of a post exposure process).

FIG. 4B illustrates a parallel combination of the first model and the second model. The first model and the second model are represented in a similar manner as discussed above in FIG. 4A. Also, the initial values of the first and second set of the parameters may be similar to begin the training process to determine final values of the first and second set of parameters. In parallel combination, a same input (e.g., an aerial image of a desired pattern) is simultaneously provided to both the first model and the second model. Each model predicts an output which can be combined to form a pattern will be printed on the substrate. The predicted output can be compared with a desired output (e.g., a measure pattern of the printed substrate), as discussed above. Then, back propagation may be performed and a gradient-decent method may be employed to determine a differential of the difference with respect to each of the first and second parameters, as discussed earlier. Further, the values of the first and second parameters are selected such that the difference is reduced (in an embodiment, minimized). After several iterations, the predicted patterns converges to the desired pattern and the model training is said to be complete.

FIG. 4C illustrates is a more general patterning process model, where the process model is configured to include (i) one or more models including physical terms (e.g., variables of the patterning process) of the patterning process and (ii) one or more machine learning models (CNNs). In an embodiment, inputs and outputs may be communicated between different models as shown to cooperatively predict a pattern that will be printed on the substrate. The predicted pattern may be compared with the desired pattern to determined values of parameters of the each of the models. The values may be determined, for example, using a gradient-decent method as discussed earlier. The values are modified during a back propagation of the output of different layers of CNN and/or models, as shown in FIG. 4C.

Thus, in an embodiment, as discussed above in FIG. 4A-4C, the first model and the machine learning model are configured and trained together in a deep convolutional neural network framework (DCNN). The training involves predicting the printed pattern by forward propagation of outputs (e.g., x, y, z, etc. in FIGS. 4A-4C) of the first model and the machine learning model; determining the difference (e.g., loss in FIG. 4A-4C) between the measured pattern and the predicted pattern (e.g., output) of the patterning process model; determining a differential of the difference (e.g., d(loss)) with respect to the first set of parameters (e.g., $c_i$, $param_i$, $z_i$, $u_i$, $w_i$, etc.) and the set of second parameters; and determining values of the first set of parameters and the second set of parameters by backward propagation of the outputs of the first model and the machine learning model based on the differential of the difference. For example, in FIGS. 4A-4C, during backward propagation, following differentials may be computed and used to adjust first and second set of parameters: d(loss)/dt; d(loss)/dz; d(loss)/du, d(loss)/dw; and so on.

Figure 5:
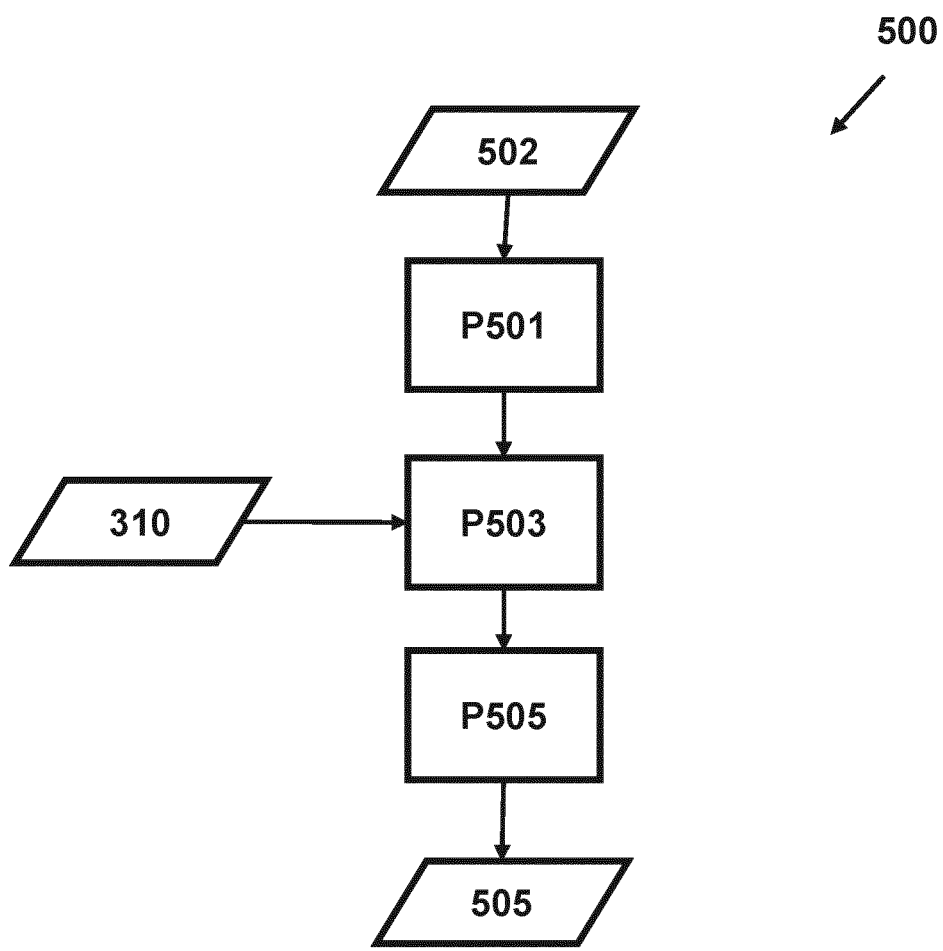
FIG. 5 is a flow chart of a method for determining optical proximity corrections for a patterning process based on the predicted pattern of the trained patterning process model of FIG. 3, according to an embodiment.

FIG. 5 is a flow chart of a method for determining optical proximity corrections for a patterning process. The optical proximity corrections are associated with a desired pattern to be printed on the substrate. The method 500, in process P501, involves obtaining an image data 502 associated with the desired pattern. In embodiment, the image data 502 is an aerial image and/or a mask image of the desired pattern.

Further, process P503 involves executing a trained patterning process model 310 using the image data 502 to predict a pattern that will be printed on the substrate. As discussed earlier in the method 300, the trained patterning process model 310 comprises a first model of a first aspect of the patterning process and a machine learning model of a second aspect of the patterning process configured to corporately predict the pattern that will be printed on the substrate. The first model and the machine learning model are in a series combination and/or a parallel combination, as discussed with respect to FIGS. 4A-4C. In an embodiment, the first model is an empirical model (e.g., resist model discussed earlier) that accurately model physics of the first aspect of a post exposure process of the patterning process. In an embodiment, the first model correspond to the first aspect related to an acid-based diffusion after exposure of the substrate. In an embodiment, the machine learning model is a neural network that models the second aspect of the patterning process having relatively less physics based understanding.

Based on the predicted pattern, process P505 involves determining optical proximity corrections and/or defects. In an embodiment, the determining the optical proximity correction involves adjusting a desired pattern and/or placing assist features around the desired pattern such that a difference between the predicted pattern and the desired pattern is reduced. Example OPC processes are discussed with respect to FIG. 18-FIG. 21 later in the disclosure.

In an embodiment, the determining the defects involves performing a lithographic manufacturability check (LMC) on the predicted pattern. The LMC determines whether features of the predicted pattern satisfy the desired specifications. If the LMC determines that the specifications are not satisfied, the features is considered defective. Such defect information may be useful in determined a yield of the patterning process. Further based on the defects (or yield), one or more variables of the patterning process may be modified to improve the yield.

As mentioned earlier, some effects of the patterning processes or post-exposure process are well understood and can be modelled with mathematical expressions including physical terms related to a pattern formed on the substrate. For example, some of the physical terms (e.g., associated with dose, focus, intensity, pupil, etc.) are associated with and tunable via tunable parameters (e.g., tunable knobs) of the lithographic apparatus, thereby enabling real-time control of the patterning process via the tunable knobs. In an embodiment, some physical terms may not be directly tunable via tuning knobs, but may be explain the physics/chemistry of a process (e.g., aerial image formation, resist image formation, etc.). For example, resist model comprises a Gaussian filter (comprising a sigma or variance term) on the aerial image, for modelling an acid-base diffusion in the resist after the exposure. This sigma term is generally not tunable via tunable knobs. Even so, the values of such physical term (e.g., sigma) may be determined based on empirical equations or physics-based equations that model effects of a process (e.g., resist).

As discussed herein, there are provided various methods (e.g., FIGS. 4A-4C) for training a patterning process model based on the physical terms. There are several advantages of employing physical terms for training or calibrating patterning process models. For example, physical terms are relatively simpler to calculate, and models employing such physical terms are less susceptible to overfitting. In an embodiment, by incorporating physical terms in conjunction with e.g., CNN model reduces the complexity of CNN by several folds, reduces the risk of overfitting, and improves runtime of the patterning process simulations. The following description discusses additional methods for training and calibrating process models based on physical terms.

Figure 6:
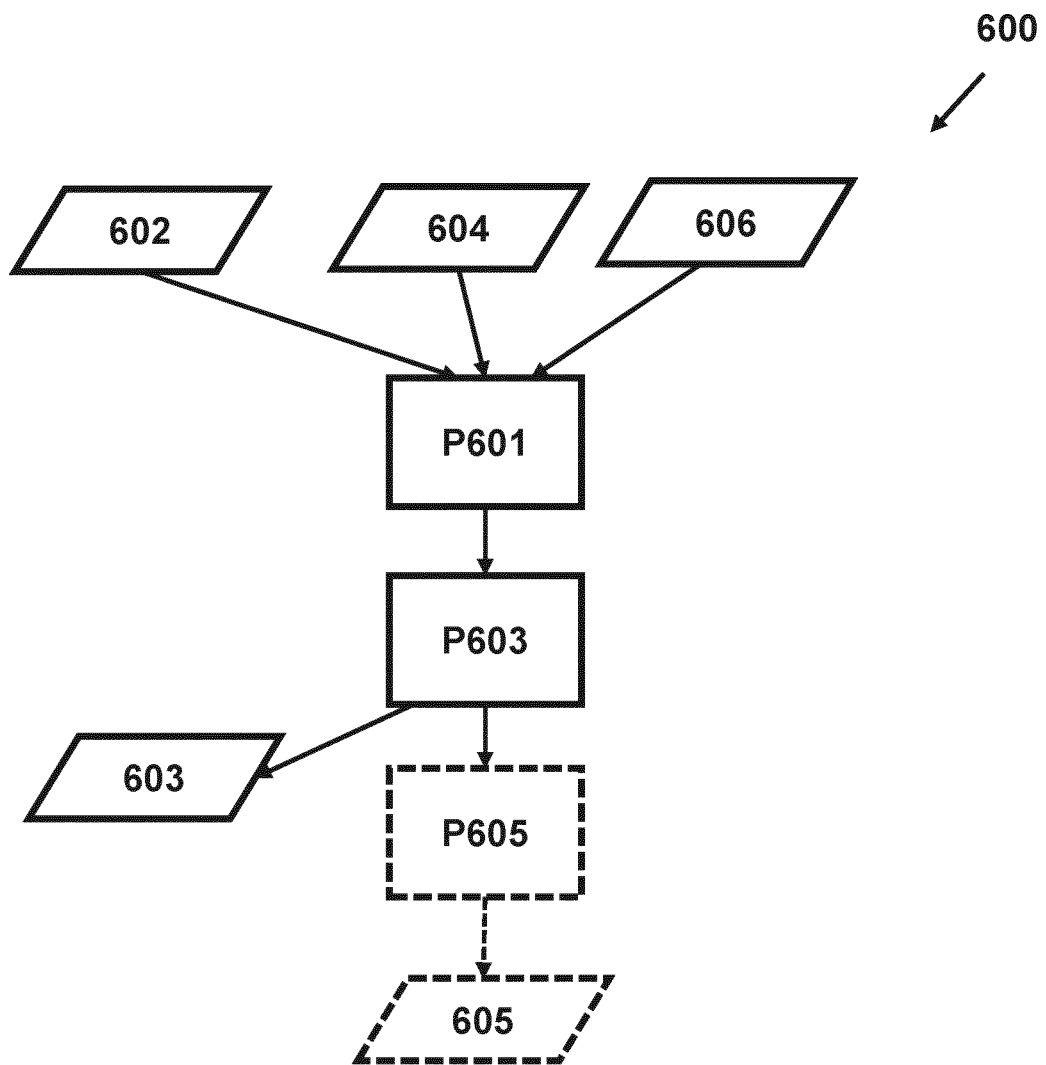
FIG. 6 is a flow chart of a method for training a machine learning model to determine an etch bias related to an etching process, according to an embodiment.

FIG. 6 is a flow chart of a method 600 for training a machine learning model to determine an etch bias related to an etching process. In an embodiment, predicting such etch bias may be beneficial to improve an etch recipe, or settings of a current lithographic apparatus. The method 600 includes several procedures described in detail as follows.

Procedure P601 includes obtaining (i) resist pattern data 602 associated with a target pattern to be printed on a substrate, (ii) physical effect data 604 characterizing effects of the etching process on the target pattern, and (iii) measured bias 606 between a resist pattern and an etched pattern formed on a printed substrate.

In an embodiment, the measured bias 606 data may be determined based on metrology data of a previously patterned substrate. For example, the measured bias 606 can be a difference between a resist pattern formed on the substrate and an etched pattern formed on a printed substrate. The resist pattern may be determined via a metrology tool or simulation of a patterning process. In an embodiment, the etched pattern formed on the printed pattern is measured via a metrology tool (e.g., a SEM tool described with respect to FIGS. 16 and 17, or an optical metrology tool). In an embodiment, dimensions of resist patterns (e.g., CDs of features) may be increase than the etched patterns, due to e.g., removal of material (e.g., via descumming) This difference in resist patterns and the etch patterns on the printed substrate includes variations induced due to etching process. For example, variations are induced due to variation etch rates, variation in amount of plasma concentration, variation in aspect ratio (e.g., height of a feature/width of the feature), or other physical aspects related to the resist pattern, the etch process, or a combination thereof.

In an embodiment, the resist pattern data 602 is represented as a resist image. The resist image can be a pixelated image, where an intensity of pixels indicate a resist region and a pattern portion formed within the resist portion. For example, the pattern portion can be edges/contours of a resist pattern. In an embodiment, the obtaining of the resist pattern data 602 involves executing, using the target pattern to be printed on the substrate, one or more process model including a resist model of the patterning process.

In an embodiment, the physical effect data 604 can be data related to an etch term characterizing an etching effect, the etch terms comprises at least one of: a concentration of plasma within a trench of the resist pattern associated with the target pattern; a concentration of plasma on top of a resist layer of the substrate; a loading effect determined by convolving the resist pattern with a Gaussian Kernel having a specified model parameters; a change in the loading effect on the resist pattern during the etching process; a relative position of the resist pattern with respect to neighboring patterns on the substrate; an aspect ratio of the resist pattern; or terms related to a combined effect of two or more etching process parameters.

In an embodiment, the obtaining of the physical effect data 604 involves executing a physical effect model including one or more of the etch terms and a Gaussian kernel specified for the respective one or more of the etch terms. In an embodiment, the physical effect data 604 is represented as a pixelated image wherein each pixel intensity is indicative of the physical effect on the resist pattern associated with the target pattern. FIGS. 7-10 illustrate some example physical effect data 604.

Figure 7:
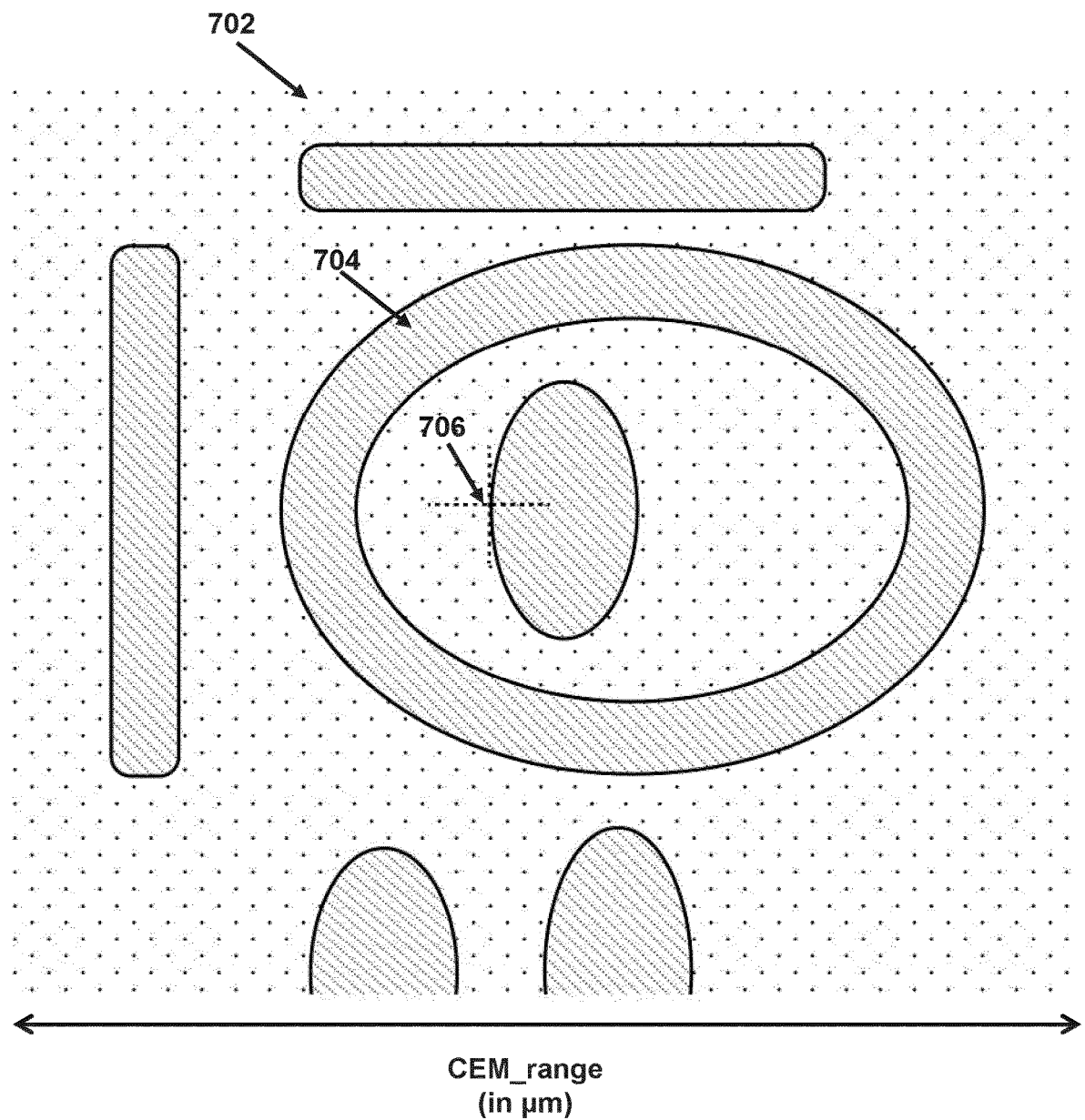
FIG. 7 is an example resist pattern, according to an embodiment.

FIG. 7 is an example resist image including a resist pattern formed in a resist 702. The resist pattern includes a trench area 704 formed within the resist 702. In an embodiment, an etch model may be calibrated based on a plasma concentration etch method (CEM). The CEM method uses plasma loading on edges of the resist trench 704 to characterize etch induced biasing behaviors. In an embodiment, evaluation points e.g., 706 may located at edges of the resist trenches e.g., 704, and CEM_range is an etch proximity range that the etch model is considering. In an embodiment, the etch physical term can be CR image or a CT image related to the plasma loading effects that are generated from the resist pattern. For example, CT0 is defined as the plasma loading on unit edge length from plasma from the trench areas (e.g., 704) at the beginning of etch, and CR0 is defined as the plasma loading on unit edge length from plasma from the resist areas (e.g., 702) at the beginning of etch. At time t, CT0 and CR0 become CT and CR respectively, wherein the conversion with respect to time may be based on an exponential term including a parameter related to side wall deposition or etching reaction constant. In an embodiment, a product of CT image and CR image may be used to characterize the etch bias due to proximity effects.

Figure 8:
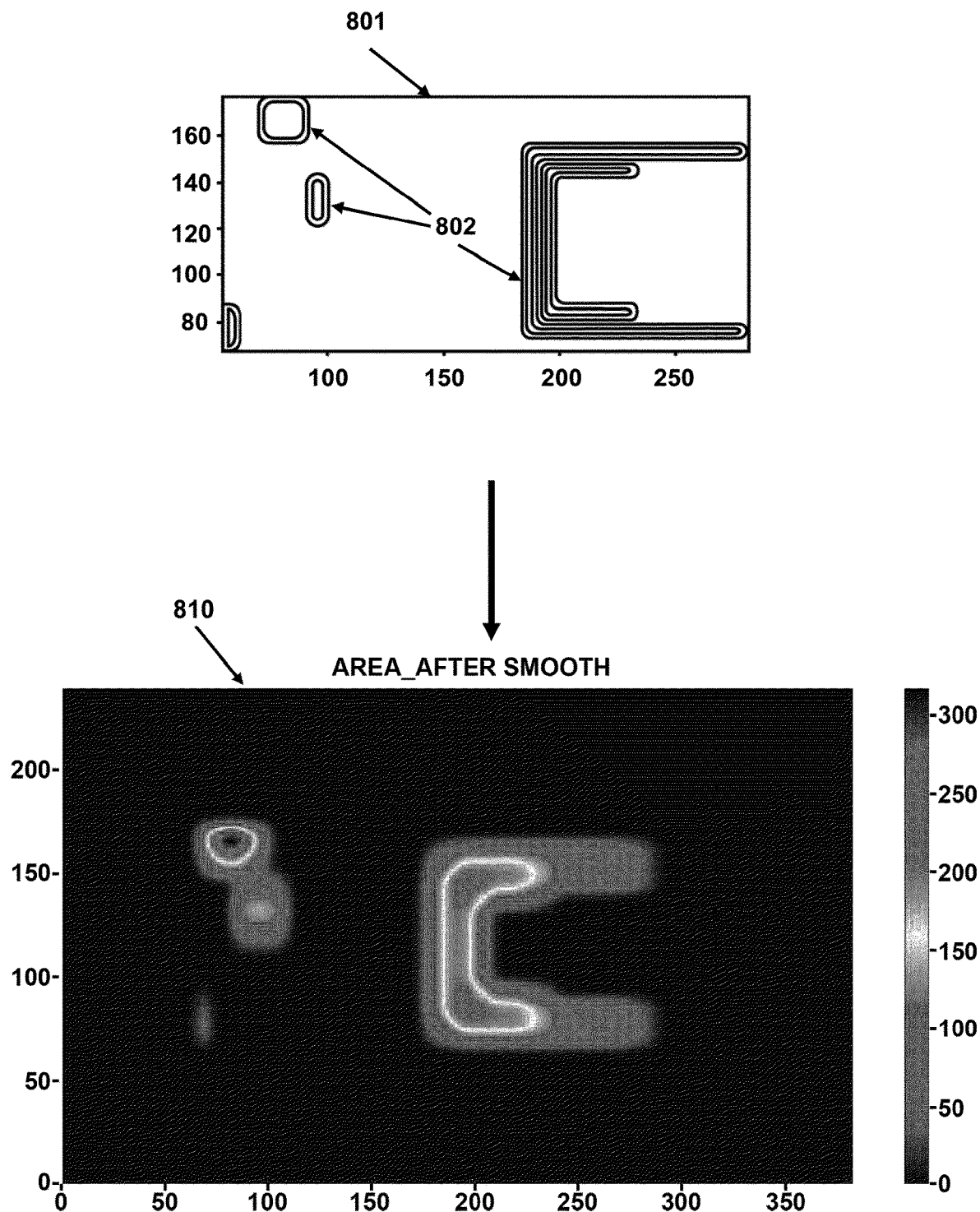
FIG. 8 is an example physical effect data based on the resist pattern, according to an embodiment.

FIG. 8 illustrates an example etch physical term (e.g., CR image) generated from a resist pattern 801. The resist pattern 801 includes resist contours 802 (or resist pattern edges), then the plasma loading effect from resist area (e.g., CR discussed above) may be computed, which is illustrates as the CR image 810. In an embodiment, a CT image may be generated, where the CT image is the flip-tone image for CR. For example, the bright pixels in CR become dark pixels in CT, and vice versa. The CR image 810 can be used to characterize the etch bias from proximity effects. This example etch bias is an example bias applied to the resist contour 802 to compensate for such proximity effects.

Figure 9:
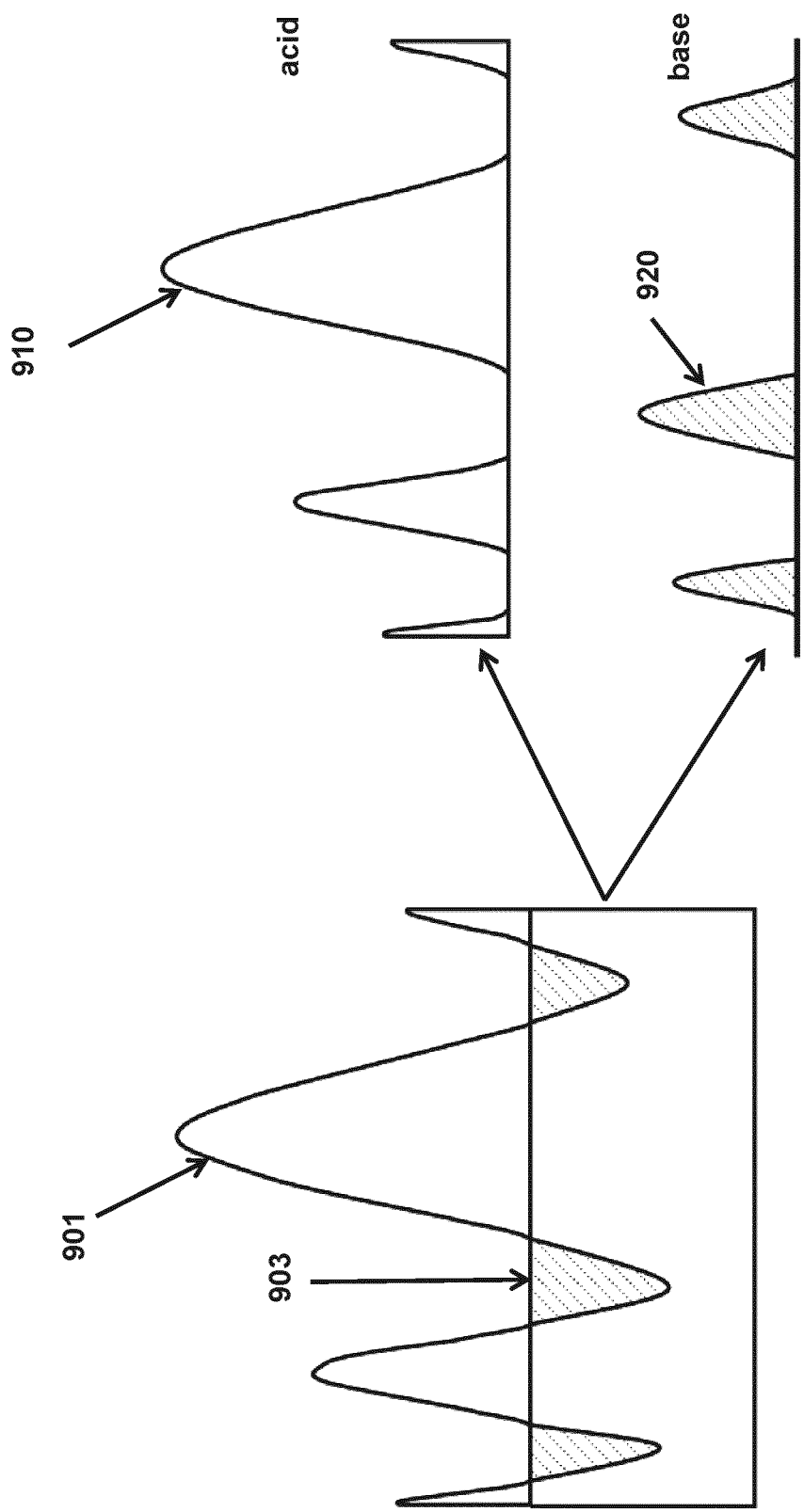
FIG. 9 is an example acid-base concentration in a resist, according to an embodiment.

FIG. 9 shows another example modeling of a physical term, e.g., an acid-base reaction. In an embodiment, the acid-base reaction may be modeled by truncation on acid concentration by quencher base. For example, an acid-base reaction (e.g., illustrated as an image 901) can be characterized a linear combination coefficients of acid concentration 910 and a base concentration 920. In an embodiment, truncation terms (e.g., 903) simulate the reaction and diffusion of the acid and base in forming a final acid density distribution image 901. Multiple truncation terms represent different times during post exposure bake. Depending on the truncation term 903 (e.g., a truncation value of the truncation term), the acid concentration 910 and the base concentration 920 will change.

Figure 10:
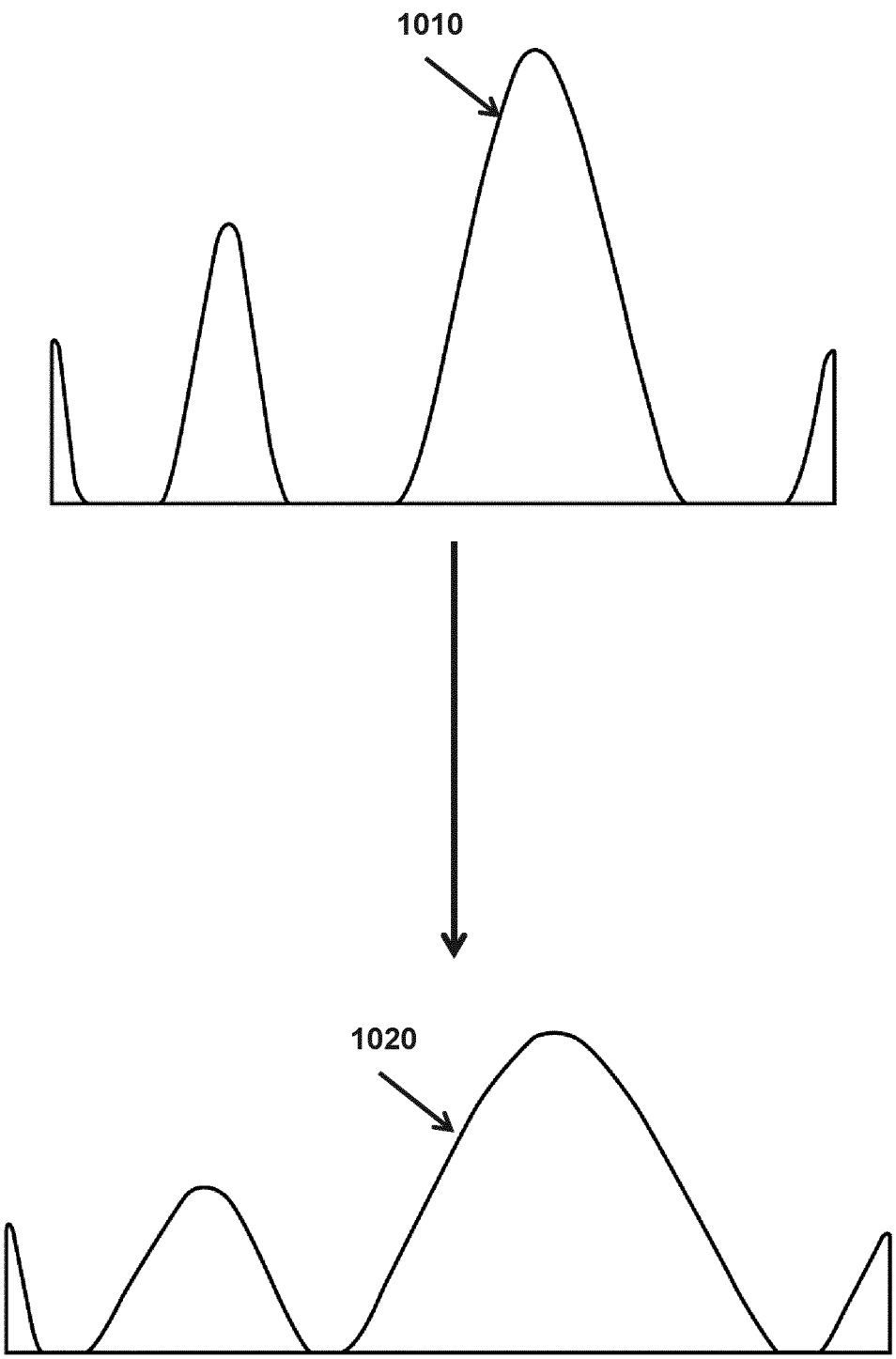
FIG. 10 is an example physical effect data based on acid-base distribution, according to an embodiment.

FIG. 10 is another example physical term generated using an aerial image 1010. For example, the physical term can be an initial acid distribution 1020 at certain location of aerial image. In an embodiment, a linear transform of the aerial image can be performed using Gaussian filtering of aerial image. In an embodiment, the Gaussian filter includes sigma term which is generally not tunable via tunable knobs, but can be set to determine long term, intermediate range, short range effects associated with etching. For example, the sigma values can be set based on data from previously printed and etched substrate data.

Referring back to FIG. 6, procedure P603 includes training, based on the resist pattern data 602, the physical effect data 604, and the measured bias 606, the machine learning model 603 to reduce a difference between the measured bias 606 and the predicted etch bias. After the training process is complete, the machine learning model 603 can be referred as the trained machine learning model 603. This trained machine learning model 603 can be employed in the pattering process to improve a performance metric, e.g., yield of the printed substrates. For example, based on the etch bias predicted by the trained machine learning model 603, the process parameters can be adjusted so that the number of failures of a pattern are reduced thereby improving the yield.

In an embodiment, the machine learning model 603 is configured to receive the resist pattern data 602 at a first layer of the machine learning model 603, and the physical effect data 604 is received at a last layer of the machine learning model 603. In an embodiment, the machine learning model 603 is configured to receive the resist pattern data 602 and the physical effect data 604 at the first layer of the machine learning model 603. It can be understood by a person skilled in the art that the present disclosure is not limited to a particular configuration of the machine learning model 603.

In an embodiment, an output of the last layer of the machine learning model 603 is a linear combination of (i) the etch bias predicted by executing the machine learning model 603 using the resist pattern data 602 as an input, and (ii) another etch bias determined based on the physical effect data 604 related to the etching process.

In an embodiment, the output of the last layer of the machine learning model 603 is an etch bias map from which the etching bias is extracted. The etch bias map is generated via: executing the machine learning model 603 using the resist pattern data 602 as the input to output an etch bias map, wherein the etch bias map includes a biased resist pattern; and combining the etch bias map with the physical effect data 604.

In an embodiment, the training of the machine learning model 603 is an iterative process involving (a) predicting, via executing the machine learning model 603 using the resist pattern data 602 and the physical effect data 604 as inputs, the etching bias; (b) determining the difference between the measured bias 606 and the predicted etching bias; (c) determining a gradient of the difference with respect to model parameters (e.g., weights associated with layers) of the machine learning model 603; (d) adjusting, using the gradient as a guide, model parameter values such that the difference between the measured bias 606 and the predicted etching bias is reduced; (e) determining whether the difference is minimized or breaches a training threshold; and (f) responsive to the difference not minimized or the training threshold not breached, performing steps (a)-(e).

In an embodiment, the method 600 may further involve at procedure P605, obtaining a resist contour of the resist pattern (e.g., 602 discussed above); and generating an etch contour 605 by applying the etching bias (e.g., determined by executing the trained machine learning model 603) to the resist contour (e.g., of 602).

Figure 11:
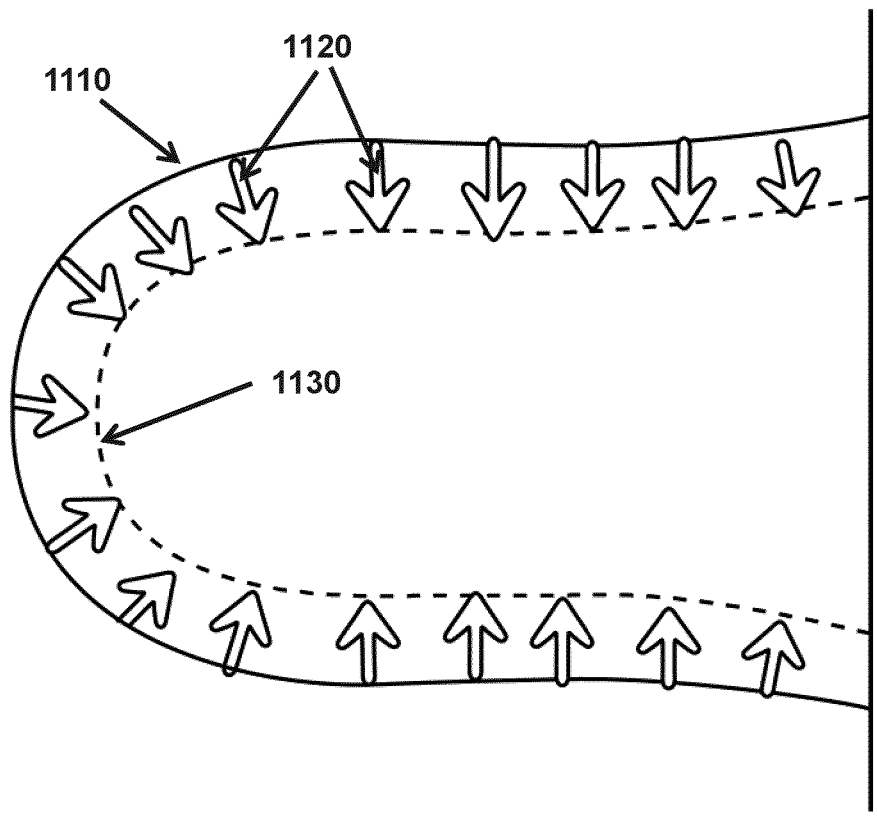
FIG. 11 is an example etch bias applied to an after development image (ADI) contour, according to an embodiment.

FIG. 11 illustrates an example etch bias determined via an etch model. In an embodiment, the etch model calculate after-etching-image (AEI) contours (e.g., 1130) by directly biasing (e.g., 1120) an after development image (ADI) contours (e.g., 1110). In an embodiment, a biasing direction of 1120 is perpendicular to the ADI contours 1110. A biasing amount of 1120 is variable, depending on an environment (e.g., features density) of ADI pattern and physical terms associated with the etching. For example, a positive bias amount moves the ADI contour outward while negative bias (e.g., 1120) amount moves the ADI contour 1110 inward. In other words, the etch bias can be positive, where the size of pattern 1110 element is bigger before etching than after the etching, or it is negative, where the size is smaller before etching than after the etching. In an embodiment, the etch model employs calibration/check gauges and perpendicular direction to ADI contours is with respect to such gauges. Then, the model can directly output AEI contours for LMC/OPC applications. For example, LMC can determine whether the AEI contours satisfy the size constraints related to the target pattern. AEI contours can be used to determine OPC for a mask pattern so that an overall yield of the patterning process is improved. For example, in the OPC process, a simulated contour (e.g., based on patterning process simulation) can be compared to the AEI contour and OPC can be determined based on the comparison. For example, mask pattern is modified so that the simulated pattern closely matches the AEI contour. Hence, an accurate prediction of AEI contour would improve the OPC of the mask pattern.

In an embodiment, the biasing amount that is determined by the model (e.g., 603) can be a linear combination of a number of physical terms $Term_i$, which are functions of the environment of one evaluation point i.

$$\text{etch bias} = \sum_i c_i * Term_i + \text{constant\_bias}$$

In an embodiment, the physical terms Term can be, for example, local or long range loading effect. In an example, effect can be determined by rasterizing, e.g., convolving a resist contour with a Gaussian Kernel or filter having a first set of parameters (e.g., sigma between 90-100 nm). Another physical term can be an intermediate stage loading determined using a Gaussian Kernel or filter having a second set of parameters (e.g., sigma between 100-200 nm). Another example physical term can be an aspect ratio. In an embodiment, the term can be high order, non-linear or combined effects.

Mathematically modeling the etch bias can improve the generation of feature dimensions of the final device. The results of this modeling can be used for a variety of purposes. For example, such results can be used to adjust the patterning process in terms of changing design, control parameters, and the like. For example, the results can be used to adjust one or more spatial properties of one or more of the elements provided by the patterned device, wherein the patterned device pattern is used to create a device that will be used for etching on the substrate pattern. Thus, once the patterned device pattern is transferred to the substrate, the device pattern on the substrate is effectively adjusted prior to etching to compensate for the etch variations that are expected to occur during the etch. As another example, one or more adjustments can be made to the lithography apparatus in terms of adjustments in dosage, focus, and the like. As will be appreciated, there may be more applications. Thus, compensating for etch variations can result in devices having more than one uniform feature size, one or more uniform electrical properties, and/or one or more improved (eg, closer to desired results) performance characteristics.

Moreover, while etch variations are sometimes detrimental to fabricating devices on a substrate, the etch bias can be used to create the desired structure on the substrate. By considering the degree of etch bias when fabricating the patterned device, it is possible to fabricate device features in devices on the substrate that are smaller than the optical resolution limitations of the pattern transfer procedure from the patterned device to the substrate. Thus, in this regard, the modeled results of the etch bias can be used to adjust the patterning process in terms of changing design, control parameters, and the like. Thus, modeling the etch bias in the etch process can help produce more accurate device features, such as by compensating for etch variations, such as by adapting the patterned device to (correctly) anticipate possible etch variations of the etch process (e.g., depending on the pattern density) The variation allows the actual features produced by the etching process after the (adjusted) lithography to be closer to the desired product specification.

In an embodiment, there is described a system for determining an etch bias related to an etching process implementing procedures (e.g., of method 600) discussed herein. For example, the system includes a semiconductor process apparatus (e.g., FIGS. 1, 23, 24, 25), and one or more processors (e.g., 104/105 of FIG. 22) configured to: determine, via executing a physical effect model, physical effect data 604 characterizing effects of the etching process on the substrate; execute a trained machine learning model 603 using the resist pattern and the physical effect data 604 as input to determine the etch bias; and control the semiconductor apparatus (e.g., FIG. 1) or the etching process based on the etch bias.

In an embodiment, the trained machine learning model 603 is trained e.g., according to the method 600. For example, the trained machine learning model 603 is trained using a plurality of resist patterns, the physical effect data 604 associated with each resist pattern of the resist patterns, and the measured bias 606 associated with each resist pattern, so that a difference between the measured bias 606 and the determined etch bias is minimized.

In an embodiment, the trained machine learning model 603 is a convolutional neural network (CNN) including specific weights and biases, wherein the weights and biases of the CNN are determined via a training process employing the plurality of resist patterns, the physical effect data 604 associated with each resist pattern of the resist patterns, and the measured bias 606 associated with each resist pattern, so that a difference between the measured bias 606 and the determined etch bias is minimized.

In an embodiment, the control of the semiconductor process apparatus (e.g., FIGS. 1, 23, 24, 25) includes adjusting values of one or more parameters of the semiconductor apparatus so that a yield of the patterning process is improved. In an embodiment, the adjusting values of the one or more parameters of the semiconductor process apparatus is iterative process. The iterative process involves (a) changing, via adjusting mechanisms of the semiconductor process apparatus, a current value of the one or more parameter; (b) obtaining, via the semiconductor process apparatus, the resist pattern printed on the substrate; (c) determining, via executing the trained machine learning model 603 using the resist pattern, the etch bias and an further determining the etch pattern by applying the etch bias to the resist pattern; (d) determining, based on the etch pattern, whether the yield of the patterning process is within a desired yield range; responsive to not in the yield range, performing steps (a)-(d).

In an embodiment, the control of the etching process involves determining the etch pattern by applying the etch bias to the resist pattern; determining, based on the etch pattern, the yield of the patterning process; and determining, based on the etch pattern, an etch recipe of the etching process so that the yield of the patterning process is improved. In an embodiment, the yield of the patterning process is percentage of etch patterns across the substrate that satisfy a design specification. In an embodiment, the semiconductor process apparatus is a lithographic apparatus (e.g., FIGS. 1, 23, 24, 25).

In today's semiconductor field, as the tech-node keeps shrinking, having better models for lithography and etch is desired. A good model satisfies both accuracy (e.g., matching model results with metrology results of a real wafer) and good wafer prediction (e.g., behave according to physical limits). Satisfying both accuracy and prediction specifications may be difficult for current complex model form, as better fitting power indicates overfitting of the model. An overfitted model may generate irregular shaped pattern that typically may not be desired to be printed on the substrate.

Current methods to resolve the overfitting issue or prediction related issue is to have more metrology information during model calibration. For example, more information includes data related to more pattern coverage or more evaluation points. For example, a SEM tool can be configured to generate lots of EP gauges for a particular pattern. However, increased metrology increases cost and time of the patterning process. Typically, the pattern coverage is significantly less than 100% of a total number of pattern in a design layout. Thus, the model calibration cannot be performed with all the possible patterns to be printed on the wafer. Increasing pattern coverage is time-consuming, cost inefficient. It will take several rounds of re-calibration and data collection. Furthermore, if the model is complex enough, it would still find its way to overfit. Therefore, instead of dealing with issue from feeding model calibration with more data, more fundamental solution is proposed to make a model physically aware by performing the model calibration based on physical constraints.

In an embodiment, the physical constraints can be related to contour shape obtained from a metrology tool (e.g., SEM), a physical image (e.g., resist image, aerial image) obtained from the metrology tool (e.g., SEM), or a combination thereof. Example methods of implementing physical constraints are discussed herein, for example, methods of FIGS. 12 and 14.

Figure 12:
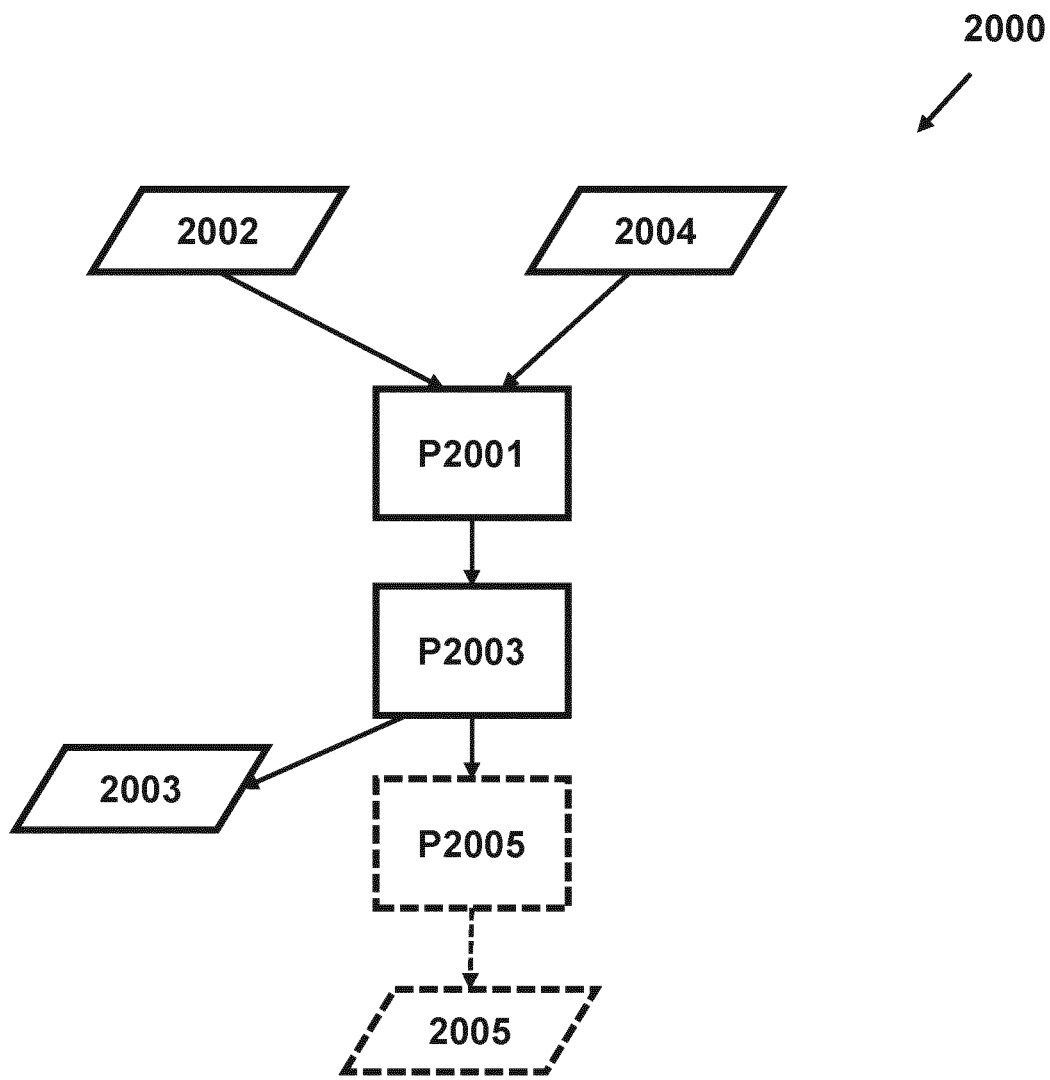
FIG. 12 is a flow chart of a method for calibrating a process model based on physical constraints related to a contour shape (or an outline) of a pattern, according to an embodiment.

FIG. 12 is a flow chart of a method 2000 for calibrating a process model based on physical constraints related to a contour shape (or an outline) of a pattern. The method 2000 calibrates a process model to generate a simulated contour that satisfies the shape constraint. The detailed procedures of the method 2000 are discussed below.

Procedure P2001 involves obtaining (i) measurement data 2002 at a plurality of measurement locations on a pattern, and (ii) contour constraints 2004 specified based on the measurement data 2002. In an embodiment, the plurality of measurement locations are edge placement (EP) gauges placed on a printed pattern or a printed contour of the printed pattern.

Figure 13A:
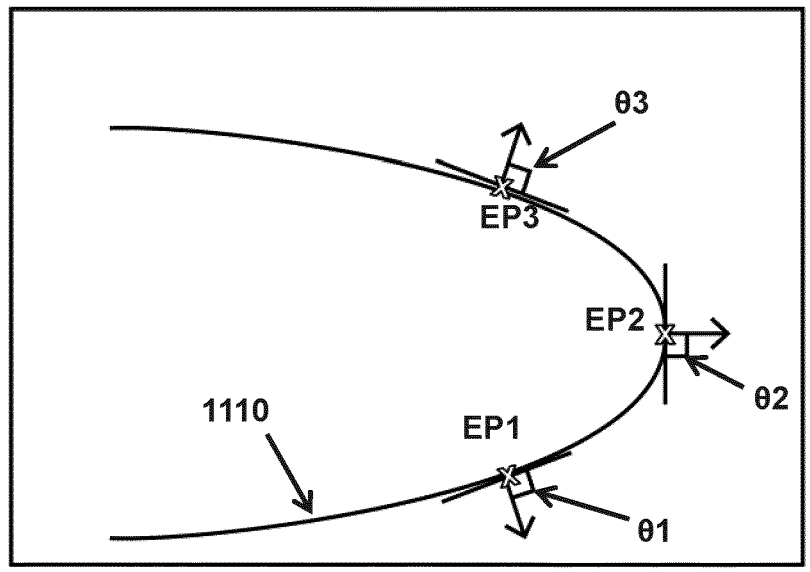
FIG. 13A illustrates an example model output that satisfy a physical constraint related to FIG. 11, according to an embodiment.
Figure 13B:
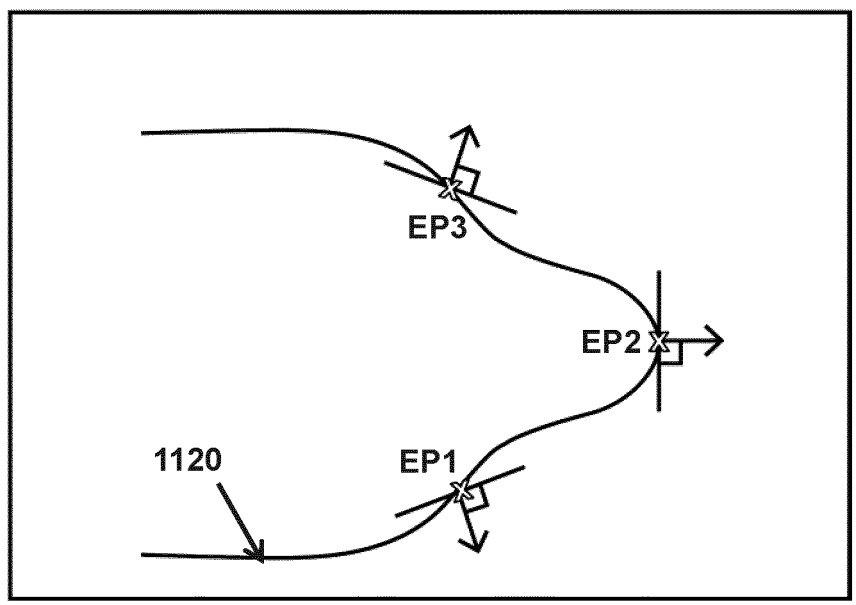
FIG. 13B illustrates an example model output that does not satisfy a physical constraint of FIG. 11, according to an embodiment.

In an embodiment, the measurement data 2002 comprises a plurality of angles, each angle being defined at each measurement location placed on the pattern or the printed contour of the printed pattern. In an embodiment, each angle at each measurement location defines a direction in which an edge placement error between the printed contour and a target contour is determined. FIGS. 13A and 13B illustrates example measurement locations EP1, EP2 and EP3. Then, the angles associated with each measurement locations EP1-EP3 are the angle or direction along which EPE may be computed. In other words, for example, at point EP1 a distance between contour 1110 (or 1120 in 13B) is measured in the direction shown by arrow pointing away from the contour 1110 (or 1120). Depending on the shape of the contour 1110/1120 such measurements may vary.

In an embodiment, each contour constraint is function of a tangent angle between a tangent to the simulated contour (e.g., contour 1110 or 1120) at a given measurement location (e.g., EP1-EP3) and the angle of the measurement data 2002 at the given location. For example, referring to FIG. 13A, a contour constraint can be that angle θ1 between a tangent to the simulated contour 1110 and the arrow at EP1 (which is indicative of angle of measurement data 2002) should be in a perpendicular range. In an embodiment, the perpendicular range is a value of angle θ1 should be between 88° to 92°, preferably 90°. Each point EP1, EP2, and EP3 may be associated with such perpendicularity constraint.

In another example, FIG. 13B illustrates a result of a calibrated model that generates a simulated contour 1120 that does not satisfy the physical constrain. For example the calibrated model may be overfitted so that it makes good predictions with respect to the measurement data. For example, a model that is overfitted due to excess data, where the fitting is focused on minimizing an EP error. Such overfitted model may generate an irregular shaped contour such as the contour 1120. Then, tangents to the contour 1120 at EP1, EP2, and EP3 may not be perpendicular to the measurement data (e.g., measurement angles indicated by arrows at EP1-EP3, respectively). For example, as seen in FIG. 13B, lines perpendicular the arrows at EP1, EP2 and EP3 are not tangent to the contour 1120. Hence, although the simulated contour 1120 fits the measurement data (e.g., EPE or CD values) such that a sum of errors associated with the simulated contour 1120 is minimum, the shape of the contour 1120 may not be physically accurate.

Referring back to FIG. 12, procedure P2003 involves calibrating the process model 2003 by adjusting values of model parameters of the process model until the simulated contour (e.g., 1110) satisfies the contour constraints 2004. After calibration process, the process model may be referred as the calibrated process model 2003. In an example, a model 2003 that generates a simulated contour 1120 may not be considered calibrated, as the model does not satisfy the contour constraints 2004 at several points EP1, EP2, and EP3. In an embodiment, the calibrating of the process model may be limited to a selected number of points EP1 and EP3, or all the points e.g., EP, EP2 and EP3.

In an embodiment, the adjusting of the values of the model parameters is an iterative process. The iteration involves (a) executing the process model 2003 using given values of the model parameter to generate the simulated contour, wherein the given values are random values at the first iteration and adjusted values at a subsequent iteration; (c) determining a tangent to the simulated contour at each of the measurement locations; (d) determining a tangent angle between the tangent and the angle of the measurement data 2002 at each of the measurement location; (e) determining, whether the tangent angle is within a perpendicular range at one or more of the measurement locations; and (f) responsive to the tangent angle not being within a perpendicular range, adjusting the values of the model parameters, and performing steps (a)-(d).

In an embodiment, at each iteration a simulated contour may be obtained, a tangent may be drawn or computed (e.g., via trigonometric relation "tan") at the measurement locations. Then, the angle between the tangent and EPE angle of the measurement data 2002 may be determined so check if the tangent angle is within the perpendicular range e.g., between 88° to 92°, preferably 90°.

In an embodiment, the adjusting is based on a gradient of each tangent angle with respect to the model parameters, wherein the gradient indicates how sensitive the tangent angle is to a change in a model parameter value.

In an embodiment, the process model 2003 is a data driven model including an empirical model and/or a machine learning model. For example, the machine learning model is a convolutional neural network, wherein the model parameters are weights and biases associated with a plurality of layers. The present disclosure is not limited to a particular type of model or a particular process of the patterning process. The method 2000 can be modified or adapted for any process model and any process (or combination of processes) of the patterning process.

In an embodiment, the method 2000 may further involve at procedure P2005, obtaining a resist contour of the resist pattern (e.g., 602 discussed above); and generating an etch contour 2005 by applying the etching bias (e.g., determined by executing the calibrated model) to the resist contour.

Figure 14:
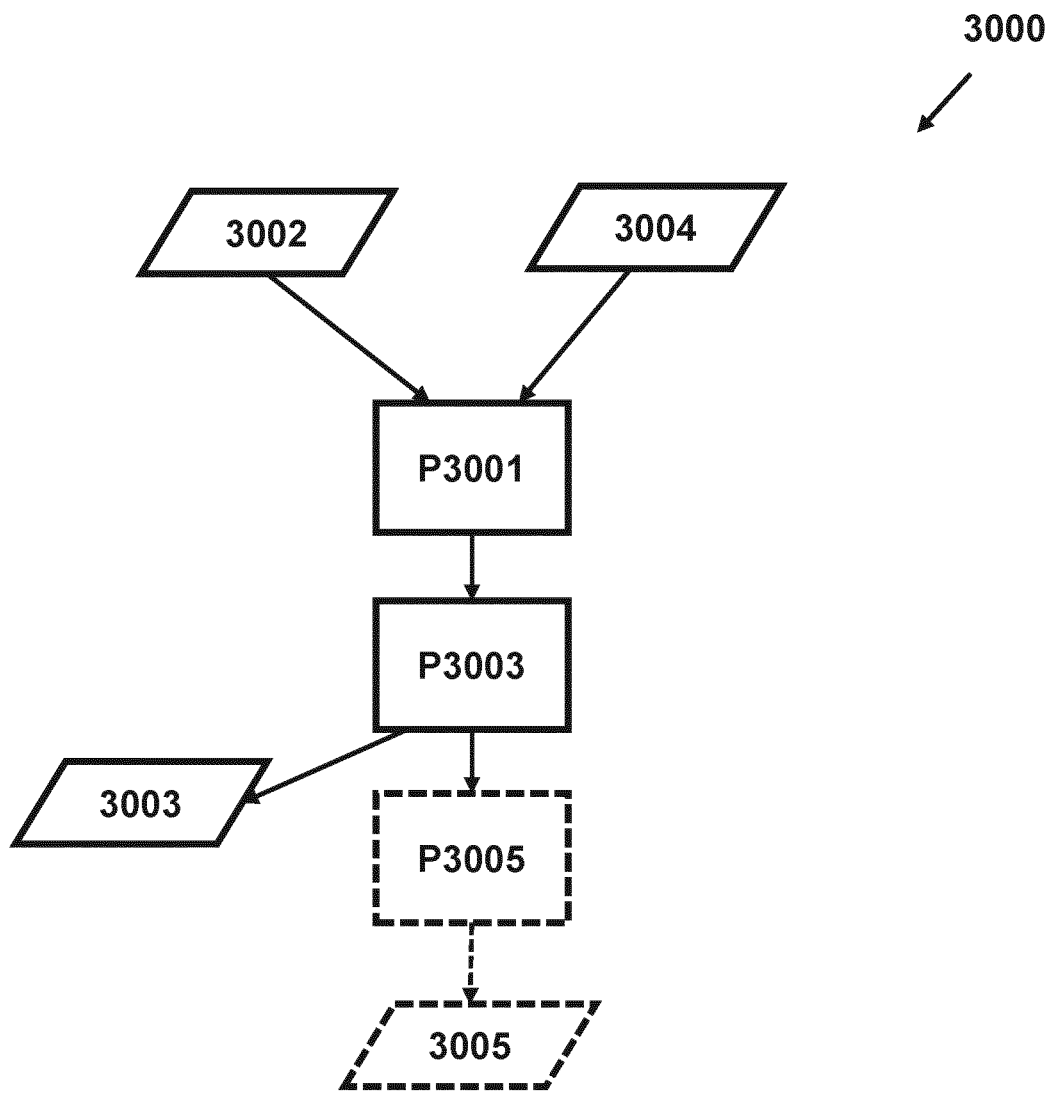
FIG. 14 is a flow chart of another method for calibrating a process model based on another physical constraints, according to an embodiment.

FIG. 14 is a flow chart of another method 3000 for calibrating a process model based on physical constraints. In an embodiment, the process model is configured to predict an image of a target pattern. Then, the calibration may be based on image based constraints. The method 3000 involves following procedures.

Procedure P3001 involves obtaining, (i) a reference image 3002 associated with the target pattern, and (ii) a gradient constraint 3004 specified with respect to the reference image 3002. In an embodiment, the reference image 3002 is obtained via simulating physics based models of a patterning process using the target pattern. The reference image 3002 includes, but not limited to, at least one of: an aerial image of the target pattern; an resist image of the target pattern; or an etch image of the target pattern. In an embodiment, the simulated gradient is determined by taking a first derivative of the signal along the given line passing though the simulated image. In an embodiment, the gradient constraint 3004 is obtained by taking a first derivative of a signal along the given line passing though the reference image 3002.

Procedure P3003 involves calibrating the process model 3003 such that the process model 3003 generates a simulated image that (i) minimizes an intensity difference or a frequency difference between the simulated image and the reference image 3002, and (ii) satisfies the gradient constraint 3004. After calibrating, the process model 3003 can be referred as the calibrated process model 3003.

Figure 15A:
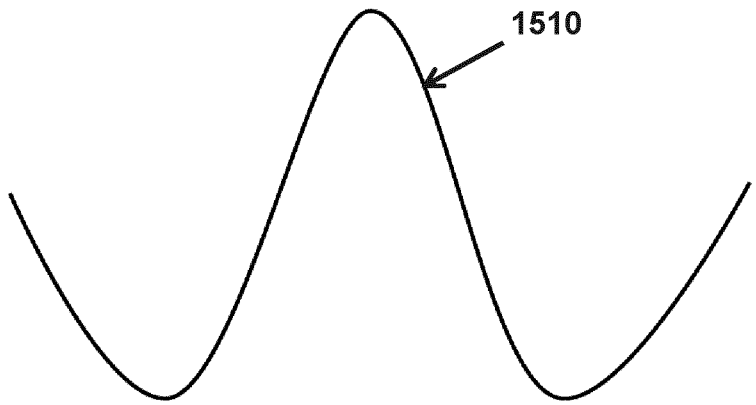
FIG. 15A illustrates a reference intensity profile of an aerial image or a resist image, according to an embodiment, according to an embodiment.
Figure 15B:
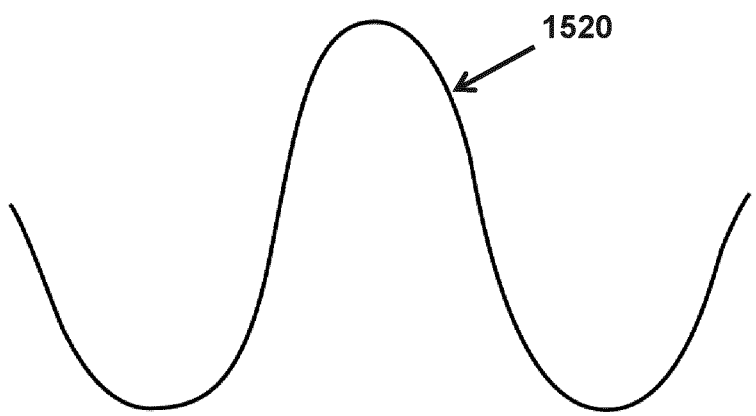
FIG. 15B illustrates an intensity profile related to a model that satisfy physical constraint of FIG. 15A, according to an embodiment.
Figure 15C:
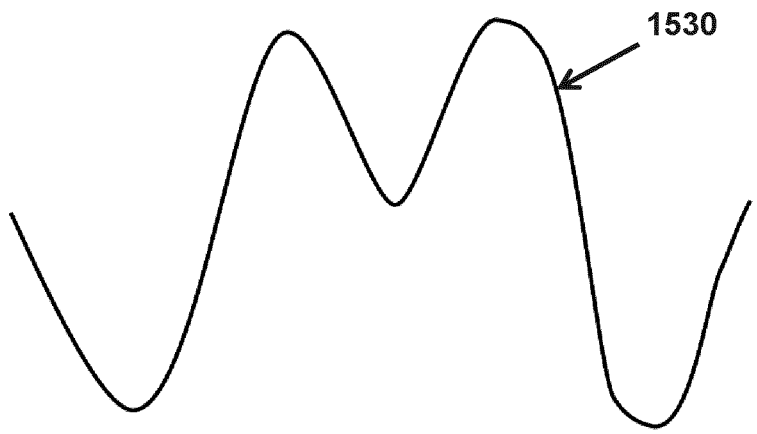
FIG. 15C illustrates an intensity profile related to a model that does not satisfy the physical constraint of FIG. 15A, according to an embodiment.

FIG. 15A-15C illustrates examples of gradient constraints 3004. FIG. 15A illustrates an example reference intensity distribution 1510 at a given location in a physical image (e.g., aerial image, resist image, and ADI). In an embodiment, a similarity between reference image 3002 and simulated image can be used to quantify resist model stability to know the overfitting risk level. For example, similarity can be evaluated as an intensity difference between the reference image 3002 and the simulated image, or a frequency difference (e.g., via FFT of images) between reference image 3002 and the simulated image.

Thus, in an embodiment, a gradient of the intensity difference or the frequency difference may be applied as constraint during the calibration of the process model (e.g., 3003). For example, after applying the gradient constraint with respect to the reference intensity distribution 1510 during the calibration process, the process model may generate a simulated contour having an intensity distribution 1520 (in FIG. 15B). This intensity distribution 1520 has a similar shape (e.g., similar peaks and troughs) as the reference intensity distribution 1510. Thus, the calibrated process model (e.g., 3003) is considered to follow a physical term (e.g., intensity profile or frequency profile) of a reference image associated with the patterning process. In an embodiment, a process model that is not calibrated according to the gradient related to the physical term (e.g., AI/RI), such process model may generate an intensity distribution 1530 (in FIG. 15C) which is not acceptable compared to the reference intensity distribution. For example, the peaks of the 1510 and 1530 are significantly different.

In an embodiment, the calibrating of the process model is an iterative process. An iteration involves (a) executing the process model using the target pattern to generate the simulated image; (b) determining the intensity difference between intensity values of the simulated image and the reference image 3002, and/or transforming, via Fourier transform, the simulated image and the reference image 3002 into frequency domain and determining the frequency difference between frequencies related to the simulated image and the reference image 3002; (c) determining a simulated gradient of a signal in the simulated image, wherein the signal is a signal along a given line passing through simulated image; (d) determining whether conditions: (i) the intensity difference or the frequency difference is minimized, and (ii) the simulated gradient satisfies the gradient constraint 3004 associated with the reference image 3002; (e) responsive to conditions (i) and (ii) not being satisfied, adjusting values of model parameters of the process model, and performing steps (a)-(d) until the conditions (i) and (ii) are satisfied.

In an embodiment, the method 3000 further involves at procedure P3005 extracting a simulated contour from the simulated image, and a reference contour from the reference image 3002, and calibrating the process model so that the simulated contour satisfies a contour shape constraint. For example, a contour can be extracted from an image using an edge detection algorithms or other contour extraction techniques used to extract contours related to a target pattern. In an embodiment, the simulated contour and the reference contour are associated with the target pattern, and the contour shape constraint ensures the simulated contour conforms with a shape of the reference contour. In an embodiment, the contour shape constraint can be implemented as an invariant condition that the model output should satisfy. If the invariant condition is not satisfied, values of model parameters are adjusted until such invariant condition is satisfied.

In an embodiment, the determination whether the contour shape constraint is satisfied involves determining a second derivative of the simulated contour is within a desired range of a second derivative of the reference contour. In an embodiment, the contour shape are represented as polygons, hence, a second derivative of a polygon can be computed using a computational software.

In an embodiment, the process model may configured to satisfy contour constraints (e.g., as discussed in the method 2000 of FIG. 12) defined with respect to a printed contour of a pattern on a printed substrate. For example, each contour constraint is function of a tangent angle between a tangent to simulated contour at a given measurement location and the angle of the measurement data 2002 at the given location, wherein the simulated contour is a contour of the simulated pattern determined via executing the process model using the target pattern.

In an embodiment, the method 3000 may further involve at procedure P3005, obtaining a resist contour of the resist pattern (e.g., 602 discussed above); and generating an etch contour 3005 by applying the etching bias (e.g., determined by executing the calibrated model) to the resist contour.

In an embodiment, there is described a system for calibrating a process model implementing procedures (e.g., of method 2000) discussed herein. The process model is configured to generate a simulated contour. The system includes a metrology tool (e.g., SEM tool in FIGS. 16 and 17) configured to obtain measurement data 2002 at a plurality of measurement locations on a pattern, and one or more processors (e.g., 104/105 of FIG. 22). The processors (e.g., 104/105) can be configured to: calibrate the process model by adjusting values of model parameters of the process model until the simulated contour satisfies the contour constraints 2004, the contour constraints 2004 being based on the measurement data 2002.

In an embodiment, the metrology tool e.g., SEM is configured to obtain measurements at the plurality of measurement locations such as edge placement (EP) gauges placed on a printed pattern or a printed contour of the printed pattern. In an embodiment, the measurement data 2002 comprises a plurality of angles, each angle being defined at each measurement location placed on the pattern or the printed contour of the printed pattern. In an embodiment, each angle at each measurement location defines a direction in which an edge placement error between the printed contour and a target contour is determined. As mentioned earlier, the metrology tool can be an electron beam apparatus (e.g., SEM of FIGS. 16 and 17). In an embodiment, the metrology tool is a scanning electron microscope configured to identify and extract contours from a captured image of a pattern on a printed substrate.

In an embodiment, the processor is configured to include each contour constraint as a function of a tangent angle between a tangent to the simulated contour at a given measurement location and the angle of the measurement data 2002 at the given location.

In an embodiment, the processor is configured for adjusting of the values of the model parameters is an iterative manner. For example, the iteration includes (a) executing the process model using given values of the model parameter to generate the simulated contour, wherein the given values are random values at the first iteration and adjusted values at a subsequent iteration; (c) determining a tangent to the simulated contour at each of the measurement locations; (d) determining a tangent angle between the tangent and the angle of the measurement data 2002 at each of the measurement location; (e) determining, whether the tangent angle is within a perpendicular range at one or more of the measurement locations; and (f) responsive to the tangent angle not being within a perpendicular range, adjusting the values of the model parameters, and performing steps (a)-(d).

In an embodiment, the perpendicular range is a value of angle between 88° to 92°, preferably 90°. In an embodiment, the processor is configured for adjusting based on a gradient of each tangent angle with respect to the model parameters, wherein the gradient indicates how sensitive the tangent angle is to a change in a model parameter value. In an embodiment, the process model is a data driven model including an empirical model and/or a machine learning model.

In an embodiment, the machine learning model is a convolutional neural network, wherein the model parameters are weights and biases associated with a plurality of layers.

Similarly, in an embodiment, there is described a system for calibrating a process model according to procedures of e.g., the method 3000 discussed herein. The process model can be configured to predict an image of a target pattern. The system includes a metrology tool (e.g., SEM tool in FIGS. 16 and 17) configured to obtain a reference image 3002 associated with the target pattern, and one or more processors (104/105 of FIG. 22). The processor can be configured to calibrate the process model such that the process model generates a simulated image that (i) minimizes an intensity difference or a frequency difference between the simulated image and the reference image 3002, and (ii) satisfies a gradient constraint 3004 related to the reference image 3002.

In an embodiment, the processor is configured for calibrating of the process model is an iterative manner. An iterations includes (a) executing the process model using the target pattern to generate the simulated image; (b) determining the intensity difference between intensity values of the simulated image and the reference image 3002, and/or transforming, via Fourier transform, the simulated image and the reference image 3002 into frequency domain and determining the frequency difference between frequencies related to the simulated image and the reference image 3002; (c) determining a simulated gradient of a signal in the simulated image, wherein the signal is a signal along a given line passing through simulated image; (d) determining whether conditions: (i) the intensity difference or the frequency difference is minimized, and (ii) the simulated gradient satisfies the gradient constraint 3004 associated with the reference image 3002; (e) responsive to conditions (i) and (ii) not being satisfied, adjusting values of model parameters of the process model, and performing steps (a)-(d) until the conditions (i) and (ii) are satisfied.

As mentioned earlier, in an embodiment, the simulated gradient is determined by taking a first derivative of the signal along the given line passing though the simulated image. In an embodiment, the gradient constraint 3004 is obtained by taking a first derivative of a signal along the given line passing though the reference image 3002.

In an embodiment, the processor is further configured to extract a simulated contour from the simulated image, and a reference contour from the reference image 3002, where the simulated contour and the reference contour associated with the target pattern; and calibrate the process model so that the simulated contour satisfies a contour shape constraint, where the contour shape constraint ensures the simulated contour conforms with a shape of the reference contour.

In an embodiment, the determination of whether the contour shape constraint is satisfied involves determining a second derivative of the simulated contour is within a desired range of a second derivative of the reference contour.

In an embodiment, the reference image 3002 is obtained via simulating physics based models of a patterning process using the target pattern. The simulation may be performed on the processor. In an embodiment, the reference image 3002 may be obtained from the metrology tool (e.g., SEM). In an embodiment, the reference image 3002 includes an aerial image of the target pattern; an resist image of the target pattern; and/or an etch image of the target pattern.

In an embodiment, the process model is configured to satisfy contour constraints 2004 defined with respect to a printed contour of a pattern on a printed substrate, as discussed in FIG. 12. For example, each contour constraint is function of a tangent angle between a tangent to simulated contour at a given measurement location and the angle of the measurement data 2002 at the given location, wherein the simulated contour is a contour of the simulated pattern determined via executing the process model using the target pattern.

In an embodiment, there is provided a non-transitory computer-readable media comprising instructions that, when executed by one or more processors, cause operations comprising: obtaining (i) resist pattern data 602 associated with a target pattern to be printed on a substrate, (ii) physical effect data 604 characterizing effects of an etching process on the target pattern, and (iii) measured bias 606 between a resist pattern and an etched pattern formed on a printed substrate; and training, based on the resist pattern data 602, the physical effect data 604, and the measured bias 606, the machine learning model to reduce a difference between the measured bias 606 and the predicted etch bias. Furthermore, the non-transitory computer readable media may include additional instructions (e.g., related to P601, P603, and P605) discussed with respect to FIG. 6.

In an embodiment, there is provided non-transitory computer-readable media comprising instructions that, when executed by one or more processors, cause operations comprising: obtaining (i) measurement data 2002 at a plurality of measurement locations on a pattern, and (ii) contour constraints 2004 specified based on the measurement data 2002; and calibrating a process model by adjusting values of model parameters of the process model until the simulated contour satisfies the contour constraints 2004. Furthermore, the non-transitory computer readable media may include additional instructions (e.g., related to procedures P2001, P2003 and P2005) discussed with respect to FIG. 12.

In an embodiment, there is provided non-transitory computer-readable media comprising instructions that, when executed by one or more processors, cause operations comprising: obtaining, (i) a reference image 3002 associated with a target pattern, and (ii) a gradient constraint 3004 specified with respect to the reference image 3002; and calibrating a process model such that the process model generates a simulated image that (i) minimizes an intensity difference or a frequency difference between the simulated image and the reference image 3002, and (ii) satisfies the gradient constraint 3004. Furthermore, the non-transitory computer readable media may include additional instructions (e.g., related to procedures P3001, P3003 and P3005) discussed with respect to FIG. 14.

According to present disclosure, the combination and sub-combinations of disclosed elements constitute separate embodiments. For example, a first combination includes determining etch contour based on a trained machine learning model. In another example, the combination includes determining a simulated contour based on a model calibrated according to physical constraints.

Figure 16:
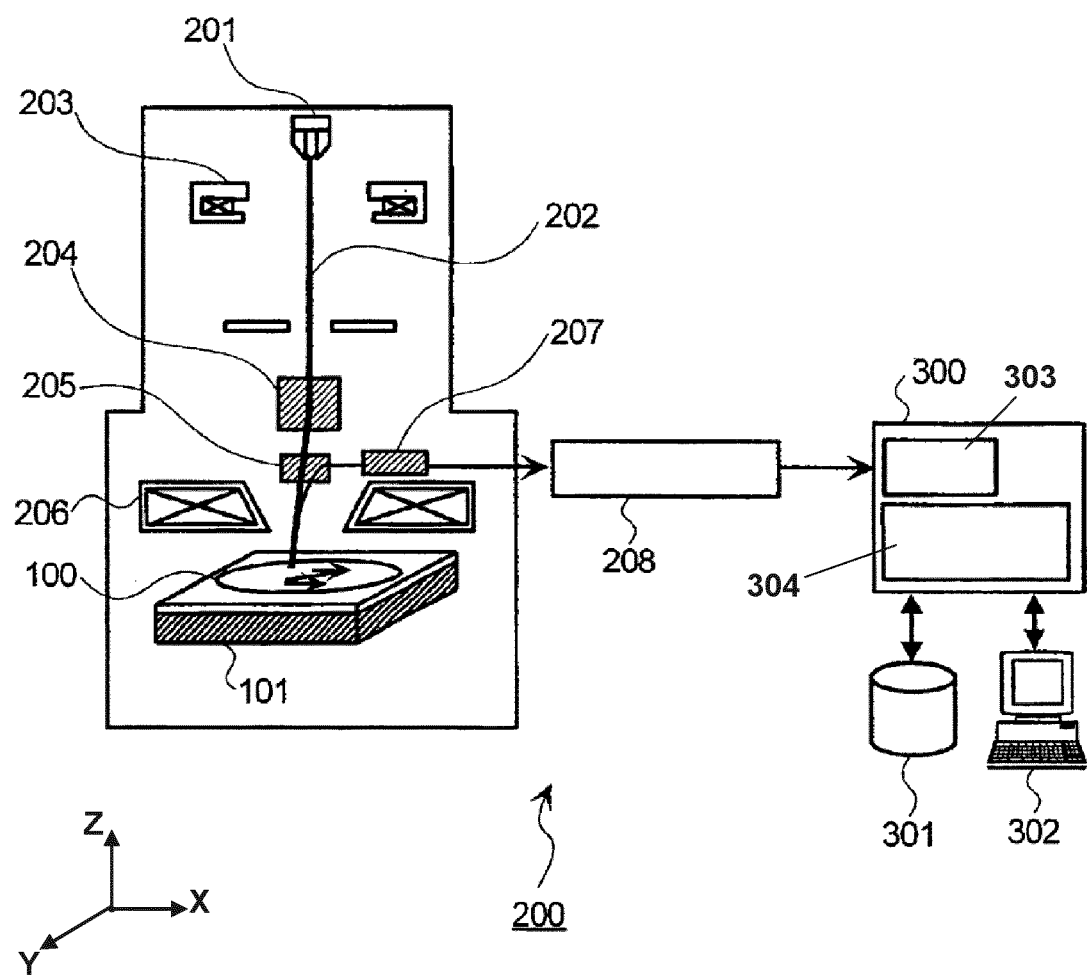
FIG. 16 schematically depicts an embodiment of a scanning electron microscope (SEM), according to an embodiment.

In some embodiments, a scanning electron microscope (SEM) yields an image of a structure (e.g., some or all the structure of a device) exposed or transferred on the substrate. FIG. 16 depicts an embodiment of a SEM 200. A primary electron beam 202 emitted from an electron source 201 is converged by condenser lens 203 and then passes through a beam deflector 204, an E×B deflector 205, and an objective lens 206 to irradiate a substrate 100 on a substrate table 101 at a focus.

When the substrate 100 is irradiated with electron beam 202, secondary electrons are generated from the substrate 100. The secondary electrons are deflected by the E×B deflector 205 and detected by a secondary electron detector 207. A two-dimensional electron beam image can be obtained by detecting the electrons generated from the sample in synchronization with, e.g., two dimensional scanning of the electron beam by beam deflector 204 or with repetitive scanning of electron beam 202 by beam deflector 204 in an X or Y direction, together with continuous movement of the substrate 100 by the substrate table 101 in the other of the X or Y direction.

A signal detected by secondary electron detector 207 is converted to a digital signal by an analog/digital (A/D) converter 208, and the digital signal is sent to an image processing system 300. In an embodiment, the image processing system 300 may have memory 303 to store all or part of digital images for processing by a processing unit 304. The processing unit 304 (e.g., specially designed hardware or a combination of hardware and software) is configured to convert or process the digital images into datasets representative of the digital images. Further, image processing system 300 may have a storage medium 301 configured to store the digital images and corresponding datasets in a reference database. A display device 302 may be connected with the image processing system 300, so that an operator can conduct necessary operation of the equipment with the help of a graphical user interface.

Figure 17:
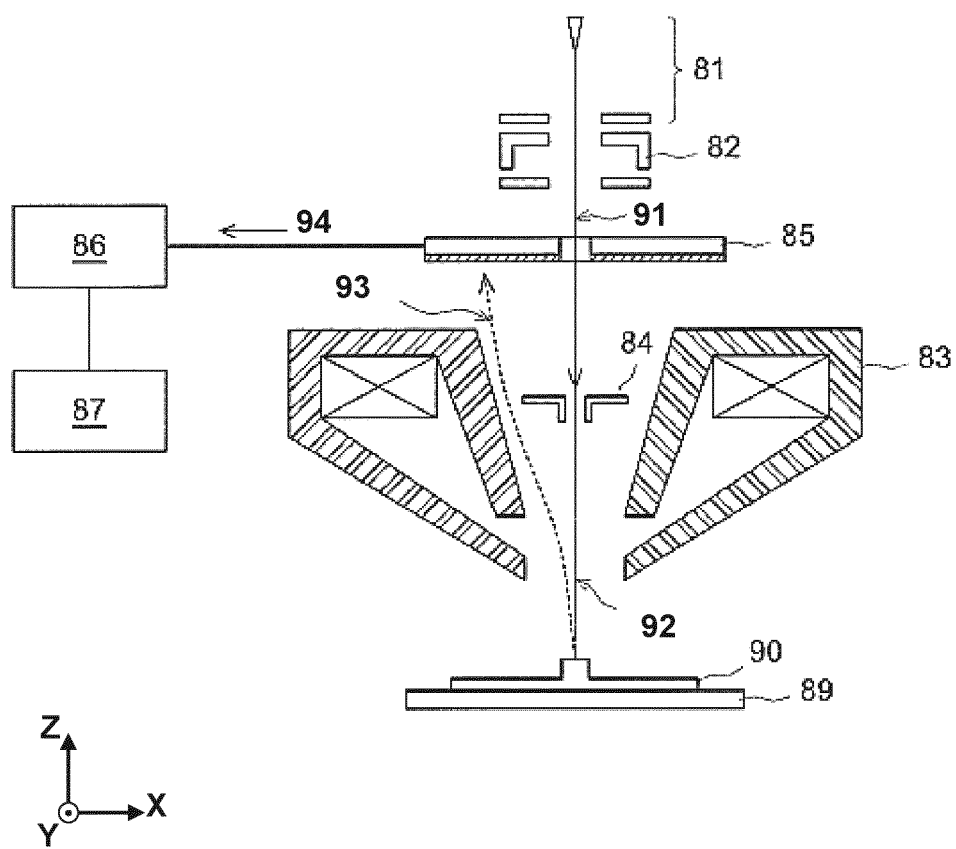
FIG. 17 schematically depicts an embodiment of an electron beam inspection apparatus, according to an embodiment.

FIG. 17 schematically illustrates a further embodiment of an inspection apparatus. The system is used to inspect a sample 90 (such as a substrate) on a sample stage 89 and comprises a charged particle beam generator 81, a condenser lens module 82, a probe forming objective lens module 83, a charged particle beam deflection module 84, a secondary charged particle detector module 85, and an image forming module 86.

The charged particle beam generator 81 generates a primary charged particle beam 91. The condenser lens module 82 condenses the generated primary charged particle beam 91. The probe forming objective lens module 83 focuses the condensed primary charged particle beam into a charged particle beam probe 92. The charged particle beam deflection module 84 scans the formed charged particle beam probe 92 across the surface of an area of interest on the sample 90 secured on the sample stage 89. In an embodiment, the charged particle beam generator 81, the condenser lens module 82 and the probe forming objective lens module 83, or their equivalent designs, alternatives or any combination thereof, together form a charged particle beam probe generator which generates the scanning charged particle beam probe 92.

The secondary charged particle detector module 85 detects secondary charged particles 93 emitted from the sample surface (maybe also along with other reflected or scattered charged particles from the sample surface) upon being bombarded by the charged particle beam probe 92 to generate a secondary charged particle detection signal 94. The image forming module 86 (e.g., a computing device) is coupled with the secondary charged particle detector module 85 to receive the secondary charged particle detection signal 94 from the secondary charged particle detector module 85 and accordingly forming at least one scanned image. In an embodiment, the secondary charged particle detector module 85 and image forming module 86, or their equivalent designs, alternatives or any combination thereof, together form an image forming apparatus which forms a scanned image from detected secondary charged particles emitted from sample 90 being bombarded by the charged particle beam probe 92.

As noted above, SEM images may be processed to extract contours that describe the edges of objects, representing device structures, in the image. These contours are then quantified via metrics, such as CD. Thus, typically, the images of device structures are compared and quantified via simplistic metrics, such as an edge-to-edge distance (CD) or simple pixel differences between images. Typical contour models that detect the edges of the objects in an image in order to measure CD use image gradients. Indeed, those models rely on strong image gradients. But, in practice, the image typically is noisy and has discontinuous boundaries. Techniques, such as smoothing, adaptive thresholding, edge-detection, erosion, and dilation, may be used to process the results of the image gradient contour models to address noisy and discontinuous images, but will ultimately result in a low-resolution quantification of a high-resolution image. Thus, in most instances, mathematical manipulation of images of device structures to reduce noise and automate edge detection results in loss of resolution of the image, thereby resulting in loss of information. Consequently, the result is a low-resolution quantification that amounts to a simplistic representation of a complicated, high-resolution structure.

So, it is desirable to have a mathematical representation of the structures (e.g., circuit features, alignment mark or metrology target portions (e.g., grating features), etc.) produced or expected to be produced using a patterning process, whether, e.g., the structures are in a latent resist image, in a developed resist image or transferred to a layer on the substrate, e.g., by etching, that can preserve the resolution and yet describe the general shape of the structures. In the context of lithography or other patterning processes, the structure may be a device or a portion thereof that is being manufactured and the images may be SEM images of the structure. In some instances, the structure may be a feature of semiconductor device, e.g., integrated circuit. In some instances, the structure may be an alignment mark, or a portion thereof (e.g., a grating of the alignment mark), that is used in an alignment measurement process to determine alignment of an object (e.g., a substrate) with another object (e.g., a patterning device) or a metrology target, or a portion thereof (e.g., a grating of the metrology target), that is used to measure a parameter (e.g., overlay, focus, dose, etc.) of the patterning process. In an embodiment, the metrology target is a diffractive grating used to measure, e.g., overlay.

In an embodiment, the measurement data related to the printed pattern used for training the model in the method of FIG. 3. The trained model may be further employed in optimization of patterning process or adjusting parameters of the patterning process. As an example, OPC addresses the fact that the final size and placement of an image of the design layout projected on the substrate will not be identical to, or simply depend only on the size and placement of the design layout on the patterning device. It is noted that the terms "mask", "reticle", "patterning device" are utilized interchangeably herein. Also, person skilled in the art will recognize that, especially in the context of lithography simulation/optimization, the term "mask"/"patterning device" and "design layout" can be used interchangeably, as in lithography simulation/optimization, a physical patterning device is not necessarily used but a design layout can be used to represent a physical patterning device. For the small feature sizes and high feature densities present on some design layout, the position of a particular edge of a given feature will be influenced to a certain extent by the presence or absence of other adjacent features. These proximity effects arise from minute amounts of radiation coupled from one feature to another and/or non-geometrical optical effects such as diffraction and interference. Similarly, proximity effects may arise from diffusion and other chemical effects during post-exposure bake (PEB), resist development, and etching that generally follow lithography.

In order to ensure that the projected image of the design layout is in accordance with requirements of a given target circuit design, proximity effects need to be predicted and compensated for, using sophisticated numerical models, corrections or pre-distortions of the design layout. The article "Full-Chip Lithography Simulation and Design Analysis—How OPC Is Changing IC Design", C. Spence, Proc. SPIE, Vol. 5751, pp 1-14 (2005) provides an overview of current "model-based" optical proximity correction processes. In a typical high-end design almost every feature of the design layout has some modification in order to achieve high fidelity of the projected image to the target design. These modifications may include shifting or biasing of edge positions or line widths as well as application of "assist" features that are intended to assist projection of other features.

Application of model-based OPC to a target design involves good process models and considerable computational resources, given the many millions of features typically present in a chip design. However, applying OPC is generally not an "exact science", but an empirical, iterative process that does not always compensate for all possible proximity effect. Therefore, effect of OPC, e.g., design layouts after application of OPC and any other RET, need to be verified by design inspection, i.e. intensive full-chip simulation using calibrated numerical process models, in order to minimize the possibility of design flaws being built into the patterning device pattern. This is driven by the enormous cost of making high-end patterning devices, which run in the multi-million dollar range, as well as by the impact on turn-around time by reworking or repairing actual patterning devices once they have been manufactured.

Both OPC and full-chip RET verification may be based on numerical modeling systems and methods as described, for example in, U.S. patent application Ser. No. 10/815,573 and an article titled "Optimized Hardware and Software For Fast, Full Chip Simulation", by Y. Cao et al., Proc. SPIE, Vol. 5754, 405 (2005).

One RET is related to adjustment of the global bias of the design layout. The global bias is the difference between the patterns in the design layout and the patterns intended to print on the substrate. For example, a circular pattern of 25 nm diameter may be printed on the substrate by a 50 nm diameter pattern in the design layout or by a 20 nm diameter pattern in the design layout but with high dose.

In addition to optimization to design layouts or patterning devices (e.g., OPC), the illumination source can also be optimized, either jointly with patterning device optimization or separately, in an effort to improve the overall lithography fidelity. The terms "illumination source" and "source" are used interchangeably in this document. Since the 1990s, many off-axis illumination sources, such as annular, quadrupole, and dipole, have been introduced, and have provided more freedom for OPC design, thereby improving the imaging results, As is known, off-axis illumination is a proven way to resolve fine structures (i.e., target features) contained in the patterning device. However, when compared to a traditional illumination source, an off-axis illumination source usually provides less radiation intensity for the aerial image (AI). Thus, it becomes desirable to attempt to optimize the illumination source to achieve the optimal balance between finer resolution and reduced radiation intensity.

Numerous illumination source optimization approaches can be found, for example, in an article by Rosenbluth et al., titled "Optimum Mask and Source Patterns to Print A Given Shape", Journal of Microlithography, Microfabrication, Microsystems 1(1), pp. 13-20, (2002). The source is partitioned into several regions, each of which corresponds to a certain region of the pupil spectrum. Then, the source distribution is assumed to be uniform in each source region and the brightness of each region is optimized for process window. However, such an assumption that the source distribution is uniform in each source region is not always valid, and as a result the effectiveness of this approach suffers. In another example set forth in an article by Granik, titled "Source Optimization for Image Fidelity and Throughput", Journal of Microlithography, Microfabrication, Microsystems 3(4), pp. 509-522, (2004), several existing source optimization approaches are overviewed and a method based on illuminator pixels is proposed that converts the source optimization problem into a series of non-negative least square optimizations. Though these methods have demonstrated some successes, they typically require multiple complicated iterations to converge. In addition, it may be difficult to determine the appropriate/optimal values for some extra parameters, such as y in Granik's method, which dictates the trade-off between optimizing the source for substrate image fidelity and the smoothness requirement of the source.

For low $k_1$ photolithography, optimization of both the source and patterning device is useful to ensure a viable process window for projection of critical circuit patterns. Some algorithms (e.g. Socha et. al. Proc. SPIE vol. 5853, 2005, p. 180) discretize illumination into independent source points and mask into diffraction orders in the spatial frequency domain, and separately formulate a cost function (which is defined as a function of selected design variables) based on process window metrics such as exposure latitude which could be predicted by optical imaging models from source point intensities and patterning device diffraction orders. The term "design variables" as used herein comprises a set of parameters of a lithographic projection apparatus or a lithographic process, for example, parameters a user of the lithographic projection apparatus can adjust, or image characteristics a user can adjust by adjusting those parameters. It should be appreciated that any characteristics of a lithographic projection process, including those of the source, the patterning device, the projection optics, and/or resist characteristics can be among the design variables in the optimization. The cost function is often a non-linear function of the design variables. Then standard optimization techniques are used to minimize the cost function.

Relatedly, the pressure of ever decreasing design rules have driven semiconductor chipmakers to move deeper into the low $k_1$ lithography era with existing 193 nm ArF lithography. Lithography towards lower $k_1$ puts heavy demands on RET, exposure tools, and the need for litho-friendly design. 1.35 ArF hyper numerical aperture (NA) exposure tools may be used in the future. To help ensure that circuit design can be produced on to the substrate with workable process window, source-patterning device optimization (referred to herein as source-mask optimization or SMO) is becoming a significant RET for 2× nm node.

A source and patterning device (design layout) optimization method and system that allows for simultaneous optimization of the source and patterning device using a cost function without constraints and within a practicable amount of time is described in a commonly assigned International Patent Application No. PCT/US2009/065359, filed on Nov. 20, 2009, and published as WO2010/059954, titled "Fast Freeform Source and Mask Co-Optimization Method", which is hereby incorporated by reference in its entirety.

Another source and mask optimization method and system that involves optimizing the source by adjusting pixels of the source is described in a commonly assigned U.S. patent application Ser. No. 12/813,456, filed on Jun. 10, 2010, and published as U.S. Patent Application Publication No. 2010/0315614, titled "Source-Mask Optimization in Lithographic Apparatus", which is hereby incorporated by reference in its entirety.

In a lithographic projection apparatus, as an example, a cost function is expressed as $$CF(z_1, z_2, \ldots, z_N) = \sum_{p=1}^{P} w_p f_p^2(z_1, z_2, \ldots, z_N) \quad \text{(Eq. 1)}$$

wherein $(z_1, z_2, \ldots, z_N)$ are N design variables or values thereof. $f_p(z_1, z_2, \ldots, z_N)$ can be a function of the design variables $(z_1, z_2, \ldots, z_N)$ such as a difference between an actual value and an intended value of a characteristic at an evaluation point for a set of values of the design variables of $(z_1, z_2, \ldots, z_N)$. $w_p$ is a weight constant associated with $f_p(z_1, z_2, \ldots, z_N)$. An evaluation point or pattern more critical than others can be assigned a higher $w_p$ value. Patterns and/or evaluation points with larger number of occurrences may be assigned a higher $w_p$ value, too. Examples of the evaluation points can be any physical point or pattern on the substrate, any point on a virtual design layout, or resist image, or aerial image, or a combination thereof. $f_p(z_1, z_2, \ldots, z_N)$ can also be a function of one or more stochastic effects such as the LWR, which are functions of the design variables $(z_1, z_2, \ldots, z_N)$. The cost function may represent any suitable characteristics of the lithographic projection apparatus or the substrate, for instance, failure rate of a feature, focus, CD, image shift, image distortion, image rotation, stochastic effects, throughput, CDU, or a combination thereof. CDU is local CD variation (e.g., three times of the standard deviation of the local CD distribution). CDU may be interchangeably referred to as LCDU. In one embodiment, the cost function represents (i.e., is a function of) CDU, throughput, and the stochastic effects. In one embodiment, the cost function represents (i.e., is a function of) EPE, throughput, and the stochastic effects. In one embodiment, the design variables $(z_1, z_2, \ldots, z_N)$ comprise dose, global bias of the patterning device, shape of illumination from the source, or a combination thereof. Since it is the resist image that often dictates the circuit pattern on a substrate, the cost function often includes functions that represent some characteristics of the resist image. For example, $f_p(z_1, z_2, \ldots, z_N)$ of such an evaluation point can be simply a distance between a point in the resist image to an intended position of that point (i.e., edge placement error $EPE_p(z_1, z_2, \ldots, z_N)$). The design variables can be any adjustable parameters such as adjustable parameters of the source, the patterning device, the projection optics, dose, focus, etc. The projection optics may include components collectively called as "wavefront manipulator" that can be used to adjust shapes of a wavefront and intensity distribution and/or phase shift of the irradiation beam. The projection optics preferably can adjust a wavefront and intensity distribution at any location along an optical path of the lithographic projection apparatus, such as before the patterning device, near a pupil plane, near an image plane, near a focal plane. The projection optics can be used to correct or compensate for certain distortions of the wavefront and intensity distribution caused by, for example, the source, the patterning device, temperature variation in the lithographic projection apparatus, thermal expansion of components of the lithographic projection apparatus. Adjusting the wavefront and intensity distribution can change values of the evaluation points and the cost function. Such changes can be simulated from a model or actually measured. Of course, CF $(z_1, z_2, \ldots, z_N)$ is not limited the form in Eq. 1. CF $(z_1, z_2, \ldots, z_N)$ can be in any other suitable form.

It should be noted that the normal weighted root mean square (RMS) of $$f_p(z_1, z_2, \ldots, z_N) \text{ is defined as } \sqrt{\frac{1}{P}\sum_{p=1}^{P} w_p f_p^2(z_1, z_2, \ldots, z_N)},$$

therefore, minimizing the weighted RMS of $f_p(z_1, z_2, \ldots, z_N)$ is equivalent to minimizing the cost function $$CF(z_1, z_2, \ldots, z_N) = \sum_{p=1}^{P} w_p f_p^2(z_1, z_2, \ldots, z_N),$$

defined in Eq. 1. Thus the weighted RMS of $f_p(z_1, z_2, \ldots, z_N)$ and Eq. 1 may be utilized interchangeably for notational simplicity herein.

Further, if considering maximizing the PW (Process Window), one can consider the same physical location from different PW conditions as different evaluation points in the cost function in (Eq. 1). For example, if considering N PW conditions, then one can categorize the evaluation points according to their PW conditions and write the cost functions as:

$$CF(z_1, z_2, \ldots, z_N) = \qquad\qquad\qquad (\text{Eq. } 1')$$

$$\sum_{p=1}^{P} w_p f_p^2(z_1, z_2, \ldots, z_N) = \sum_{u=1}^{U}\sum_{p_u=1}^{P_u} w_{p_u} f_{p_u}^2(z_1, z_2, \ldots, z)$$

Where $f_{p_u}(z_1, z_2, \ldots, z_N)$ is the value of $f_p(z_1, z_2, \ldots, z_N)$ under the u-th PW condition u=1, ..., U. When $f_p(z_1, z_2, \ldots, z_N)$ is the EPE, then minimizing the above cost function is equivalent to minimizing the edge shift under various PW conditions, thus this leads to maximizing the PW. In particular, if the PW also consists of different mask bias, then minimizing the above cost function also includes the minimization of MEEF (Mask Error Enhancement Factor), which is defined as the ratio between the substrate EPE and the induced mask edge bias.

The design variables may have constraints, which can be expressed as $(z_1, z_2, \ldots, z_N) \in Z$, where Z is a set of possible values of the design variables. One possible constraint on the design variables may be imposed by a desired throughput of the lithographic projection apparatus. The desired throughput may limit the dose and thus has implications for the stochastic effects (e.g., imposing a lower bound on the stochastic effects). Higher throughput generally leads to lower dose, shorter longer exposure time and greater stochastic effects. Consideration of substrate throughput and minimization of the stochastic effects may constrain the possible values of the design variables because the stochastic effects are function of the design variables. Without such a constraint imposed by the desired throughput, the optimization may yield a set of values of the design variables that are unrealistic. For example, if the dose is among the design variables, without such a constraint, the optimization may yield a dose value that makes the throughput economically impossible. However, the usefulness of constraints should not be interpreted as a necessity. The throughput may be affected by the failure rate based adjustment to parameters of the patterning process. It is desirable to have lower failure rate of the feature while maintaining a high throughput. Throughput may also be affected by the resist chemistry. Slower resist (e.g., a resist that requires higher amount of light to be properly exposed) leads to lower throughput. Thus, based on the optimization process involving failure rate of a feature due to resist chemistry or fluctuations, and dose requirements for higher throughput, appropriate parameters of the patterning process may be determined.

The optimization process therefore is to find a set of values of the design variables, under the constraints $(z_1, z_2, \ldots, z_N) \in Z$, that minimize the cost function, i.e., to find $$(\tilde{z}_1, \tilde{z}_2, \ldots, \tilde{z}_N) = \arg\min_{(z_1, z_2, \ldots, z_N) \in Z} CF(z_1, z_2, \ldots, z_N) = \qquad (\text{Eq. 2})$$

$$\arg\min_{(z_1, z_2, \ldots, z_N) \in Z} \sum_{p=1}^{P} w_p f_p^2(z_1, z_2, \ldots, z_N)$$

Figure 18:
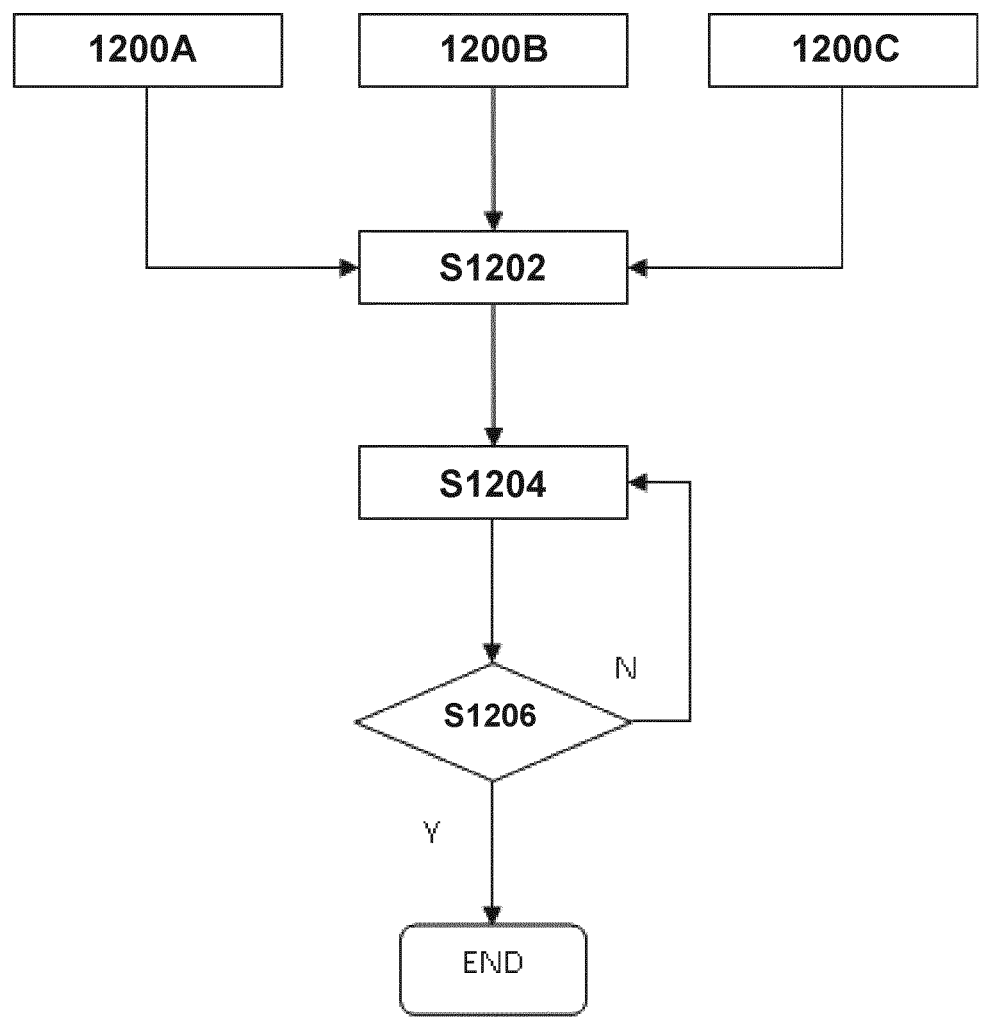
FIG. 18 is a flow diagram illustrating aspects of an example methodology of joint optimization, according to an embodiment.

A general method of optimizing the lithography projection apparatus, according to an embodiment, is illustrated in FIG. 18. This method comprises a step S1202 of defining a multi-variable cost function of a plurality of design variables. The design variables may comprise any suitable combination selected from characteristics of the illumination source (1200A) (e.g., pupil fill ratio, namely percentage of radiation of the source that passes through a pupil or aperture), characteristics of the projection optics (1200B) and characteristics of the design layout (1200C). For example, the design variables may include characteristics of the illumination source (1200A) and characteristics of the design layout (1200C) (e.g., global bias) but not characteristics of the projection optics (1200B), which leads to an SMO. Alternatively, the design variables may include characteristics of the illumination source (1200A), characteristics of the projection optics (1200B) and characteristics of the design layout (1200C), which leads to a source-mask-lens optimization (SMLO). In step S1204, the design variables are simultaneously adjusted so that the cost function is moved towards convergence. In step S1206, it is determined whether a predefined termination condition is satisfied. The predetermined termination condition may include various possibilities, i.e. the cost function may be minimized or maximized, as required by the numerical technique used, the value of the cost function has been equal to a threshold value or has crossed the threshold value, the value of the cost function has reached within a preset error limit, or a preset number of iteration is reached. If either of the conditions in step S1206 is satisfied, the method ends. If none of the conditions in step S1206 is satisfied, the step S1204 and S1206 are iteratively repeated until a desired result is obtained. The optimization does not necessarily lead to a single set of values for the design variables because there may be physical restraints caused by factors such as the failure rates, the pupil fill factor, the resist chemistry, the throughput, etc. The optimization may provide multiple sets of values for the design variables and associated performance characteristics (e.g., the throughput) and allows a user of the lithographic apparatus to pick one or more sets.

In a lithographic projection apparatus, the source, patterning device and projection optics can be optimized alternatively (referred to as Alternative Optimization) or optimized simultaneously (referred to as Simultaneous Optimization). The terms "simultaneous", "simultaneously", "joint" and "jointly" as used herein mean that the design variables of the characteristics of the source, patterning device, projection optics and/or any other design variables, are allowed to change at the same time. The term "alternative" and "alternatively" as used herein mean that not all of the design variables are allowed to change at the same time.

Figure 19:
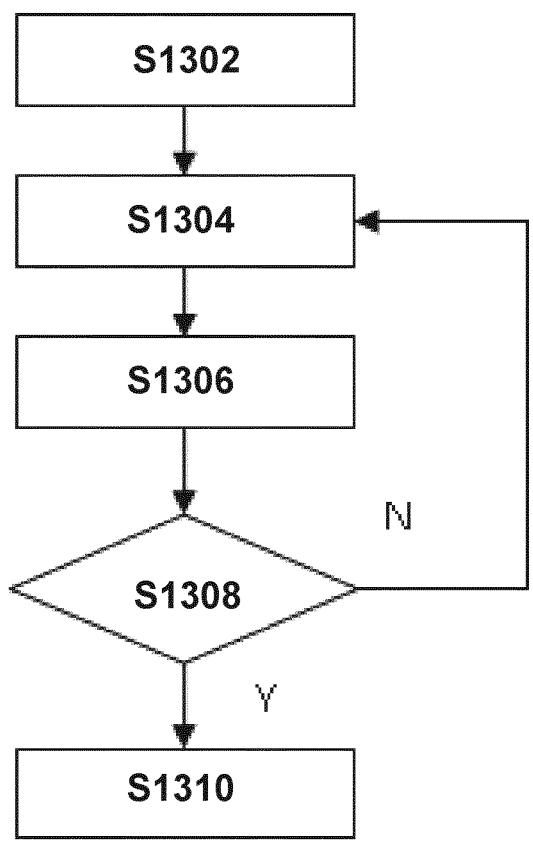
FIG. 19 shows an embodiment of another optimization method, according to an embodiment.

In FIG. 19, the optimization of all the design variables is executed simultaneously. Such flow may be called the simultaneous flow or co-optimization flow. Alternatively, the optimization of all the design variables is executed alternatively, as illustrated in FIG. 19. In this flow, in each step, some design variables are fixed while the other design variables are optimized to minimize the cost function; then in the next step, a different set of variables are fixed while the others are optimized to minimize the cost function. These steps are executed alternatively until convergence or certain terminating conditions are met.

As shown in the non-limiting example flowchart of FIG. 19, first, a design layout (step S1302) is obtained, then a step of source optimization is executed in step S1304, where all the design variables of the illumination source are optimized (SO) to minimize the cost function while all the other design variables are fixed. Then in the next step S1306, a mask optimization (MO) is performed, where all the design variables of the patterning device are optimized to minimize the cost function while all the other design variables are fixed. These two steps are executed alternatively, until certain terminating conditions are met in step S1308. Various termination conditions can be used, such as, the value of the cost function becomes equal to a threshold value, the value of the cost function crosses the threshold value, the value of the cost function reaches within a preset error limit, or a preset number of iteration is reached, etc. Note that SO-MO-Alternative-Optimization is used as an example for the alternative flow. The alternative flow can take many different forms, such as SO-LO-MO-Alternative-Optimization, where SO, LO (Lens Optimization) is executed, and MO alternatively and iteratively; or first SMO can be executed once, then execute LO and MO alternatively and iteratively; and so on. Finally the output of the optimization result is obtained in step S1310, and the process stops.

The pattern selection algorithm, as discussed before, may be integrated with the simultaneous or alternative optimization. For example, when an alternative optimization is adopted, first a full-chip SO can be performed, the 'hot spots' and/or 'warm spots' are identified, then an MO is performed. In view of the present disclosure numerous permutations and combinations of sub-optimizations are possible in order to achieve the desired optimization results.

Figure 20A:
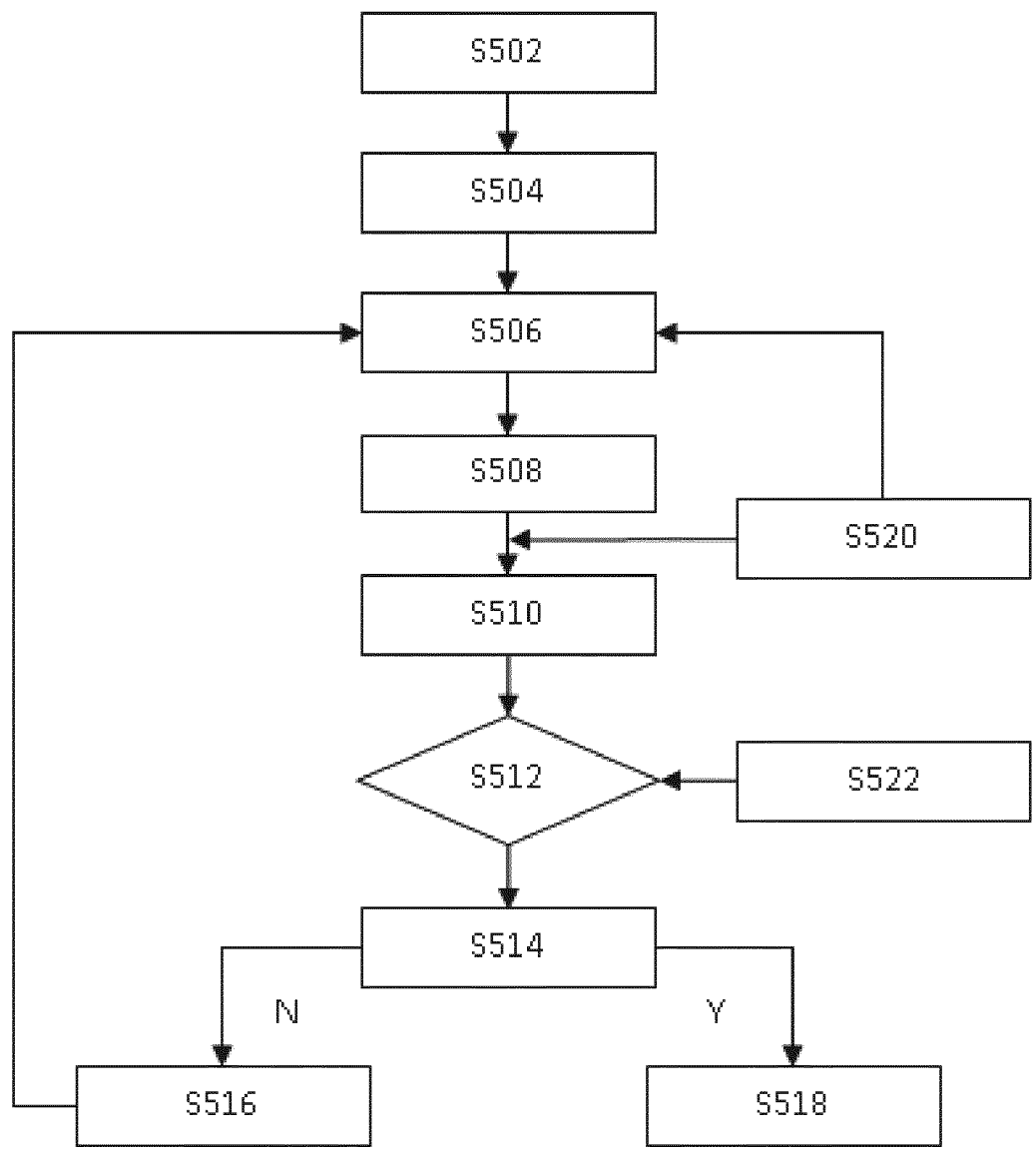
FIGS. 20A, 20B and 21 show example flowcharts of various optimization processes, according to an embodiment.

FIG. 20A shows one exemplary method of optimization, where a cost function is minimized. In step S502, initial values of design variables are obtained, including their tuning ranges, if any. In step S504, the multi-variable cost function is set up. In step S506, the cost function is expanded within a small enough neighborhood around the starting point value of the design variables for the first iterative step (i=0). In step S508, standard multi-variable optimization techniques are applied to minimize the cost function. Note that the optimization problem can apply constraints, such as tuning ranges, during the optimization process in S508 or at a later stage in the optimization process. Step S520 indicates that each iteration is done for the given test patterns (also known as "gauges") for the identified evaluation points that have been selected to optimize the lithographic process. In step S510, a lithographic response is predicted. In step S512, the result of step S510 is compared with a desired or ideal lithographic response value obtained in step S522. If the termination condition is satisfied in step S514, i.e. the optimization generates a lithographic response value sufficiently close to the desired value, and then the final value of the design variables is outputted in step S518. The output step may also include outputting other functions using the final values of the design variables, such as outputting a wavefront aberration-adjusted map at the pupil plane (or other planes), an optimized source map, and optimized design layout etc. If the termination condition is not satisfied, then in step S516, the values of the design variables is updated with the result of the i-th iteration, and the process goes back to step S506. The process of FIG. 20A is elaborated in details below.

In an exemplary optimization process, no relationship between the design variables $(z_1, z_2, \ldots, z_N)$ and $f_p(z_1, z_2, \ldots, z_N)$ is assumed or approximated, except that $f_p(z_1, z_2, \ldots, z_N)$ is sufficiently smooth (e.g. first order derivatives $$\frac{\partial f_p(z_1, z_2, \ldots, z_N)}{\partial z_n},$$

(n=1, 2, ... N) exist), which is generally valid in a lithographic projection apparatus. An algorithm, such as the Gauss-Newton algorithm, the Levenberg-Marquardt algorithm, the gradient descent algorithm, simulated annealing, the genetic algorithm, can be applied to find $(\tilde{z}_1, \tilde{z}_2, \ldots \tilde{z}_N)$.

Here, the Gauss-Newton algorithm is used as an example. The Gauss-Newton algorithm is an iterative method applicable to a general non-linear multi-variable optimization problem. In the i-th iteration wherein the design variables $(z_1, z_2, \ldots, z_N)$ take values of $(z_{1i}, z_{2i}, \ldots, z_{Ni})$, the Gauss-Newton algorithm linearizes $f_p(z_1, z_2, \ldots, z_N)$ in the vicinity of $(z_{1i}, z_{2i}, \ldots, z_{Ni})$, and then calculates values $(z_{1(i+1)}, z_{2(i+1)}, \ldots, z_{N(i+1)})$ in the vicinity of $(z_{1i}, z_{2i}, \ldots, z_{Ni})$ that give a minimum of CF $(z_1, z_2, \ldots, z_N)$. The design variables $(z_1, z_2, \ldots, z_N)$ take the values of $(z_{1(i+1)}, z_{2(i+1)}, \ldots, z_{N(i+1)})$ in the (i+1)-th iteration. This iteration continues until convergence (i.e. CF $(z_1, z_2, \ldots, z_N)$ does not reduce any further) or a preset number of iterations is reached.

Specifically, in the i-th iteration, in the vicinity of $(z_{1i}, z_{2i}, \ldots, z_{Ni})$, $$f_p(z_1, z_2, \ldots, z_N) \approx f_p(z_{1i}, z_{2i}, \ldots, z_{Ni}) + \sum_{n=1}^{N} \frac{\partial f_p(z_1, z_2, \ldots, z_N)}{\partial z_n} |_{z_1=z_{1i}, z_2=z_{2i}, \ldots z_N=z_{Ni}} (z_n - z_{ni}) \quad \text{(Eq. 3)}$$

Under the approximation of Eq. 3, the cost function becomes:

$$CF(z_1, z_2, \ldots, z_N) = \sum_{p=1}^{P} w_p f_p^2(z_1, z_2, \ldots, z_N) = \quad \text{(Eq. 4)}$$

$$\sum_{p=1}^{P} w_p \left( \sum_{n=1}^{N} \frac{\partial f_p(z_1, z_2, \ldots, z_N)}{\partial z_n} \bigg|_{z_1=z_{1i}, z_2=z_{2i}, \ldots, z_N=z_{Ni}} (z_n - z_{ni}) \right)^2$$

which is a quadratic function of the design variables ($z_1$, $z_2$, ..., $z_N$). Every term is constant except the design variables ($z_1$, $z_2$, ..., $z_N$).

If the design variables ($z_1$, $z_2$, ..., $z_N$) are not under any constraints, ($z_{1(i+1)}$, $z_{2(i+1)}$, ..., $z_{N(i+1)}$) can be derived by solving by N linear equations:

$$\frac{\partial CF(z_1, z_2, \ldots, z_N)}{\partial z_n} = 0,$$

wherein n=1, 2, ... N.

If the design variables ($z_1$, $z_2$, ..., $z_N$) are under the constraints in the form of inequalities (e.g. tuning ranges of ($z_1, z_2, \ldots, z_N$))

$$\sum_{n=1}^{N} A_{nj} z_n \leq B_j,$$

for j=1, 2, ... J; and K equalities (e.g. interdependence between the design variables)

$$\sum_{n=1}^{N} C_{nk} z_n = D_k,$$

for k=1, 2, ... K; the optimization process becomes a classic quadratic programming problem, wherein $A_{nj}$, $B_j$, $C_{nk}$, $D_k$ are constants. Additional constraints can be imposed for each iteration. For example, a "damping factor" $\Delta_D$ can be introduced to limit the difference between ($z_{1(i+1)}$, $z_{2(i+1)}$, ..., $z_{N(i+1)}$) and ($z_{1i}$, $z_{2i}$, ..., $z_{Ni}$), so that the approximation of Eq. 3 holds. Such constraints can be expressed as $z_{ni} - \Delta_D \leq z_n \leq z_{ni} + \Delta_D$. ($z_{1(i+1)}$, $z_{2(i+1)}$, ..., $z_{N(i+1)}$) can be derived using, for example, methods described in Numerical Optimization ($2^{nd}$ ed.) by Jorge Nocedal and Stephen J. Wright (Berlin New York: Vandenberghe. Cambridge University Press).

Instead of minimizing the RMS of $f_p$ ($z_1$, $z_2$, ..., $z_N$), the optimization process can minimize magnitude of the largest deviation (the worst defect) among the evaluation points to their intended values. In this approach, the cost function can alternatively be expressed as $$CF(z_1, z_2, \ldots, z_N) = \max_{1 \leq p \leq P} \frac{f_p(z_1, z_2, \ldots, z_N)}{CL_p}, \quad \text{(Eq. 5)}$$

wherein $CL_p$ is the maximum allowed value for $f_p$ ($z_1$, $z_2$, ..., $z_N$). This cost function represents the worst defect among the evaluation points. Optimization using this cost function minimizes magnitude of the worst defect. An iterative greedy algorithm can be used for this optimization.

The cost function of Eq. 5 can be approximated as:

$$CF(z_1, z_2, \ldots, z_N) = \sum_{p=1}^{P} \left( \frac{f_p(z_1, z_2, \ldots, z_N)}{CL_p} \right)^q, \quad \text{(Eq. 6)}$$

wherein q is an even positive integer such as at least 4, preferably at least 10. Eq. 6 mimics the behavior of Eq. 5, while allowing the optimization to be executed analytically and accelerated by using methods such as the deepest descent method, the conjugate gradient method, etc.

Minimizing the worst defect size can also be combined with linearizing of $f_p$ ($z_1$, $z_2$, ..., $z_N$). Specifically, $f_p$ ($z_1$, $z_2$, ..., $z_N$) is approximated as in Eq. 3. Then the constraints on worst defect size are written as inequalities $E_{Lp} \leq f_p$ ($z_1$, $z_2$, ..., $z_N$) $\leq E_{Up}$, wherein $E_{Lp}$ and $E_{Up}$ are two constants specifying the minimum and maximum allowed deviation for the $f_p$ ($z_1$, $z_2$, ..., $z_N$). Plugging Eq. 3 in, these constraints are transformed to, for p=1, ... P, $$\sum_{n=1}^{N} \frac{\partial f_p(z_1, z_2, \ldots, z_N)}{\partial z_n} \bigg|_{z_1=z_{1i}, z_2=z_{2i}, \ldots, z_N=z_{Ni}}, \quad \text{(Eq. 6')}$$

$$z_n \leq E_{Up} + \sum_{n=1}^{N} \frac{\partial f_p(z_1, z_2, \ldots, z_N)}{\partial z_n} \bigg|_{z_1=z_{1i}, z_2=z_{2i}, \ldots, z_N=z_{Ni}},$$

$$z_{ni} - f_p(z_{1i}, z_2, \ldots, z_{Ni}) \text{ and}$$

$$-\sum_{n=1}^{N} \frac{\partial f_p(z_1, z_2, \ldots, z_N)}{\partial z_n} \bigg|_{z_1=z_{1i}, z_2=z_{2i}, \ldots, z_N=z_{Ni}}, \quad \text{(Eq. 6'')}$$

$$z_n \leq -E_{Up} - \sum_{n=1}^{N} \frac{\partial f_p(z_1, z_2, \ldots, z_N)}{\partial z_n} \bigg|_{z_1=z_{1i}, z_2=z_{2i}, \ldots, z_N=z_{Ni}},$$

$$z_{ni} - f_p(z_{1i}, z_2, \ldots, z_{Ni})$$

Since Eq. 3 is generally valid only in the vicinity of ($z_{1i}$, $z_{2i}$, ..., $z_{Ni}$), in case the desired constraints $E_{Lp} \leq f_p$ ($z_1$, $z_2$, ..., $z_N$) $\leq E_{Up}$ cannot be achieved in such vicinity, which can be determined by any conflict among the inequalities, the constants $E_{Lp}$ and $E_{Up}$ can be relaxed until the constraints are achievable. This optimization process minimizes the worst defect size in the vicinity of ($z_{1i}$, $z_{2i}$, ..., $z_{Ni}$). Then each step reduces the worst defect size gradually, and each step is executed iteratively until certain terminating conditions are met. This will lead to optimal reduction of the worst defect size.

Another way to minimize the worst defect is to adjust the weight $w_p$ in each iteration. For example, after the i-th iteration, if the r-th evaluation point is the worst defect, $w_r$ can be increased in the (i+1)-th iteration so that the reduction of that evaluation point's defect size is given higher priority.

In addition, the cost functions in Eq. 4 and Eq. 5 can be modified by introducing a Lagrange multiplier to achieve compromise between the optimization on RMS of the defect size and the optimization on the worst defect size, i.e., $$CF(z_1, z_2, \ldots, z_N) = \quad \text{(Eq. 6''')}$$

$$(1-\lambda) \sum_{p=1}^{P} w_p f_p^2(z_1, z_2, \ldots, z_N) + \lambda \max_{1 \leq p \leq P} \frac{f_p(z_1, z_2, \ldots, z_N)}{CL_p}$$

where $\lambda$ is a preset constant that specifies the trade-off between the optimization on RMS of the defect size and the optimization on the worst defect size. In particular, if λ=0, then this becomes Eq.4 and the RMS of the defect size is only minimized; while if λ1=1, then this becomes Eq.5 and the worst defect size is only minimized; if 0<λ<1, then both are taken into consideration in the optimization. Such optimization can be solved using multiple methods. For example, the weighting in each iteration may be adjusted, similar to the one described previously. Alternatively, similar to minimizing the worst defect size from inequalities, the inequalities of Eq. 6' and 6" can be viewed as constraints of the design variables during solution of the quadratic programming problem. Then, the bounds on the worst defect size can be relaxed incrementally or increase the weight for the worst defect size incrementally, compute the cost function value for every achievable worst defect size, and choose the design variable values that minimize the total cost function as the initial point for the next step. By doing this iteratively, the minimization of this new cost function can be achieved.

Optimizing a lithographic projection apparatus can expand the process window. A larger process window provides more flexibility in process design and chip design. The process window can be defined as a set of focus and dose values for which the resist image are within a certain limit of the design target of the resist image. Note that all the methods discussed here may also be extended to a generalized process window definition that can be established by different or additional base parameters in addition to exposure dose and defocus. These may include, but are not limited to, optical settings such as NA, sigma, aberrations, polarization, or optical constants of the resist layer. For example, as described earlier, if the PW also consists of different mask bias, then the optimization includes the minimization of MEEF (Mask Error Enhancement Factor), which is defined as the ratio between the substrate EPE and the induced mask edge bias. The process window defined on focus and dose values only serve as an example in this disclosure. A method of maximizing the process window, according to an embodiment, is described below.

In a first step, starting from a known condition $(f_0, \varepsilon_D)$ in the process window, wherein $f_0$ is a nominal focus and $\varepsilon_0$ is a nominal dose, minimizing one of the cost functions below in the vicinity $(f_0 \pm \Delta f, \varepsilon_0 \pm \Delta \varepsilon)$:

$$CF(z_1, z_2, \ldots, z_N, f_0, \varepsilon_0) = \max_{(f,\varepsilon)=(f_0 \pm \Delta f, \varepsilon_0 \pm \Delta \varepsilon)} \max_p |f_p(z_1, z_2, \ldots, z_N, f, \varepsilon)|. \quad \text{(Eq. 7)}$$

or $$CF(z_1, z_2, \ldots, z_N, f_0, \varepsilon_0) = \sum_{(f,\varepsilon)=(f_0 \pm \Delta f, \varepsilon_0 \pm \Delta \varepsilon)} \sum_p w_p f_p^2(z_1, z_2, \ldots, z_N, f, \varepsilon) \quad \text{(Eq. 7')}$$

or $$CF(z_1, z_2, \ldots, z_N, f_0, \varepsilon_0) = \quad \text{(Eq. 7")}$$
$$(1-\lambda) \sum_{(f,\varepsilon)=(f_0 \pm \Delta f, \varepsilon_0 \pm \Delta \varepsilon)} \sum_p w_p f_p^2(z_1, z_2, \ldots, z_N, f, \varepsilon) +$$
$$\lambda \max_{(f,\varepsilon)=(f_0 \pm \Delta f, \varepsilon_0 \pm \Delta \varepsilon)} \max_p |f_p(z_1, z_2, \ldots, z_N, f, \varepsilon)|$$

If the nominal focus $f_0$ and nominal dose $\varepsilon_0$ are allowed to shift, they can be optimized jointly with the design variables $(z_1, z_2, \ldots z_N)$. In the next step, $(f_0 \pm \Delta f, \varepsilon_0 \pm \Delta \varepsilon)$ is accepted as part of the process window, if a set of values of $(z_1, z_2, \ldots, z_N, f, \varepsilon)$ can be found such that the cost function is within a preset limit.

Alternatively, if the focus and dose are not allowed to shift, the design variables $(z_1, z_2, \ldots, z_N)$ are optimized with the focus and dose fixed at the nominal focus $f_0$ and nominal dose co. In an alternative embodiment, $(f_0 \pm \Delta f, \varepsilon_0 \pm \Delta \varepsilon)$ is accepted as part of the process window, if a set of values of $(z_1, z_2, \ldots, z_N)$ can be found such that the cost function is within a preset limit.

The methods described earlier in this disclosure can be used to minimize the respective cost functions of Eqs. 7, 7', or 7". If the design variables are characteristics of the projection optics, such as the Zernike coefficients, then minimizing the cost functions of Eqs. 7, 7', or 7" leads to process window maximization based on projection optics optimization, i.e., LO. If the design variables are characteristics of the source and patterning device in addition to those of the projection optics, then minimizing the cost function of Eqs. 7, 7', or 7" leads to process window maximizing based on SMLO, as illustrated in FIG. 19. If the design variables are characteristics of the source and patterning device and, then minimizing the cost functions of Eqs. 7, 7', or 7" leads to process window maximization based on SMO. The cost functions of Eqs. 7, 7', or 7" can also include at least one $f_p$ $(z_1, z_2, \ldots, z_N)$ such as that in Eq. 7 or Eq. 8, that is a function of one or more stochastic effects such as the LWR or local CD variation of 2D features, and throughput.

Figure 21:
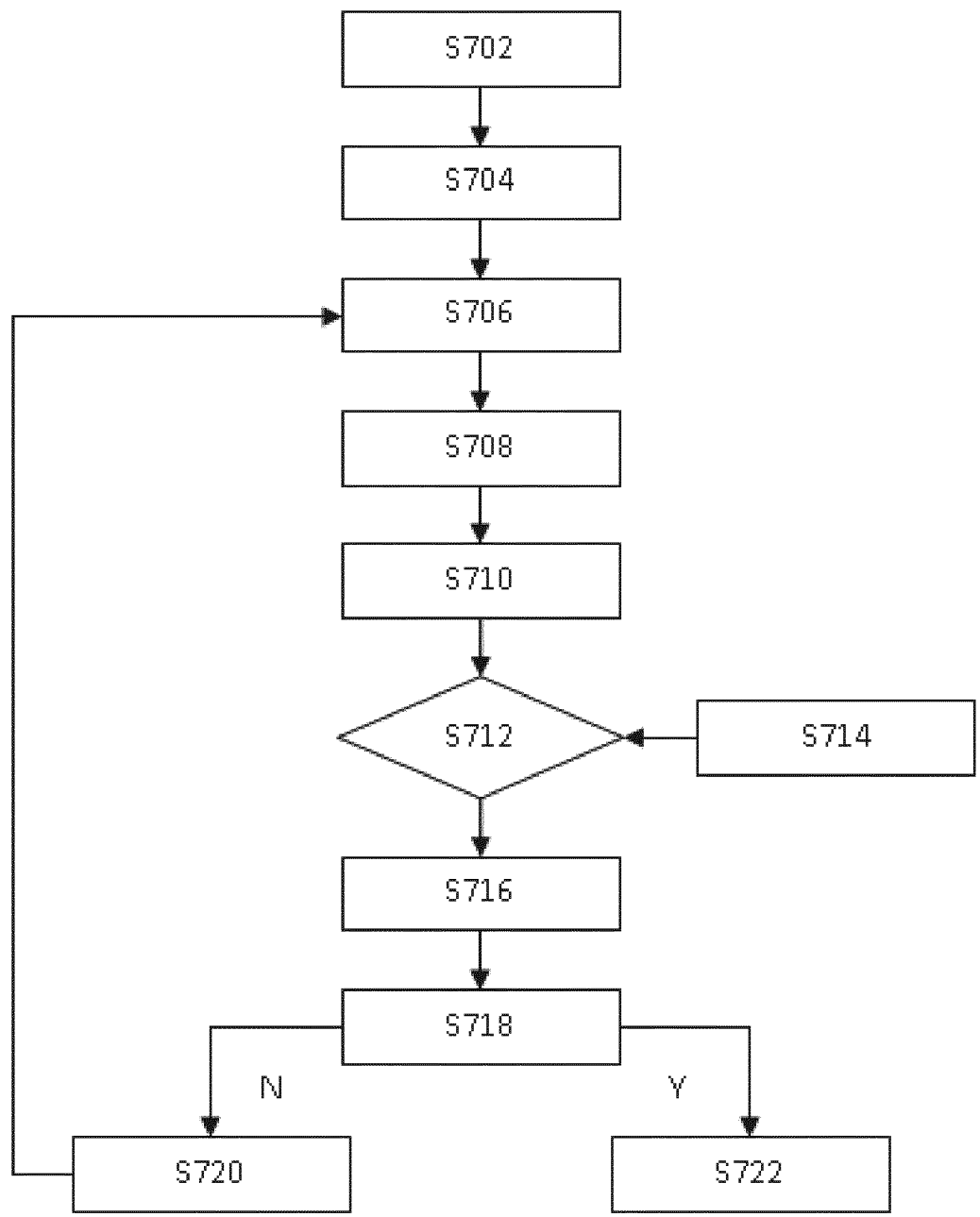

FIG. 21 shows one specific example of how a simultaneous SMLO process can use a Gauss Newton Algorithm for optimization. In step S702, starting values of design variables are identified. Tuning ranges for each variable may also be identified. In step S704, the cost function is defined using the design variables. In step S706 cost function is expanded around the starting values for all evaluation points in the design layout. In optional step S710, a full-chip simulation is executed to cover all critical patterns in a full-chip design layout. Desired lithographic response metric (such as CD or EPE) is obtained in step S714, and compared with predicted values of those quantities in step S712. In step S716, a process window is determined. Steps S718, S720, and S722 are similar to corresponding steps S514, S516 and S518, as described with respect to FIG. 20A. As mentioned before, the final output may be a wavefront aberration map in the pupil plane, optimized to produce the desired imaging performance. The final output may also be an optimized source map and/or an optimized design layout.

Figure 20B:
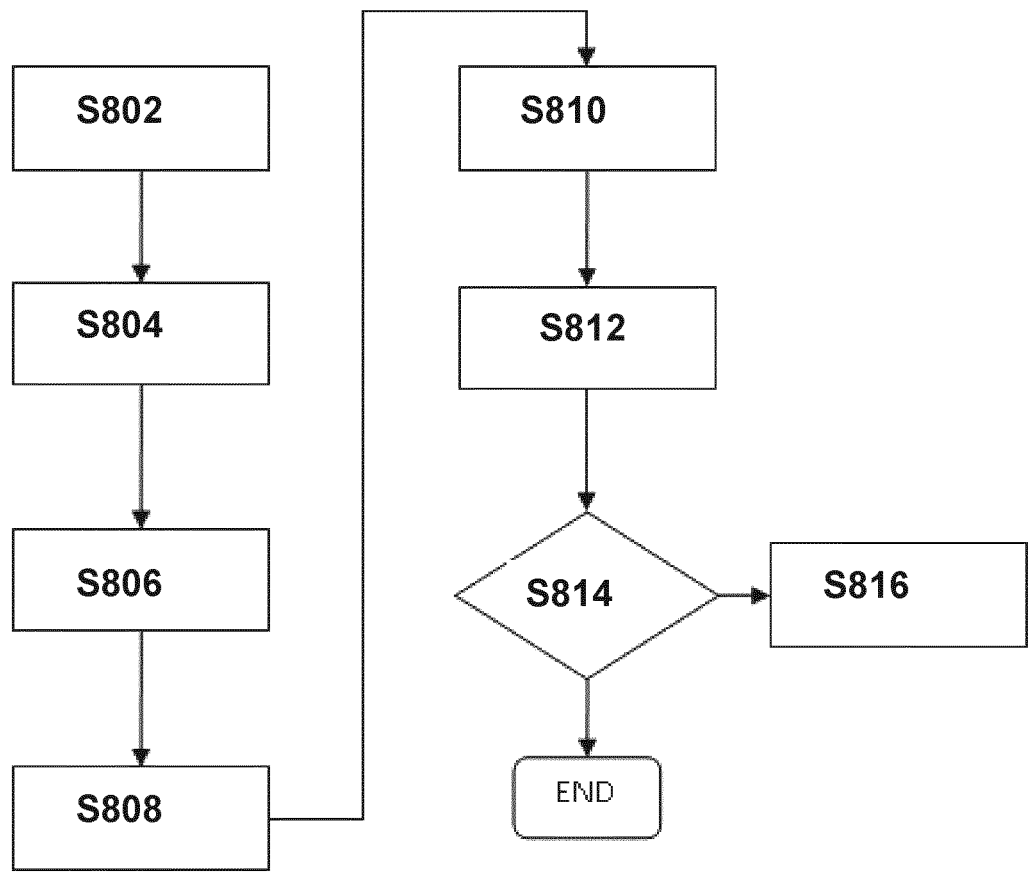

FIG. 20B shows an exemplary method to optimize the cost function where the design variables $(z_1, z_2, \ldots, z_N)$ include design variables that may only assume discrete values.

The method starts by defining the pixel groups of the illumination source and the patterning device tiles of the patterning device (step S802). Generally, a pixel group or a patterning device tile may also be referred to as a division of a lithographic process component. In one exemplary approach, the illumination source is divided into 117 pixel groups, and 94 patterning device tiles are defined for the patterning device, substantially as described above, resulting in a total of 211 divisions.

In step S804, a lithographic model is selected as the basis for photolithographic simulation. Photolithographic simulations produce results that are used in calculations of photolithographic metrics, or responses. A particular photolithographic metric is defined to be the performance metric that is to be optimized (step S806). In step S808, the initial (pre-optimization) conditions for the illumination source and the patterning device are set up. Initial conditions include initial states for the pixel groups of the illumination source and the patterning device tiles of the patterning device such that references may be made to an initial illumination shape and an initial patterning device pattern. Initial conditions may also include mask bias, NA, and focus ramp range. Although steps S802, S804, S806, and S808 are depicted as sequential steps, it will be appreciated that in other embodiments of the invention, these steps may be performed in other sequences.

In step S810, the pixel groups and patterning device tiles are ranked. Pixel groups and patterning device tiles may be interleaved in the ranking Various ways of ranking may be employed, including: sequentially (e.g., from pixel group 1 to pixel group 117 and from patterning device tile 1 to patterning device tile 94), randomly, according to the physical locations of the pixel groups and patterning device tiles (e.g., ranking pixel groups closer to the center of the illumination source higher), and according to how an alteration of the pixel group or patterning device tile affects the performance metric.

Once the pixel groups and patterning device tiles are ranked, the illumination source and patterning device are adjusted to improve the performance metric (step S812). In step S812, each of the pixel groups and patterning device tiles are analyzed, in order of ranking, to determine whether an alteration of the pixel group or patterning device tile will result in an improved performance metric. If it is determined that the performance metric will be improved, then the pixel group or patterning device tile is accordingly altered, and the resulting improved performance metric and modified illumination shape or modified patterning device pattern form the baseline for comparison for subsequent analyses of lower-ranked pixel groups and patterning device tiles. In other words, alterations that improve the performance metric are retained. As alterations to the states of pixel groups and patterning device tiles are made and retained, the initial illumination shape and initial patterning device pattern changes accordingly, so that a modified illumination shape and a modified patterning device pattern result from the optimization process in step S812.

In other approaches, patterning device polygon shape adjustments and pairwise polling of pixel groups and/or patterning device tiles are also performed within the optimization process of S812.

In an alternative embodiment the interleaved simultaneous optimization procedure may include to alter a pixel group of the illumination source and if an improvement of the performance metric is found, the dose is stepped up and down to look for further improvement. In a further alternative embodiment the stepping up and down of the dose or intensity may be replaced by a bias change of the patterning device pattern to look for further improvement in the simultaneous optimization procedure.

In step S814, a determination is made as to whether the performance metric has converged. The performance metric may be considered to have converged, for example, if little or no improvement to the performance metric has been witnessed in the last several iterations of steps S810 and S812. If the performance metric has not converged, then the steps of S810 and S812 are repeated in the next iteration, where the modified illumination shape and modified patterning device from the current iteration are used as the initial illumination shape and initial patterning device for the next iteration (step S816).

The optimization methods described above may be used to increase the throughput of the lithographic projection apparatus. For example, the cost function may include an $f_p(z_1, z_2, \ldots, z_N)$ that is a function of the exposure time. Optimization of such a cost function is preferably constrained or influenced by a measure of the stochastic effects or other metrics. Specifically, a computer-implemented method for increasing a throughput of a lithographic process may include optimizing a cost function that is a function of one or more stochastic effects of the lithographic process and a function of an exposure time of the substrate, in order to minimize the exposure time.

In one embodiment, the cost function includes at least one $f_p(z_1, z_2, \ldots, z_N)$ that is a function of one or more stochastic effects. The stochastic effects may include the failure of a feature, measurement data (e.g., SEPE) determined as in method of FIG. 3, LWR or local CD variation of 2D features. In one embodiment, the stochastic effects include stochastic variations of characteristics of a resist image. For example, such stochastic variations may include failure rate of a feature, line edge roughness (LER), line width roughness (LWR) and critical dimension uniformity (CDU). Including stochastic variations in the cost function allows finding values of design variables that minimize the stochastic variations, thereby reducing risk of defects due to stochastic effects.

Figure 22:
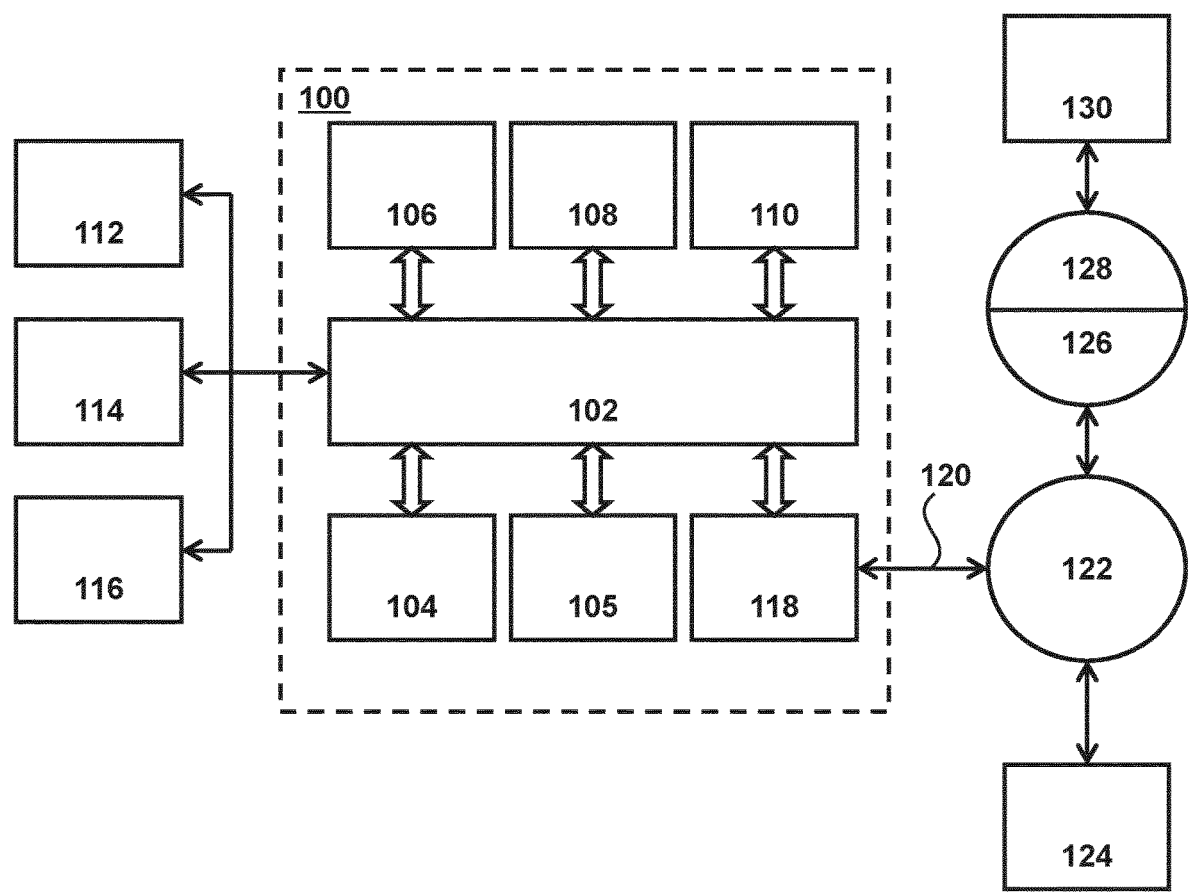
FIG. 22 is a block diagram of an example computer system, according to an embodiment.

FIG. 22 is a block diagram that illustrates a computer system 100 which can assist in implementing the optimization methods and flows disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of the optimization process may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also preferably includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide for the illumination optimization of the embodiment, for example. The received code may be executed by processor 104 as it is received, and/or stored in storage device 110, or other non-volatile storage for later execution. In this manner, computer system 100 may obtain application code in the form of a carrier wave.

Figure 23:
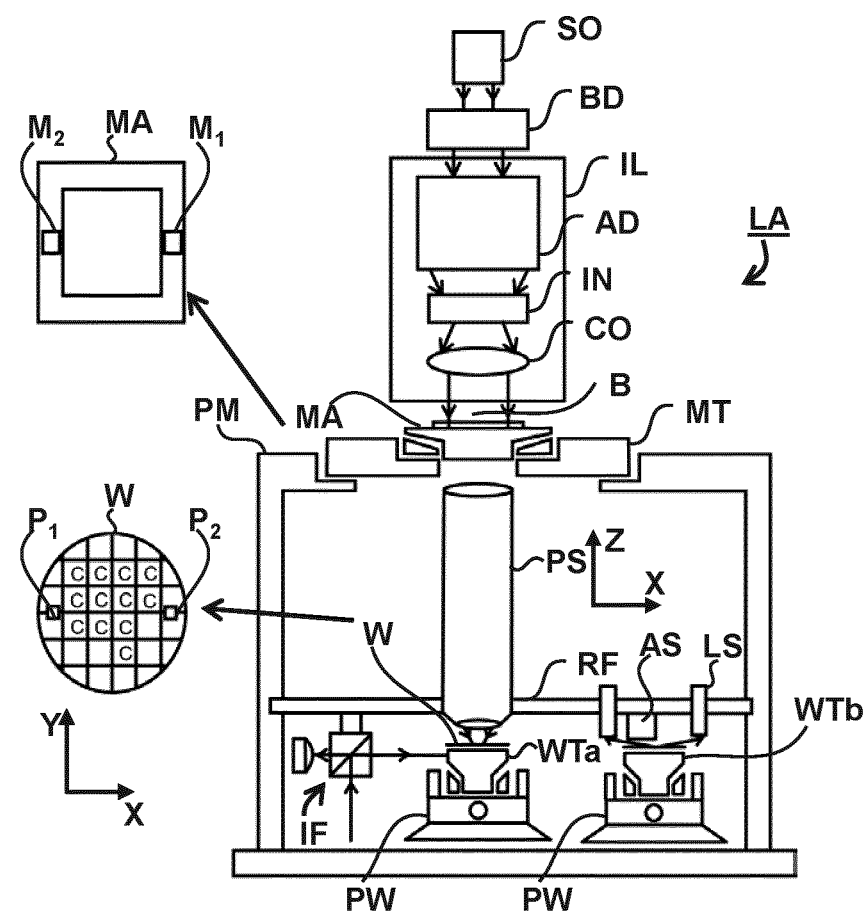
FIG. 23 is a schematic diagram of a lithographic projection apparatus, according to an embodiment.

FIG. 23 schematically depicts an exemplary lithographic projection apparatus whose illumination source could be optimized utilizing the methods described herein. The apparatus comprises:

- an illumination system IL, to condition a beam B of radiation. In this particular case, the illumination system also comprises a radiation source SO;
- a first object table (e.g., mask table) MT provided with a patterning device holder to hold a patterning device MA (e.g., a reticle), and connected to a first positioner to accurately position the patterning device with respect to item PS;
- a second object table (substrate table) WT provided with a substrate holder to hold a substrate W (e.g., a resist-coated silicon wafer), and connected to a second positioner to accurately position the substrate with respect to item PS;
- a projection system ("lens") PS (e.g., a refractive, catoptric or catadioptric optical system) to image an irradiated portion of the patterning device MA onto a target portion C (e.g., comprising one or more dies) of the substrate W.

As depicted herein, the apparatus is of a transmissive type (i.e., has a transmissive mask). However, in general, it may also be of a reflective type, for example (with a reflective mask). Alternatively, the apparatus may employ another kind of patterning device as an alternative to the use of a classic mask; examples include a programmable mirror array or LCD matrix.

The source SO (e.g., a mercury lamp or excimer laser) produces a beam of radiation. This beam is fed into an illumination system (illuminator) IL, either directly or after having traversed conditioning means, such as a beam expander Ex, for example. The illuminator IL may comprise adjusting means AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross-section.

It should be noted with regard to FIG. 23 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, ArF or $F_2$ lasing).

The beam PB subsequently intercepts the patterning device MA, which is held on a patterning device table MT. Having traversed the patterning device MA, the beam B passes through the lens PL, which focuses the beam B onto a target portion C of the substrate W. With the aid of the second positioning means (and interferometric measuring means IF), the substrate table WT can be moved accurately, e.g. so as to position different target portions C in the path of the beam PB. Similarly, the first positioning means can be used to accurately position the patterning device MA with respect to the path of the beam B, e.g., after mechanical retrieval of the patterning device MA from a patterning device library, or during a scan. In general, movement of the object tables MT, WT will be realized with the aid of a long-stroke module (coarse positioning) and a short-stroke module (fine positioning), which are not explicitly depicted in FIG. 23. However, in the case of a wafer stepper (as opposed to a step-and-scan tool) the patterning device table MT may just be connected to a short stroke actuator, or may be fixed.

The depicted tool can be used in two different modes:

In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam PB;

In scan mode, essentially the same scenario applies, except that a given target portion C is not exposed in a single "flash". Instead, the patterning device table MT is movable in a given direction (the so-called "scan direction", e.g., the y direction) with a speed v, so that the projection beam B is caused to scan over a patterning device image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

Figure 24:
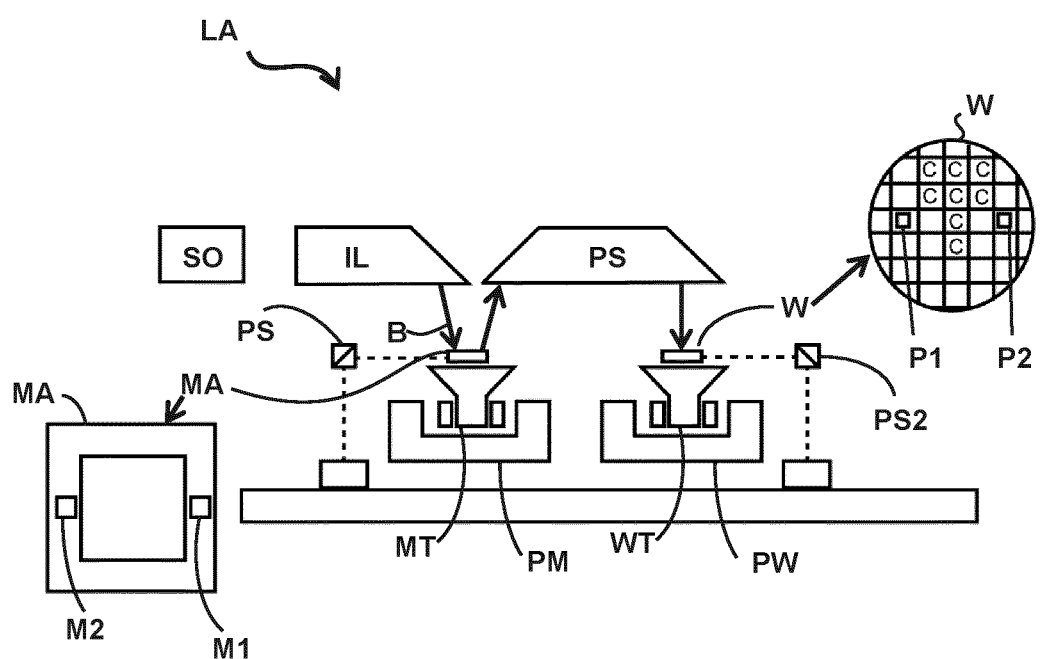
FIG. 24 is a schematic diagram of another lithographic projection apparatus, according to an embodiment.

FIG. 24 schematically depicts another exemplary lithographic projection apparatus LA whose illumination source could be optimized utilizing the methods described herein.

The lithographic projection apparatus LA includes:
a source collector module SO
an illumination system (illuminator) IL configured to condition a radiation beam B (e.g. EUV radiation).
a support structure (e.g. a mask table) MT constructed to support a patterning device (e.g. a mask or a reticle) MA and connected to a first positioner PM configured to accurately position the patterning device;
a substrate table (e.g. a wafer table) WT constructed to hold a substrate (e.g. a resist coated wafer) W and connected to a second positioner PW configured to accurately position the substrate; and
a projection system (e.g. a reflective projection system) PS configured to project a pattern imparted to the radiation beam B by patterning device MA onto a target portion C (e.g. comprising one or more dies) of the substrate W.

As here depicted, the apparatus LA is of a reflective type (e.g. employing a reflective mask). It is to be noted that because most materials are absorptive within the EUV wavelength range, the mask may have multilayer reflectors comprising, for example, a multi-stack of Molybdenum and Silicon. In one example, the multi-stack reflector has a 40 layer pairs of Molybdenum and Silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Referring to FIG. 24, the illuminator IL receives an extreme ultra violet radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. The source collector module SO may be part of an EUV radiation system including a laser, not shown in FIG. 24, for providing the laser beam exciting the fuel. The resulting plasma emits output radiation, e.g., EUV radiation, which is collected using a radiation collector, disposed in the source collector module. The laser and the source collector module may be separate entities, for example when a CO2 laser is used to provide the laser beam for fuel excitation.

In such cases, the laser is not considered to form part of the lithographic apparatus and the radiation beam is passed from the laser to the source collector module with the aid of a beam delivery system comprising, for example, suitable directing mirrors and/or a beam expander. In other cases the source may be an integral part of the source collector module, for example when the source is a discharge produced plasma EUV generator, often termed as a DPP source.

The illuminator IL may comprise an adjuster for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may comprise various other components, such as facetted field and pupil mirror devices. The illuminator may be used to condition the radiation beam, to have a desired uniformity and intensity distribution in its cross section.

The radiation beam B is incident on the patterning device (e.g., mask) MA, which is held on the support structure (e.g., mask table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder or capacitive sensor), the substrate table WT can be moved accurately, e.g. so as to position different target portions C in the path of the radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus LA could be used in at least one of the following modes:

1. In step mode, the support structure (e.g. mask table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.

2. In scan mode, the support structure (e.g. mask table) MT and the substrate table WT are scanned synchronously while a pattern imparted to the radiation beam is projected onto a target portion C (i.e. a single dynamic exposure). The velocity and direction of the substrate table WT relative to the support structure (e.g. mask table) MT may be determined by the (de-)magnification and image reversal characteristics of the projection system PS.

3. In another mode, the support structure (e.g. mask table) MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Figure 25:
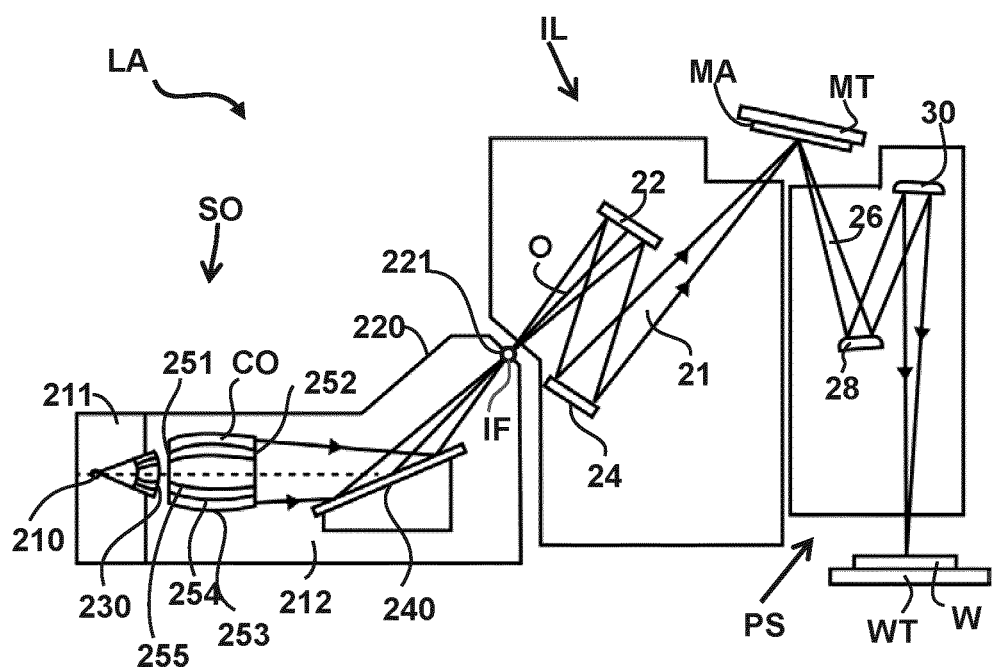
FIG. 25 is a more detailed view of the apparatus in FIG. 24, according to an embodiment.

FIG. 25 shows the apparatus LA in more detail, including the source collector module SO, the illumination system IL, and the projection system PS. The source collector module SO is constructed and arranged such that a vacuum environment can be maintained in an enclosing structure 220 of the source collector module SO. An EUV radiation emitting plasma 210 may be formed by a discharge produced plasma source. EUV radiation may be produced by a gas or vapor, for example Xe gas, Li vapor or Sn vapor in which the very hot plasma 210 is created to emit radiation in the EUV range of the electromagnetic spectrum. The very hot plasma 210 is created by, for example, an electrical discharge causing an at least partially ionized plasma. Partial pressures of, for example, 10 Pa of Xe, Li, Sn vapor or any other suitable gas or vapor may be required for efficient generation of the radiation. In an embodiment, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may optionally be present, depending upon the type of lithographic apparatus. Further, there may be more mirrors present than those shown in the figures, for example there may be 1-6 additional reflective elements present in the projection system PS than shown in FIG. 25.

Collector optic CO, as illustrated in FIG. 25, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type is preferably used in combination with a discharge produced plasma source, often called a DPP source.

Figure 26:
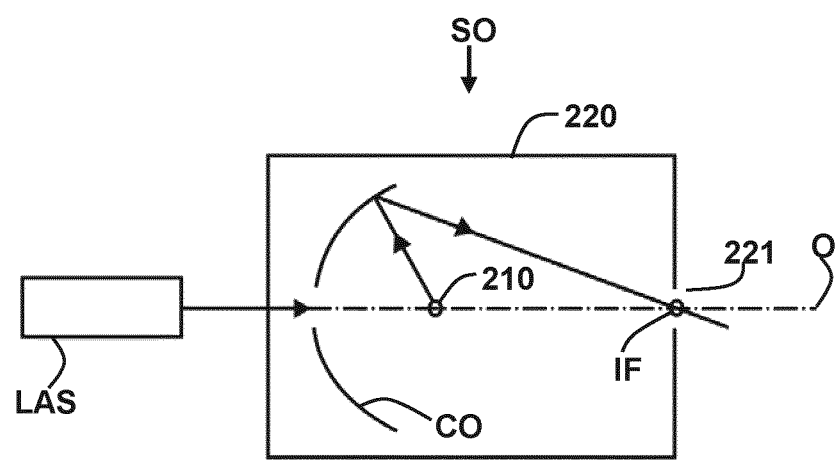
FIG. 26 is a more detailed view of the source collector module SO of the apparatus of FIGS. 24 and 25, according to an embodiment.

Alternatively, the source collector module SO may be part of an LPP radiation system as shown in FIG. 26. A laser LA is arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

The concepts disclosed herein may simulate or mathematically model any generic imaging system for imaging sub wavelength features, and may be especially useful with emerging imaging technologies capable of producing increasingly shorter wavelengths. Emerging technologies already in use include EUV (extreme ultra violet), DUV lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

The embodiments may further be described using the following clauses:

1. A method for training a patterning process model, the patterning process model configured to predict a pattern that will be formed on a patterning process, the method comprising:

obtaining (i) an image data associated with a desired pattern, (ii) a measured pattern of the substrate, the measured pattern being associated with the desired pattern, (iii) a first model associated with an aspect of the patterning process, the first model comprising a first set of parameters, and (iv) a machine learning model associated with another aspect of the patterning process, the machine learning model comprising a second set of parameters; and iteratively determining values of the first set of parameters and the second set of parameters to train the patterning process model, wherein an iteration comprises:

executing, using the image data, the first model and the machine learning model to cooperatively predict a printed pattern of the substrate; and modifying the values of the first set of parameters and the second set of parameters such that a difference between the measured pattern and the predicted pattern of the patterning process model is reduced.

2. The method of clause 1, wherein the first model and the machine learning model are configured and trained in a deep convolutional neural network framework.

3. The method of clause 2, wherein the training involves:
predicting the printed pattern by forward propagation of outputs of the first model and the machine learning model;
determining the difference between the measured pattern and the predicted pattern of the patterning process model;
determining a differential of the difference with respect to the first set of parameters and the set of second parameters; and
determining values of the first set of parameters and the second set of parameters by backward propagation of the outputs of the first model and the machine learning model based on the differential of the difference.

4. The method of any of clauses 1-3, wherein the first model is connected to the machine learning model in a series or in a parallel combination.

5. The method of clause 4, wherein the series combination of the models comprises:
providing output of the first model as an input to the machine learning model.

6. The method of clause 4, wherein the series combination of the models comprises:
providing output of the machine learning model as an input to the first model.

7. The method of clause 4, wherein the parallel combination of the models comprises:
providing the same input to the first model and the machine learning model;
combining output of the first model and the machine learning model; and
determining the predicted printed pattern based on the combined outputs of the respective models.

8. The method of any of clauses 1-7, wherein the first model is a resist model, and/or an aerial model.

9. The method of clause 8, wherein the first set of parameters of the resist model correspond to at least one of:
an initial acid distribution;
an acid diffusion;
an image contrast;
a long range pattern loading effect;
a long range pattern loading effect
an acid concentration after neutralization;
a base concentration after neutralization;
a diffusion due to high acid concentration;
a diffusion due to high base concentration;
a resist shrinkage;
a resist development; or
two-dimensional convex curvature effects;

10. The method of any of clauses 1-9, wherein the first model is an empirical model that accurately model physics of a first aspect of the patterning process.

11. The method of any of the clauses 1-10, wherein the first model corresponds to the first aspect related to an acid-based diffusion after exposure of the substrate.

12. The method of any of clauses 1-9, wherein the machine learning model is a neural network that models a second aspect of the patterning process having relatively less physics based understanding.

13. The method of clause 12, wherein the second set of parameters comprises: weights and bias of one or more layers of the neural network.

14. The method of any of clauses 1-13, wherein the patterning process model correspond to the second aspect of a post-exposure process of the patterning process.

15. The method of any of clauses 1-14, wherein the first aspect and/or the second aspect of the post-exposure process comprises: resist baking, resist development, and/or etching.

16. A method for determining optical proximity corrections for a patterning process, the method comprising:
obtaining an image data associated with a desired pattern;
executing a trained patterning process model using the image data to predict a pattern that will be printed on the substrate; and
determining optical proximity corrections and/or defects using the predicted pattern that will be printed on the substrate subjected to the patterning process.

17. The method of clause 16, wherein the image data is an aerial image and/or a mask image of the desired pattern.

18. The method of clause 16, wherein the trained patterning process model comprises a first model of a first aspect of the patterning process and a machine learning model of a second aspect of the patterning process configured to corporately predict the pattern that will be printed on the substrate.

19. The method of clause 18, wherein the first model and the machine learning model are in a series combination and/or a parallel combination.

20. The method of any of clauses 16-19, wherein the first model is an empirical model that accurately model physics of the first aspect of a post exposure process of the patterning process.

21. The method of any of the clauses 16-20, wherein the first model correspond to the first aspect related to an acid-based diffusion after exposure of the substrate.

22. The method of any of clauses 16-21, wherein the machine learning model is a neural network that models the second aspect of the patterning process having relatively less physics based understanding.

23. The method of any of clauses 16-22, wherein the determining the optical proximity correction comprises:
adjusting a desired pattern and/or placing assist features around the desired pattern such that a difference between the predicted pattern and the desired pattern is reduced.

24. The method of any of clauses 16-22, wherein the determining the defects comprises:
performing a lithographic manufacturability check on the predicted pattern.

25. A method for training a machine learning model configured to determine an etch bias related to an etching process, the method comprising:
obtaining (i) resist pattern data associated with a target pattern to be printed on a substrate, (ii) physical effect data characterizing effects of the etching process on the target pattern, and (iii) measured bias between a resist pattern and an etched pattern formed on a printed substrate; and
training, based on the resist pattern data, the physical effect data, and the measured bias, the machine learning model to reduce a difference between the measured bias and the predicted etch bias.

26. The method of clause 25, wherein the machine learning model is configured to receive the resist pattern data at a first layer of the machine learning model, and the physical effect data is received at a last layer of the machine learning model.

27. The method of clause 26, wherein an output of the last layer is a linear combination of (i) the etch bias predicted by executing the machine learning model using the resist pattern data as an input, and (ii) another etch bias determined based on the physical effect data related to the etching process.

28. The method of clause 27, wherein the output of the last layer is an etch bias map from which the etching bias is extracted, wherein the etch bias map is generated via:
   executing the machine learning model using the resist pattern data as the input to output an etch bias map, wherein the etch bias map includes a biased resist pattern; and
   combining the etch bias map with the physical effect data.

29. The method of clause 28, wherein the machine learning model is configured to receive the resist pattern data and the physical effect data at the first layer of the machine learning model.

30. The method of any of clauses 25-29, wherein the training of the machine learning model is an iterative process comprises:
   (a) predicting, via executing the machine learning model using the resist pattern data and the physical effect data as inputs, the etching bias;
   (b) determining the difference between the measured bias and the predicted etching bias;
   (c) determining a gradient of the difference with respect to model parameters of the machine learning model;
   (d) adjusting, using the gradient as a guide, model parameter values such that the difference between the measured bias and the predicted etching bias is reduced;
   (e) determining whether the difference is minimized or breaches a training threshold; and
   (f) responsive to the difference not minimized or the training threshold not breached, performing steps (a)-(e).

31. The method of any of clauses 25-30, wherein the obtaining of the resist pattern data comprises:
   executing, using the target pattern to be printed on the substrate, one or more process model including a resist model of the patterning process.

32. The method of any of clauses 25-31, wherein the resist pattern data is represented as a resist image, wherein the resist image is a pixelated image.

33. The method of any of clauses 25-32, wherein the physical effect data is data related to an etch term characterizing an etching effect, the etch terms comprises at least one of:
   a concentration of plasma within a trench of the resist pattern associated with the target pattern;
   a concentration of plasma on top of a resist layer of the substrate;
   a loading effect determined by convolving the resist pattern with a Gaussian Kernel having a specified model parameters;
   a change in the loading effect on the resist pattern during the etching process;
   a relative position of the resist pattern with respect to neighboring patterns on the substrate;
   an aspect ratio of the resist pattern; or
   terms related to a combined effect of two or more etching process parameters.

34. The method of any of clauses 25-33, wherein the obtaining of the physical effect data comprises:
   executing a physical effect model including one or more of the etch terms and a Gaussian kernel specified for the respective one or more of the etch terms.

35. The method of any of clauses 25-34, wherein the physical effect data is represented as a pixelated image wherein each pixel intensity is indicative of the physical effect on the resist pattern associated with the target pattern.

36. The method of clauses 25-35, further comprising:
   obtaining a resist contour of the resist pattern; and
   generating an etch contour by applying the etching bias to the resist contour.

37. A system for determining an etch bias related to an etching process, the system comprising:
   a semiconductor process apparatus; and
   a processor configured to:
      determine, via executing a physical effect model, physical effect data characterizing effects of the etching process on the substrate;
      execute a trained machine learning model using the resist pattern and the physical effect data as input to determine the etch bias; and
      control the semiconductor apparatus or the etching process based on the etch bias.

38. The system of clause 37, wherein the trained machine learning model is trained using a plurality of resist patterns, the physical effect data associated with each resist pattern of the resist patterns, and the measured bias associated with each resist pattern, so that a difference between the measured bias and the determined etch bias is minimized.

39. The system of any of clauses 37-38, wherein the trained machine learning model is a convolutional neural network (CNN) including specific weights and biases, wherein the weights and biases of the CNN are determined via a training process employing the plurality of resist patterns, the physical effect data associated with each resist pattern of the resist patterns, and the measured bias associated with each resist pattern, so that a difference between the measured bias and the determined etch bias is minimized.

40. The system of any of clauses 37-39, wherein the control of the semiconductor process apparatus comprises:
   adjusting values of one or more parameters of the semiconductor apparatus so that a yield of the patterning process is improved.

41. The system of clause 40, wherein the adjusting values of the one or more parameters of the semiconductor process apparatus is iterative process comprising:
   (a) changing, via adjusting mechanisms of the semiconductor process apparatus, a current value of the one or more parameter;
   (b) obtaining, via the semiconductor process apparatus, the resist pattern printed on the substrate;
   (c) determining, via executing the trained machine learning model using the resist pattern, the etch bias and an further determining the etch pattern by applying the etch bias to the resist pattern;
   (d) determining, based on the etch pattern, whether the yield of the patterning process is within a desired yield range; and
   responsive to not in the yield range, performing steps (a)-(d)

42. The system of any of clauses 37-41, wherein the control of the etching process comprises:
   determining the etch pattern by applying the etch bias to the resist pattern;

determining, based on the etch pattern, the yield of the patterning process; and determining, based on the etch pattern, an etch recipe of the etching process so that the yield of the patterning process is improved.

43. The system of any of clauses 37-42, wherein the yield of the patterning process is percentage of etch patterns across the substrate that satisfy a design specification.

44. The system of any of clauses 37-43, wherein the semiconductor process apparatus is a lithographic apparatus.

45. A method for calibrating a process model, the process model configured to generate a simulated contour, the method comprising:

obtaining (i) measurement data at a plurality of measurement locations on a pattern, and (ii) contour constraints specified based on the measurement data; and calibrating the process model by adjusting values of model parameters of the process model until the simulated contour satisfies the contour constraints.

46. The method of clause 45, wherein the plurality of measurement locations are edge placement (EP) gauges placed on a printed pattern or a printed contour of the printed pattern.

47. The method of any of clauses 45-46, wherein the measurement data comprises a plurality of angles, each angle being defined at each measurement location placed on the pattern or the printed contour of the printed pattern.

48. The method of clause 47, wherein each angle at each measurement location defines a direction in which an edge placement error between the printed contour and a target contour is determined.

49. The method of any of clauses 45-48, wherein each contour constraint is function of a tangent angle between a tangent to the simulated contour at a given measurement location and the angle of the measurement data at the given location.

50. The method of any of clauses 45-49, wherein adjusting the values of the model parameters is an iterative process comprising:

(a) executing the process model using given values of the model parameter to generate the simulated contour, wherein the given values are random values at the first iteration and adjusted values at a subsequent iteration;

(c) determining a tangent to the simulated contour at each of the measurement locations;

(d) determining a tangent angle between the tangent and the angle of the measurement data at each of the measurement location;

(e) determining, whether the tangent angle is within a perpendicular range at one or more of the measurement locations; and (f) responsive to the tangent angle not being within a perpendicular range, adjusting the values of the model parameters, and performing steps (a)-(d).

51. The method of any of clauses 45-50, wherein the perpendicular range is a value of angle between 88° to 92°, preferably 90°.

52. The method of any of clauses 45-51, wherein the adjusting is based on a gradient of each tangent angle with respect to the model parameters, wherein the gradient indicates how sensitive the tangent angle is to a change in a model parameter value.

53. The method of any of clauses 45-52, wherein the process model is a data driven model including an empirical model and/or a machine learning model.

54. The method of any of clauses 45-53, wherein the machine learning model is a convolutional neural network, wherein the model parameters are weights and biases associated with a plurality of layers.

55. A method for calibrating a process model configured to predict an image of a target pattern, the method comprising:

obtaining, (i) a reference image associated with the target pattern, and (ii) a gradient constraint specified with respect to the reference image; and calibrating the process model such that the process model generates a simulated image that (i) minimizes an intensity difference or a frequency difference between the simulated image and the reference image, and (ii) satisfies the gradient constraint.

56. The method of clause 55, wherein the calibrating of the process model is an iterative process comprising:

(a) executing the process model using the target pattern to generate the simulated image;

(b) determining the intensity difference between intensity values of the simulated image and the reference image, and/or transforming, via Fourier transform, the simulated image and the reference image into frequency domain and determining the frequency difference between frequencies related to the simulated image and the reference image;

(c) determining a simulated gradient of a signal in the simulated image, wherein the signal is a signal along a given line passing through simulated image;

(d) determining whether conditions: (i) the intensity difference or the frequency difference is minimized, and (ii) the simulated gradient satisfies the gradient constraint associated with the reference image; and (e) responsive to conditions (i) and (ii) not being satisfied, adjusting values of model parameters of the process model, and performing steps (a)-(d) until the conditions (i) and (ii) are satisfied.

57. The method of any of clauses 55-56, wherein the simulated gradient is determined by taking a first derivative of the signal along the given line passing though the simulated image.

58. The method of any of clauses 55-57, wherein the gradient constraint is obtained by taking a first derivative of a signal along the given line passing though the reference image.

59. The method of any of clauses 55-58, further comprises:

extracting a simulated contour from the simulated image, and a reference contour from the reference image, wherein the simulated contour and the reference contour associated with the target pattern; and calibrating the process model so that the simulated contour satisfies a contour shape constraint, wherein the contour shape constraint ensures the simulated contour conforms with a shape of the reference contour.

60. The method of any of clauses 55-59, wherein a determination whether the contour shape constraint is satisfied comprises:

determining a second derivative of the simulated contour is within a desired range of a second derivative of the reference contour.

61. The method of any of clauses 55-60, wherein the reference image is obtained via simulating physics based models of a patterning process using the target pattern, the reference image comprises:

an aerial image of the target pattern;
an resist image of the target pattern; and/or
an etch image of the target pattern.

62. The method of any of clauses 55-61, wherein the process model is configured to satisfy contour constraints defined with respect to a printed contour of a pattern on a printed substrate.

63. The method of any of clauses 55-62, wherein each contour constraint is function of a tangent angle between a tangent to simulated contour at a given measurement location and the angle of the measurement data at the given location, wherein the simulated contour is a contour of the simulated pattern determined via executing the process model using the target pattern.

64. A system for calibrating a process model, the process model configured to generate a simulated contour, the system comprising:
- a metrology tool configured to obtain measurement data at a plurality of measurement locations on a pattern; and
- a processor configured to:
  - calibrate the process model by adjusting values of model parameters of the process model until the simulated contour satisfies the contour constraints, the contour constraints being based on the measurement data.

65. The system of clause 64, wherein the plurality of measurement locations are edge placement (EP) gauges placed on a printed pattern or a printed contour of the printed pattern.

66. The system of any of clauses 64-65, wherein the measurement data comprises a plurality of angles, each angle being defined at each measurement location placed on the pattern or the printed contour of the printed pattern.

67. The system of clause 66, wherein each angle at each measurement location defines a direction in which an edge placement error between the printed contour and a target contour is determined.

68. The system of any of clauses 64-67, wherein each contour constraint is function of a tangent angle between a tangent to the simulated contour at a given measurement location and the angle of the measurement data at the given location.

69. The system of any of clauses 64-68, wherein the adjusting of the values of the model parameters is an iterative process comprising:
- (a) executing the process model using given values of the model parameter to generate the simulated contour, wherein the given values are random values at the first iteration and adjusted values at a subsequent iteration;
- (c) determining a tangent to the simulated contour at each of the measurement locations;
- (d) determining a tangent angle between the tangent and the angle of the measurement data at each of the measurement location;
- (e) determining, whether the tangent angle is within a perpendicular range at one or more of the measurement locations; and
- (f) responsive to the tangent angle not being within a perpendicular range, adjusting the values of the model parameters, and performing steps (a)-(d).

70. The system of any of clauses 64-69, wherein the perpendicular range is a value of angle between 88° to 92°, preferably 90°.

71. The system of any of clauses 64-70, wherein the adjusting is based on a gradient of each tangent angle with respect to the model parameters, wherein the gradient indicates how sensitive the tangent angle is to a change in a model parameter value.

72. The system of any of clauses 64-71, wherein the process model is a data driven model including an empirical model and/or a machine learning model.

73. The system of any of clauses 64-72, wherein the machine learning model is a convolutional neural network, wherein the model parameters are weights and biases associated with a plurality of layers.

74. The system of any of clauses 64-73, wherein the metrology tool is an electron beam apparatus.

75. The system of any of clauses 64-74, wherein the metrology tool is a scanning electron microscope configured to identify and extract contours from a captured image of a pattern on a printed substrate.

76. A system for calibrating a process model configured to predict an image of a target pattern, the system comprising:
- a metrology tool configured to obtain a reference image associated with the target pattern; and
- a processor configured to:
  - calibrate the process model such that the process model generates a simulated image that (i) minimizes an intensity difference or a frequency difference between the simulated image and the reference image, and (ii) satisfies a gradient constraint related to the reference image.

77. The system of clause 76, wherein the calibrating of the process model is an iterative process comprising:
- (a) executing the process model using the target pattern to generate the simulated image;
- (b) determining the intensity difference between intensity values of the simulated image and the reference image, and/or transforming, via Fourier transform, the simulated image and the reference image into frequency domain and determining the frequency difference between frequencies related to the simulated image and the reference image;
- (c) determining a simulated gradient of a signal in the simulated image, wherein the signal is a signal along a given line passing through simulated image;
- (d) determining whether conditions: (i) the intensity difference or the frequency difference is minimized, and (ii) the simulated gradient satisfies the gradient constraint associated with the reference image; and
- (e) responsive to conditions (i) and (ii) not being satisfied, adjusting values of model parameters of the process model, and performing steps (a)-(d) until the conditions (i) and (ii) are satisfied.

78. The system of any of clauses 76-77, wherein the simulated gradient is determined by taking a first derivative of the signal along the given line passing though the simulated image.

79. The system of any of clauses 76-78, wherein the gradient constraint is obtained by taking a first derivative of a signal along the given line passing though the reference image.

80. The system of any of clauses 76-79, the processor is further configured to:
- extracting a simulated contour from the simulated image, and a reference contour from the reference image, wherein the simulated contour and the reference contour associated with the target pattern; and
- calibrating the process model so that the simulated contour satisfies a contour shape constraint, wherein the contour shape constraint ensures the simulated contour conforms with a shape of the reference contour.

81. The system of any of clauses 76-80, wherein a determination whether the contour shape constraint is satisfied comprises:

determining a second derivative of the simulated contour is within a desired range of a second derivative of the reference contour.

82. The system of any of clauses 76-81, wherein the reference image is obtained via simulating physics based models of a patterning process using the target pattern, the reference image comprises:
    an aerial image of the target pattern;
    an resist image of the target pattern; and/or
    an etch image of the target pattern.

83. The system of any of clauses 76-82, wherein the process model is configured to satisfy contour constraints defined with respect to a printed contour of a pattern on a printed substrate.

84. The system of any of clauses 76-83, wherein each contour constraint is function of a tangent angle between a tangent to simulated contour at a given measurement location and the angle of the measurement data at the given location, wherein the simulated contour is a contour of the simulated pattern determined via executing the process model using the target pattern.

85. A non-transitory computer-readable media comprising instructions that, when executed by one or more processors, cause operations comprising:
    obtaining (i) resist pattern data associated with a target pattern to be printed on a substrate, (ii) physical effect data characterizing effects of an etching process on the target pattern, and (iii) measured bias between a resist pattern and an etched pattern formed on a printed substrate; and
    training, based on the resist pattern data, the physical effect data, and the measured bias, the machine learning model to reduce a difference between the measured bias and the predicted etch bias.

86. A non-transitory computer-readable media comprising instructions that, when executed by one or more processors, cause operations comprising:
    obtaining (i) measurement data at a plurality of measurement locations on a pattern, and (ii) contour constraints specified based on the measurement data; and
    calibrating a process model by adjusting values of model parameters of the process model until the simulated contour satisfies the contour constraints.

87. A non-transitory computer-readable media comprising instructions that, when executed by one or more processors, cause operations comprising:
    obtaining, (i) a reference image associated with a target pattern, and (ii) a gradient constraint specified with respect to the reference image; and
    calibrating a process model such that the process model generates a simulated image that (i) minimizes an intensity difference or a frequency difference between the simulated image and the reference image, and (ii) satisfies the gradient constraint.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

The descriptions above are intended to be illustrative, not limiting. Thus, it will be apparent to one skilled in the art that modifications may be made as described without departing from the scope of the claims set out below.

What is claimed is:

1. A method for training a patterning process model, the patterning process model configured to predict a pattern that will be formed by a patterning process, the method comprising:
    obtaining (i) an image data associated with a desired pattern, (ii) a measured pattern of a substrate, the measured pattern being associated with the desired pattern, (iii) a first model comprising physical terms and configured to make a prediction of a first physical aspect of the patterning process, the first model comprising a first set of parameters, and (iv) a machine learning model configured to make a prediction of a different second physical aspect of the patterning process, the machine learning model comprising a second set of parameters, wherein the first model is coupled to the machine learning model in a series combination or in a parallel combination; and
    performing a neural network training to determine values of the first set of parameters and the second set of parameters, wherein the neural network training comprises:
        executing, using the image data, the first model and the machine learning model to cooperatively and in combination predict a pattern as expected to be printed on the substrate; and
        modifying the values of the first set of parameters and the second set of parameters based on the measured pattern and the predicted pattern.

2. The method of claim 1, wherein the first model and the machine learning model are configured and trained in a deep convolutional neural network framework.

3. The method of claim 2, wherein the training involves:
    predicting the pattern as expected to be printed on the substrate by forward propagation of outputs of the first model and the machine learning model;
    determining a difference between the measured pattern and the predicted pattern;
    determining a differential of the difference with respect to the first set of parameters and the second set of parameters; and
    determining values of the first set of parameters and the second set of parameters by backward propagation of the outputs of the first model and the machine learning model based on the differential of the difference.

4. The method of claim 1, wherein the first model is coupled to the machine learning model in a series combination and the series combination of the first model and the machine learning model comprises providing output of the first model as an input to the machine learning model.

5. The method of claim 1, wherein the first model is coupled to the machine learning model in a series combination and the series combination of the first model and the machine learning model comprises providing output of the machine learning model as an input to the first model.

6. The method of claim 1, wherein the first model is coupled to the machine learning model in a parallel combination and the parallel combination of the first model and the machine learning model comprises:
    providing a same input to the first model and the machine learning model;
    combining output of the first model and the machine learning model; and
    determining the predicted pattern as expected to be printed on the substrate based on the combined output.

7. The method of claim 1, wherein the first model is a resist model, and/or an aerial image model.

8. The method of claim 7, wherein the first model is a resist model and the first set of parameters of the resist model correspond to at least one selected from:
an initial acid distribution;
an acid diffusion;
an image contrast;
a long range pattern loading effect;
an acid concentration after neutralization;
a base concentration after neutralization;
a diffusion due to high acid concentration;
a diffusion due to high base concentration;
a resist shrinkage;
a resist development; or
two-dimensional convex curvature effects.

9. The method of claim 1, wherein the first model is an empirical model that models physics of an aspect of the patterning process.

10. The method of claim 9, wherein the first model relates to an acid-based diffusion after exposure of the substrate.

11. The method of claim 1, wherein the machine learning model is a neural network that models an aspect of the patterning process.

12. The method of claim 11, wherein the second set of parameters comprises: one or more weights and one or more biases of one or more layers of the neural network.

13. The method of claim 12, wherein the patterning process model corresponds to a post-exposure process of the patterning process.

14. The method of claim 13, wherein the aspect of the post-exposure process comprises: resist baking, resist development, and/or etching.

15. A computer program product comprising a non-transitory computer readable medium having instructions therein, the instructions, when executed by a computer system, configured to cause the computer system to at least:
obtain (i) an image data associated with a desired pattern, (ii) a measured pattern of a substrate, the measured pattern being associated with the desired pattern, (iii) a first model comprising physical terms and configured to make a prediction of a first physical aspect of a patterning process, the first model comprising a first set of parameters, and (iv) a machine learning model configured to make a prediction of a different second physical aspect of the patterning process, the machine learning model comprising a second set of parameters, wherein the first model is coupled to the machine learning model in a series combination or in a parallel combination; and
perform a neural network training to determine values of the first set of parameters and the second set of parameters, wherein the neural network training comprises:
execution, using the image data, of the first model and the machine learning model to cooperatively and in combination predict a pattern as expected to be printed on the substrate; and
modification of the values of the first set of parameters and the second set of parameters based on the measured pattern and the predicted pattern.

16. The computer program product of claim 15, wherein the first model and the machine learning model are configured and trained in a deep convolutional neural network framework.

17. The computer program product of claim 15, wherein the first model is a resist model, and/or an aerial image model.

18. The computer program product of claim 15, wherein the first model is an empirical model that models physics of an aspect of the patterning process.

19. The computer program product of claim 15, wherein the machine learning model is a neural network that models an aspect of the patterning process.

20. The computer program product of claim 15, wherein the instructions configured to perform the training are further configured to cause the computer system to:
predict the pattern as expected to be printed on the substrate by forward propagation of outputs of the first model and the machine learning model;
determine a difference between the measured pattern and the predicted pattern;
determine a differential of the difference with respect to the first set of parameters and the second set of parameters; and
determine values of the first set of parameters and the second set of parameters by backward propagation of the outputs of the first model and the machine learning model based on the differential of the difference.

21. The computer program product of claim 15, wherein the first model is coupled to the machine learning model in a series combination.

* * * * *